US007940267B2

(12) United States Patent
Sun et al.

(10) Patent No.: US 7,940,267 B2
(45) Date of Patent: May 10, 2011

(54) SYSTEMS AND METHODS FOR GRAPHICAL RENDERING

(75) Inventors: Weifeng Sun, Orlando, FL (US); Amar Mukherjee, Maitland, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 869 days.

(21) Appl. No.: 11/680,910

(22) Filed: Mar. 1, 2007

(65) Prior Publication Data

US 2008/0012857 A1 Jan. 17, 2008

Related U.S. Application Data

(60) Provisional application No. 60/830,654, filed on Jul. 13, 2006.

(51) Int. Cl.
*G06T 15/00* (2006.01)
(52) U.S. Cl. .................. 345/426; 345/419; 345/420
(58) Field of Classification Search ................... None
See application file for complete search history.

(56) References Cited

U.S. PATENT DOCUMENTS

| 7,061,489 | B2 | 6/2006 | Snyder et al. | |
| 7,319,467 | B2 * | 1/2008 | Weyrich et al. | 345/426 |
| 7,382,369 | B2 * | 6/2008 | Sloan et al. | 345/423 |

OTHER PUBLICATIONS

Kontkanen, J., Turquin, E., Holzschuch, N., Sillion, F., Wavelet Radiance Transport for Interactive indirect Lighting, Jun. 2006, Eurographics Symposium on Rendering, pp. 1-12.*

Ng., R., Ramamoorthi, R., Hanrahan, P., Triple Product Wavelet Integrals for All-Frequency Relighting, Aug. 2004, ACM International Conference on Computer Graphics and Interactive Techniques, pp. 477-487.*

Sloan, P., Kautz, J., Snyder, J., Precomputed Radiance Transfer for Real-Time Rendering in Dynamic, Low-Frequency Lighting Environments, Jul. 2002, Proceedings of the 29th annual conference on Computer graphics and interactive techniques, pp. 527-536.*

Sun et al., "Generalized Wavelet Product Integral for Rendering Dynamic Glossy Objects," ACM Transactions on Graphics (SIGGRAPH Jul. 2006) vol. 25, Issue 3, pp. 955-966.

Berman, et al., "Multiresolution Painting and Compositing," Dept. of Computer Science and Engineering, University of Washington, pp. 85-90, Jul. 1994.

Stollnitz, et al., "Wavelets for Computer Graphics: A Primer," IEEE Computer Graphics and Applications, 15(3) pp. 1-40, Sep. 1994.

Blinn, et al., "Texture and Reflection in Computer Generated Images," Commun of the ACM vol. 19, No. 10, pp. 542-547, Oct. 1976.

Clarberg, et al., "Wavelet Importance Sampling: Efficiently Evaluating Products of Complex Functions," ACM Transactions on Graphics, vol. 24, No. 3, pp. 1166-1175, Jul. 2005.

(Continued)

*Primary Examiner* — Said Broome
(74) *Attorney, Agent, or Firm* — Thomas, Kayden, Horstemeyer & Risley, LLP

(57) ABSTRACT

A method of rendering a graphical scene includes determining a plurality of functions that contribute to a light transport model of a scene, factoring the plurality of functions into a set of fixed functions and one varying function, determining a first radiance transfer vector that represents the product of the fixed functions in the wavelet domain, determining a second radiance transfer vector that represents the one varying function in the wavelet domain, determining an inner product of the first and second radiance transfer vectors to approximate a radiance of a point x in the scene, and rendering the scene.

19 Claims, 25 Drawing Sheets

OTHER PUBLICATIONS

Debevec, et al., "Recovering High Dynamic Range Radiance Maps from Photographs," In Proc. SIGGRAPH, pp. 369-378, Aug. 1997.

Devore, "Nonlinear-approximation," Acta Numerica 7, pp. 51-150, 1998.

Dorsey, et al., "Interactive Design of Complex Time Dependant Lighting," IEEE Computer Graphics and Applications vol. 15, No. 2, pp. 26-36, Mar. 1995.

Sun, et al., "Inside Just-in-time Radiance Transfer," International Conference on Computer Graphics and Interactive Techniques, ACM SIGGRAPH 2006 Sketches, Boston, Massachusetts, Session: Sketches: let there be light Article No. 170, Year of Publication: 2006, ISBN:1-59593-364-6.

Gortler, et al., "Wavelet Radiosity," pp. 221-230, Sep. 1993.

James, et al., "Precomputing Interactive Dynamic Deformable Scenes," ACM Transactions on Graphics vol. 22, No. 3, pp. 1-18, Sep. 2003.

Kautz, et al., "Fast Arbitrary BRDF Shading for Low-Frequency Lighting Using Spherical Harmonics," In Proceedings of the 13th Eurographics Workshop on Rendering, pp. 291-296, Jun. 26-28, 2002.

Kautz, et al. "Hemispherical Rasterization for Self-Shadowing of Dynamic Objects," In Proc. of Eurographics Symposium on Rendering, pp. 179-184, Nov. 22, 2004.

Kontkanen, et al., "Ambient Occlusion Fields," In Proc. of ACM SIGGRAPH 2005 Symposium on Interactive 3D Graphics and Games, ACM Press, Apr. 3-6, 2005.

Kristensen, et al, "Precomputed Local Radiance Transfer for Real-Time Lighting Design," ACM Transactions on Graphics vol. 24, No. 3, pp. 1208-1215, Jul. 2005.

Lehtinen, et al., "Matrix radiance transfer," Symposium on Interactive 3D Graphics, Proceedings of the 2003, symposium on Interactive 3D graphics, Monterey, California, Session: Session 3: light table of contents, pp. 59-64, Year of Publication: 2003, ISBN:1-58113-645-5.

Liu, et al.; "All-Frequency Precomputed Radiance Transfer for Glossy Objects," In Proceedings of Eurographics Symposium on Rendering, pp. 337-344, 2004.

Ng, et al., "All-Frequency Shadows Using Non-Linear Wavelet Lighting," ACM Transactions on Graphics (SIGGRAPH) vol. 22, No. 3, pp. 376-381, Jul. 2003.

Ng, et al., "Triple Product Wavelet Integrals for All-Frequency Relighting,". ACM Transactions on Graphics (SIGGRAPH) vol. 23, No. 3, pp. 477-487, Aug. 2004.

Nimeroff, et al., "Efficient Re-Rendering of Naturally Illuminated Environments," 5th Eurographics Rendering Workshop, pp. 359-374, Jun. 2004.

Pellacini, et al., "L.pics: a Hybrid Hardware-Accelerated Relighting Engine for Computer Cinematography," ACM Transactions on Graphics (SIGGRAPH) vol. 24, No. 3, pp. 464-470, Jul. 2005.

Shapiro, J.M., "Embedded Image Coding Using Zerotrees of Wavelet Coefficients," IEEE Transactions on Signal Processing SP, 41, pp. 3445-3462, Dec. 1993.

Sloan, et al., "Precomputed Radiance Rransfer for Real-Rime Rendering in Dynamic, Low-Frequency Lighting Environments," ACM Transactions on Graphics (SIGGRAPH) vol. 21, No. 3, pp. 527-536, Jul. 2002V.

Sloan, et al., "Clustered Principal Components for Precomputed Radiance Transfer," ACM Transactions on Graphics (SIGGRAPH) vol. 22, No. 3, pp. 382-391, Jul. 2003.

Sloan, et al., "Bi-Scale Radiance Transfer," ACM Transactions on Graphics (SIGGRAPH) vol. 22, No. 3, pp. 370-375, Jul. 2003.

Sloan, et al., "Local, Deformable Precomputed Radiance Transfer," ACM Transactions on Graphics (SIGGRAPH) vol. 24, No. 3, pp. 1216-1224, Jul. 2005.

Zhou, et al., "Precomputed Shadow Fields for Dynamic Scenes," ACM Transactions on Graphics (SIGGRAPH) vol. 24, No. 3, pp. 1196-1201, Jul. 2005.

Wang, et al., "All-Frequency Relighting of Non-Diffuse Objects Using Separable BRDF Approximation," In Proceedings of Eurographics Symposium on Rendering, pp. 345-354, 2004.

Kontkanen, et al. "Wavelet Radiance Transport for Interactive Indirect Lighting", Helsinki University of Technology; The Eurographics Association 2006.

Zhou, et al. "Precomputed Shadow Fields for Dynamic Scenes," ACM Transactions on Graphics (TOG), vol. 24, Issue 3, Jul. 2005. pp. 1196-1201.

Berman, et al. "Multiresolution Painting and Compositing," University of Washington, Technical Report 94-01-09b, Apr. 1994.

Shapiro, "Embedded Image Coding Using Zerotrees of Wavelet Coefficients" IEEE Transactions on Signal Processing, vol. 41, No. 12, Dec. 1993.

\* cited by examiner

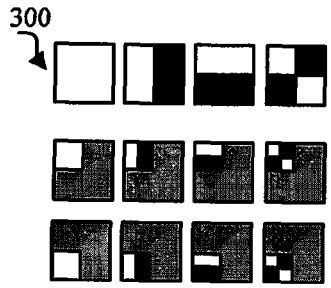

FIG. 3

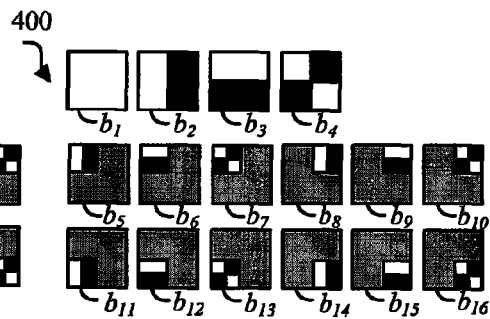

FIG. 4

Equation (2) $\quad F_i(v) = \sum_{j=1}^{M} [f_{i,j} \cdot b_j(v)]$

$u = \underbrace{[f_{1,1} f_{2,1} f_{3,1} f_{4,1} \cdot C^4_{b_1,b_1,b_1,b_1}]}_{602} + \ldots + \underbrace{[f_{1,6} f_{2,2} f_{3,11} f_{4,7} \cdot C^4_{b_6,b_2,b_{11},b_7}]}_{604} + \ldots + \underbrace{[f_{1,2} f_{2,5} f_{3,6} f_{4,5} \cdot C^4_{b_2,b_5,b_6,b_5}]}_{606}$ with 608 pointing to the $f$-coefficient groups and 610 pointing to the $C^4$ terms.

612 → $C^4_{b_1,b_1,b_1,b_1} = \int b_1 \cdot b_1 \cdot b_1 \cdot b_1$

614 → $C^4_{b_6,b_2,b_{11},b_7} = \int b_6 \cdot b_2 \cdot b_{11} \cdot b_7$

616 → $C^4_{b_2,b_5,b_6,b_5} = \int b_2 \cdot b_5 \cdot b_6 \cdot b_5$

FIG. 6

| Parity of the number of $\psi_1$ | Even | Odd | Odd | Even | Even | Odd | Even | Odd |
|---|---|---|---|---|---|---|---|---|
| Parity of the number of $\psi_2$ | Even | Odd | Even | Odd | Odd | Even | Even | Odd |
| Parity of the number of $\psi_3$ | Even | Odd | Even | Odd | Even | Odd | Odd | Even |
| Basis function type of $P^N$ | $\phi$ | | $\psi_1$ | | $\psi_2$ | | $\psi_3$ | |

FIG. 10

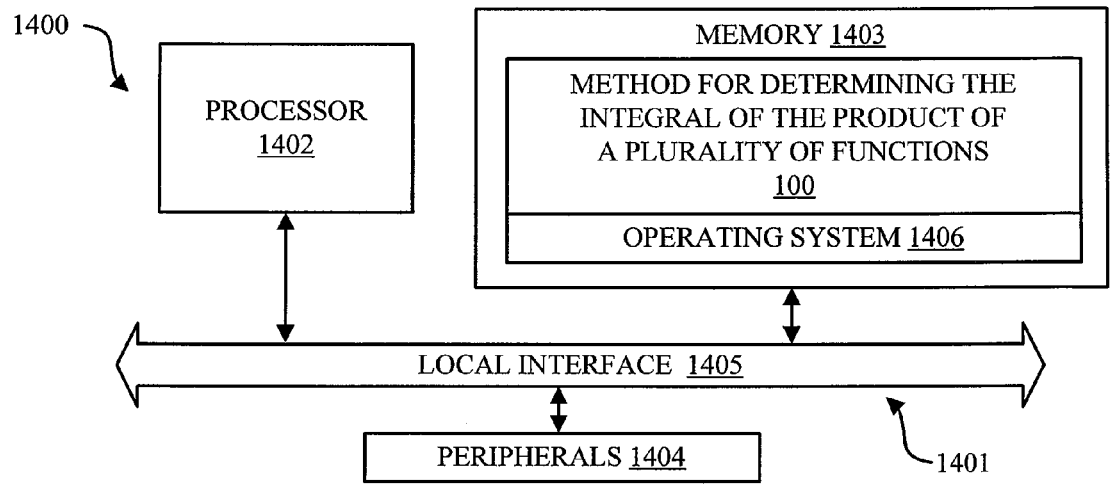

FIG. 14

Equation (22) $\quad C^N = \int \underbrace{+/- |P^{N-1}| \; b_{P^{N-1}}}_{P^{N-1}} \cdot b_N$

| Case | $C^N$ is non-zero if: | $C^N$ is: |
|---|---|---|
| 1 | Basis functions $b_{P^{N-1}}$ and $b_N$ are both wavelet basis functions of the same type and support | $C^N = |P^{N-1}|$ |
| 2 | Basis functions $b_{P^{N-1}}$ and $b_N$ are both the mother scaling function | $C^N = 1$ |
| 3 | Basis functions $b_{P^{N-1}}$ is a scaling basis function and $b_N$ is one of its parent basis functions | $C^N = +/- 2^j \times C^{N-1}$ $j$ is the scale of $b^N$ |
| 4 | Basis function $b_{P^{N-1}}$ is a scaling basis function and $b_N$ is a wavelet basis function of the same support | $C^N = 0$ |
| 5 | Basis function $b_{P^{N-1}}$ is a wavelet basis function and $b_N$ is a child scaling basis function of the same support | $C^N = 0$ |
| 6 | Basis function $b_{P^{N-1}}$ is a wavelet basis function and $b_N$ is a wavelet basis function of different type and the same support. | $C^N = 0$ |
| 7 | Basis function $b_{P^{N-1}}$ is a wavelet basis function and $b_N$ is one of its parent basis functions. | $C^N = 0$ |

FIG. 15

```
1700    1   struct augtree
        2       dc: mother scaling coefficient;
        3       node: pointer to struct augnode;
        4   end
        5   struct augnode
        6       ψ[3]: wavelet coefficients;
        7       parentsum: signed parent summation;
        8       ch[4]: child pointers;
        9   end
```

1900

1902
```
1  algorithm FunctionProductIntegral (W₁, W₂, ..., W_N);
2      u = W₁.dc x W₂.dc x ... x W_N.dc;
3      traverseAugTrees (1, W₁.node, W₂.node, ... , W_N.node);
4  end
```

1904
```
1  routine traverseAugTrees (cum, w₁, w₂, ... , w_N);
2      Rank w₁,...,w_N so that w₁,...,w_k are not null and w_{k+1},...,w_N are null;
3      if k < 2 then return;
4      for i = 1 to N, update w_i.parentsum;
5      cum = cum x [ Π_{i=k+1}^{N} w_i.parentsum ];
6      u = u + [cum x getProductIntegral (w₁, ... , w_k)];
7      for i = 0 to 3
8          traverseAugTrees (cum, w₁.ch[i], ... w_k.ch[i]);
```

1906
```
1  routine getProductIntegral (w₁, ... , w_m)
2      if m = 1 return 0;
3      return [ (w_m.parentsum x getProductIntegral (w₁, ... , w_{m-1}))
4              + (w_m.ψ[0] x getWaveletProduct (0, 1, 2, w₁, ... , w_{m-1}))
5              + (w_m.ψ[1] x getWaveletProduct (1, 0, 2, w₁, ... , w_{m-1}))
6              + (w_m.ψ[2] x getWaveletProduct (2, 0, 1, w¹, ... , w_{m-1}))];
```

1908
```
1  routine getWaveletProduct (a, b, c, w₁, ... , w_m)
2      if m = 1 return w₁.ψ[a];
3      return  [ (w_m.ψ[a] x Π_{i=1}^{k-1} w_i.parentsum)
4              + (w_m.parentsum x getWaveletProduct (a, b, c, w₁, ... , w_{m-1}))
5              + (4^j x w_m.ψ[a] x getProductIntegral(w₁, ..., w_{m-1}))
6              + (2^j x w_m.ψ[b] x getWaveletProduct (c, b, a, w₁, ... , w_{m-1}))
7              + (2^j x w_m.ψ[c] x getWaveletProduct (b, a, c, w₁, ... , w_{m-1}))];
```

2002
```
1  algorithm FunctionProductIntegral (W₁, W₂, ..., Wₙ);
2      u = W₁.dc x W₂.dc x ... x Wₙ.dc;
3      traverseAugTrees (1, W₁.node, W₂.node, ... , Wₙ.node);
4  end
```

2004
```
1  routine traverseAugTrees (cum, w₁, w₂, ... , wₙ);
2      Rank w₁,...,wₙ so that w₁,...,wₖ are not null and wₖ₊₁,...,wₙ are null;
3      if k < 2 then return;
4      for i = 1 to N, update wᵢ.parentsum;
5      cum = cum x [ Π_{i=k+1} wᵢ.parentsum ];
6      u = u + [cum x getProductIntegral (w₁, ... , wₖ)];
7      for i = 0 to 3
8          traverseAugTrees (cum, w₁.ch[i], ... wₖ.ch[i]);
```

2006
```
1  routine getProductIntegral (w₁, ... , wₘ)
2      if m = 1 return 0;
3      𝒯[1].{φ, ψ[0], ψ[1], ψ[2], cum}
4          = {0, w₁.ψ[0], w₁.ψ[1], w₁.ψ[2], w₁.parentsum}
5      for i = 2 to (m – 1)
6          𝒯[i].cum = wᵢ.parentsum x 𝒯[i - 1].cum;
7          𝒯[i].φ = getP(i);
8          𝒯[i].ψ[0] = getW (0, 1, 2, i);
9          𝒯[i].ψ[1] = getW (1, 0, 2, i);
10         𝒯[i].ψ[2] = getW (2, 0, 1, i);
11     return getP(m);
```

2008
```
1  routine getP (i)
2      if i = 1 return 0;
3      return [wᵢ.parentsum x 𝒯[i - 1].φ +
4             + (wᵢ.ψ[0] x 𝒯[i - 1].ψ[0])
5             + (wᵢ.ψ[1] x 𝒯[i - 1].ψ[1])
6             + (wᵢ.ψ[2] x 𝒯[i - 1].ψ[2])];
```

2010
```
1  routine getW (a, b, c, i)
2      if i = 1 return 𝒯[1].ψ[a];
3      return [(wᵢ.ψ[a] x 𝒯[i - 1].cum)
4             + (wᵢ.parentsum x 𝒯[i - 1].ψ[a])
5             + (4ʲ x wᵢ.ψ[a] x 𝒯[i - 1].φ)
6             + (2ʲ x (wᵢ.ψ[b] x 𝒯[i - 1].ψ[c] + wᵢ.ψ[c] x 𝒯[i - 1].ψ[b]))];
```

FIG. 20

```
2100   1    struct table 𝒯[N]
       2         φ: magnitude;
       3         ψ[0]: magnitude;
       4         ψ[1]: magnitude;
       5         ψ[2]: magnitude;
       6         cum: cumulative parentsum;
       7    end
```

```
2902  1    algorithm FunctionProduct (W₀, W₁, W₂, ..., W_{N-1})                2900
      2         W₀.dc = W₁.dc x W₂.dc x ... x W_{N-1}.dc;
      3         getCoefficients(1, W₀.node, W₁.node, W₂.node,, ..., W_{N-1}.node);
      4    end 1    routine getCoefficients (cum, w₀, w₁, w₂, ... , w_{N-1})
      2         Rank w₁, ... ,w_{N-1} so that w₁, ..., w_k are not null and w_{k+1}, ...,w_{N-1} are null;
      3         if k = 0 then return;
2904  4         for i = 1 to (N - 1), update w_i.parentsum;
      5         cum = cum x [ Π_{h=k+1}^{N-1} w_h.parentsum ];
      6         updateParents (w₀, cum x getProductIntegral(w₁, ... , w_k));
      7         w₀.ψ[0] = cum x getW (0, 1, 2, k);
      8         w₀.ψ[1] = cum x getW (1, 0, 2, k);
      9         w₀.ψ[2] = cum x getW (2, 0, 1, k);
      10        for i = 0 to 3
      11             getCoefficients (cum, w₀.ch[i], w₁.ch[i], ... w_k.ch[i]);

2906  1    routine updateParents (w₀, val)
      2         w₀.dc = w₀.dc + val;
      3         for scale j = 0, 1, ... , w₀.scale-1
      4              // lies in the quadrant (k, l) of its parent w_p at scale j
      5              w_p.ψ[0] = w_p.ψ[0] + (sign (0, k, l) x 2^j x val);
      6              w_p.ψ[1] = w_p.ψ[1] + (sign (1, k, l) x 2^j x val);
      7              w_p.ψ[2] = w_p.ψ[2] + (sign (2, k, l) x 2^j x val);

1    routine getProductIntegral (w₁, ... , w_m)
      2         if m = 1 return 0;
      3         𝒯[1].{φ, ψ[0], ψ[1], ψ[2], cum} = {0, w₁.{ψ[0], ψ[1], ψ[2]}, w₁.parentsum}}
2908  4         for i = 2 to (m – 1)
      5              𝒯[i].cum = w_i.parentsum x 𝒯[i - 1].cum;
      6              𝒯[i].φ = getP(i);
      7              𝒯[i].ψ[0] = getW (0, 1, 2, i);
      8              𝒯[i].ψ[1] = getW (1, 0, 2, i);
      9              𝒯[i].ψ[2] = getW (2, 0, 1, i);
      10        return getP(m);

2910  1    routine getP (i)
      2         if i = 1 return 0;
      3         return [w_i.parentsum x 𝒯[i - 1].φ + (w_i.ψ[0] x 𝒯[i - 1].ψ[0])
      4              + (w_i.ψ[1] x 𝒯[i - 1].ψ[1]) + (w_i.ψ[2] x 𝒯[i - 1].ψ[2])];

2912  1    routine getW (a, b, c, i)
      2         if i = 1 return 𝒯[1].ψ[a];
      3         return [(w_i.ψ[a] x 𝒯[i - 1].cum) + (w_i.parentsum x 𝒯[i - 1].ψ[a])
      4              + (4^j x w_i.ψ[a] x 𝒯[i - 1].φ)
      5              + (2^j x (w_i.ψ[b] x 𝒯[i - 1].ψ[c] + w_i.ψ[c] x 𝒯[i - 1].ψ[b]))];
```

SYSTEMS AND METHODS FOR GRAPHICAL RENDERING

CROSS-REFERENCE TO RELATED APPLICATIONS

This application claims priority to copending U.S. provisional application entitled, "Generalized Wavelet Product Integral For Rendering Dynamic Glossy Objects," having Ser. No. 60/830,654, filed Jul. 13, 2006, which is entirely incorporated herein by reference.

STATEMENT REGARDING FEDERALLY SPONSORED RESEARCH OR DEVELOPMENT

This disclosure was made with government support under grant number 0312724 awarded by the National Science Foundation. The government has certain rights in the invention.

BACKGROUND

Mathematics is a powerful tool that can be used to create models, among other things. When a real world system is represented using a mathematical model, the solution to the mathematical model often represents an answer to a problem in the real world system. In some cases, due to the nature of the system, the mathematical model includes a series of functions that are multiplied together and integrated, or simply multiplied together. One example of such a mathematical model is a light transport model that represents the physics of light moving within a three-dimensional scene. The light transport model describes the radiance of objects in the scene as a function of parameters such as the viewpoint of the observer, the texture of the objects, and the lighting itself.

In cases in which the mathematical model is complex and time-consuming to solve, an approximation of the model can be employed to simplify, for example, rendering a graphical scene. However, the approximation may underestimate or ignore some variables of the model, and therefore the contribution of corresponding elements to the overall system. For example, most computer graphics rendering processes rely on simplified or approximated versions of the light transport model, but the lighting of the scenes rendered using such models is not realistic. Some simplified versions of the light transport model require objects in the scene to be static. Others cannot approximate the specular highlights that high-frequency lighting creates on glossy materials. Still others are physically accurate but are too slow for real-time rendering.

To date, a need exists for systems and methods for determining the integral of the product of a plurality of functions, or for determining the product of a plurality of functions. For example, such a need exists in the art of computer graphics rendering, where such systems and methods can be employed with reference to the light transport model.

SUMMARY

In one embodiment, a method of rendering a graphical scene includes determining a plurality of functions that contribute to a light transport model of a scene, factoring the plurality of functions into a set of fixed functions and one varying function, determining a first radiance transfer vector that represents the product of the fixed functions in the wavelet domain, determining a second radiance transfer vector that represents the one varying function in the wavelet domain, determining an inner product of the first and second radiance transfer vectors to approximate a radiance of a point x in the scene, and rendering the scene.

Other systems, devices, methods, features, and advantages of the disclosed systems and methods for determining the integral of the product of a plurality of functions will be apparent or will become apparent to one with skill in the art upon examination of the following figures and detailed description. All such additional systems, devices, methods, features, and advantages are intended to be included within the description and are intended to be protected by the accompanying claims.

BRIEF DESCRIPTION OF THE FIGURES

The present disclosure may be better understood with reference to the following figures. Matching reference numerals designate corresponding parts throughout the figures, and components in the figures are not necessarily to scale.

FIG. 3 is a diagram illustrating the two-dimensional, non-standard Haar basis set having a resolution n of 2.

FIG. 4 is a diagram illustrating restricted basis functions of the two-dimensional, nonstandard Haar basis set as shown in FIG. 3.

FIG. 5 illustrates four example functions represented in the wavelet domain.

FIG. 6 is a diagram illustrating a wavelet domain representation of the integral of the product of the example functions of FIG. 5.

FIG. 10 is a diagram illustrating example products of more than two basis functions, and example equations for calculating such products.

FIG. 14 is a block diagram illustrating a general-purpose computer system that can be used to implement embodiments of the systems and methods disclosed herein.

FIG. 15 is a table illustrating seven cases that facilitate determining the $N^{th}$ order integral coefficient $C^N$.

FIG. 19 illustrates in pseudo code an example tree-traversal algorithm for determining the integral of the product of a plurality of functions, and embodiments of component routines.

FIG. 20 illustrates in pseudo code an optimized tree-traversal algorithm for determining the integral of the product of a plurality of functions, and embodiments of component routines.

FIG. 29 illustrates in pseudo code an example tree-traversal algorithm for determining the basis coefficients of a vector representing the product of a plurality of functions in the wavelet domain, and embodiments of component routines.

DETAILED DESCRIPTION

Described below are embodiments of systems and methods for determining the integral of the product of a plurality of functions, and for determining the product of a plurality of functions. In some embodiments, the systems and methods can be used to render scenes using a computer, including dynamic glossy objects in real time, as is also described in a paper by the inventors, Sun et al., entitled "Generalized Wavelet Product Integral for Rendering Dynamic Glossy Objects", ACM Transactions on Graphics (SIGGRAPH '06) 25, 3, 955-966, which is incorporated by reference herein in its entirety.

Figure 1:
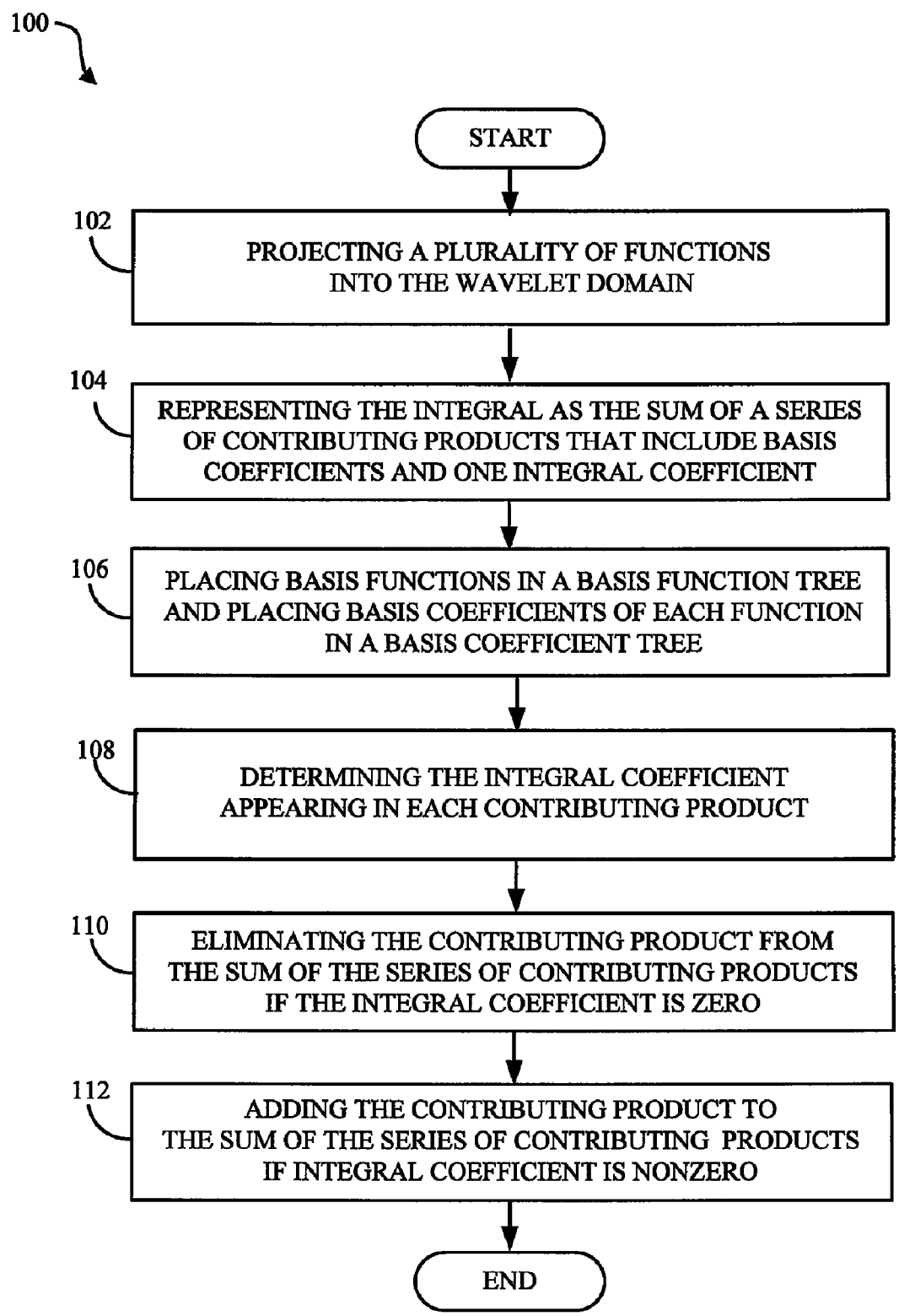
FIG. 1 is a block diagram illustrating an embodiment of a method for determining the integral of the product of a plurality of functions.

FIG. 1 is a block diagram illustrating an embodiment of a method 100 for determining the integral of the product of a plurality of functions. The integral of the product of the plurality of functions is represented using equation (1):

$$u = \int \prod_{i=1}^{N} F_i(v) dv \quad (1)$$

where u is the integral of the product of the plurality of functions, N is the total number of functions contributing to the product being integrated, and $F_i(v)$ generically denotes the $i^{th}$ function in the product being integrated, i being any integer from 1 to N.

In block 102, each of the plurality of functions $F_i(v)$ is projected into the wavelet domain. Projecting the functions into the wavelet domain comprises, for example, performing a wavelet transform on each function. The wavelet transform projects the function $F_i(v)$ onto a wavelet basis set β. The wavelet basis set β includes a plurality of basis functions $b_h(v)$. As a result of the wavelet transform, each function $F_i(v)$ is expressed as the sum of a series of basis functions $b_h(v)$ scaled by corresponding basis coefficients $f_{i,h}$, as shown in equation (2):

$$F_i(v) = \sum_{h=1}^{M} [f_{i,h} \cdot b_h(v)] \quad (2)$$

where $b_h(v)$ is a $h^{th}$ basis function in the wavelet basis set β, $f_{i,h}$ is the basis coefficient corresponding to the $h^{th}$ basis function, and M is the number of basis functions $b_h(v)$ used to represent the function $F_i(v)$ in the wavelet domain. Replacing the function $F_i(v)$ in equation (1) with its wavelet domain representation shown in equation (2) yields the wavelet domain representation of the integral of the product of the plurality of functions, as shown in equation (3):

$$u = \int \prod_{i=1}^{N} \sum_{h_i=1}^{M} [f_{i,h_i} \cdot b_{h_i}(v)] dv \quad (3)$$

The wavelet transform can be a nonstandard Haar wavelet transform, in which case the wavelet basis set β can be a two-dimensional, nonstandard Haar basis set. Such a wavelet transform and basis set are described by Stollnitz, et al. in "Wavelets for Computer Graphics: A Primer," IEEE Computer Graphics and Applications (1995), 15, 3, 76-84, which is incorporated by reference in its entirety herein. Projecting each function $F_i(v)$ onto the two-dimensional, nonstandard Haar basis set by performing the nonstandard Haar wavelet transform simplifies evaluating the integral of the product of the plurality of functions because only nonzero basis coefficients $f_{i,h}$ and nonzero $N^{th}$ order integral coefficients $C^N$ contribute to the integral and when two-dimensional, nonstandard Haar basis functions are used to represent the functions $F_i(v)$, many of the basis coefficients $f_{i,h}$ and the $N^{th}$ order integral coefficients $C^N$ are zero, as described in detail below. Therefore, from this point forward, the term wavelet transform generally refers to the nonstandard Haar wavelet transform, the term basis function $b_h$ generally refers to a two-dimensional, nonstandard Haar basis function and the term basis set B generally refers to the two-dimensional, nonstandard Haar basis set and the basis functions, of this basis set, unless otherwise indicated. Because the wavelet transform is known in the art and is explained in the Stollnitz reference incorporated above, a discussion of the wavelet transform is omitted here. However, a brief explanation of the basis set is provided below.

Figure 2:
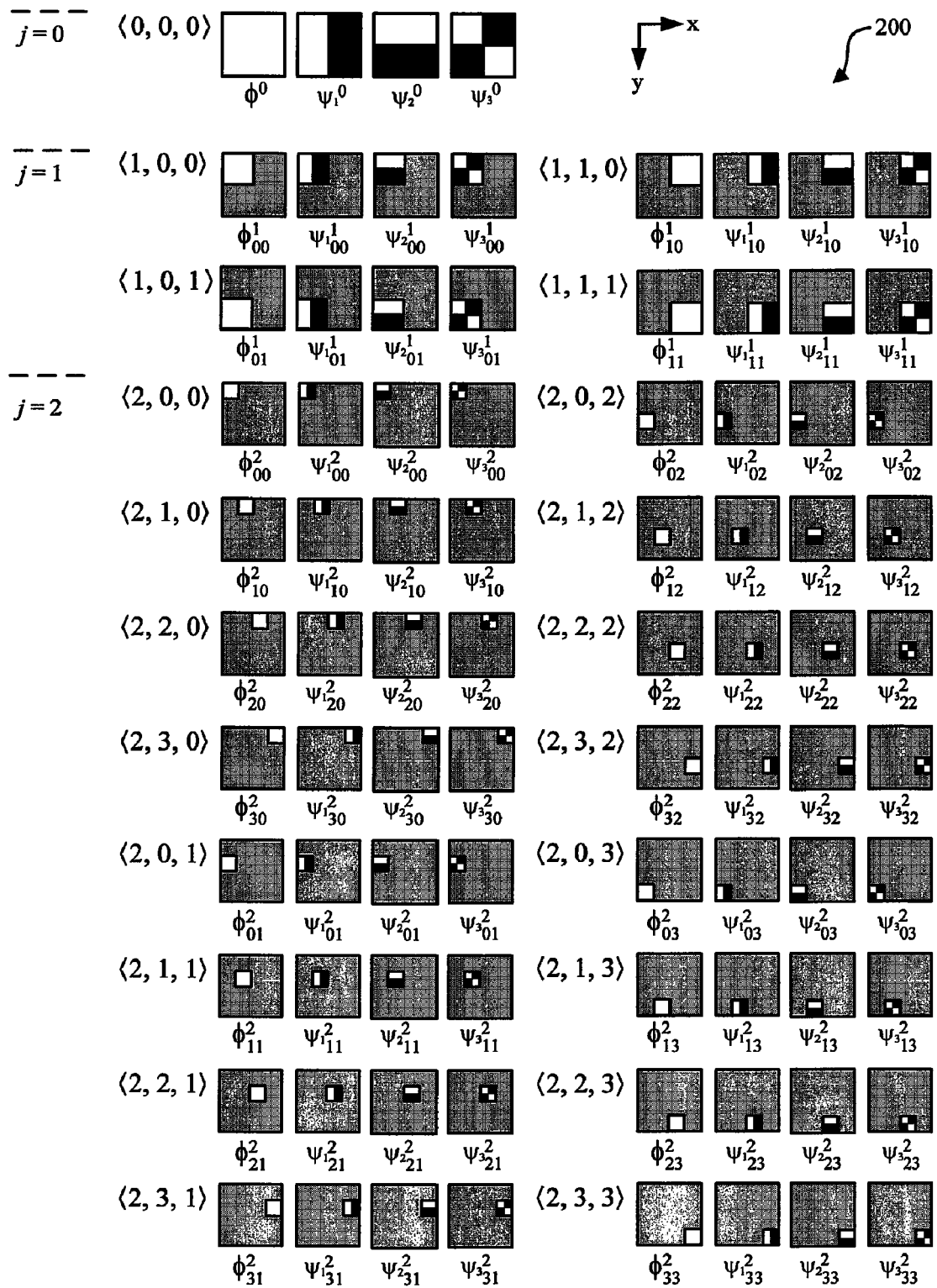
FIG. 2 is a diagram illustrating a two-dimensional, non-standard Haar basis set having a resolution n of 3.

The two-dimensional, nonstandard Haar basis set B includes a plurality of basis functions, the number of basis functions varying with the resolution n of the basis set. For example, FIG. 2 is a diagram illustrating a basis set 200, having a resolution n of 3 and a total of eighty-four basis functions. In FIG. 2, each square diagram represents one of the basis functions. The basis function is positive where the diagram is white, is negative where the diagram is black, and is zero where the diagram is gray. For simplicity, a magnitude of the basis function is ignored in the diagrams, but if shown, the magnitude would project out of or into the page. Each of the basis functions is normalized such that the magnitude of the basis function is one, and therefore the basis set 200 is an orthonormal basis set.

Generally speaking, the basis set 200 includes four basis function types: scaling basis functions generally denoted by $\phi$, and three different wavelet basis functions generally denoted by $\psi_1$, $\psi_2$, and $\psi_3$. A mother basis function is defined for each of the four basis function types. As illustrated in FIG. 2, the mother basis functions include a mother scaling basis function $\phi^0$ and three different mother wavelet basis functions $\psi_1^0$, $\psi_2^0$ and $\psi_3^0$. Each of the mother basis functions takes a unique shape within the diagram. The equations of the mother basis functions are provided below:

$$\phi^0(x,y) = \begin{cases} 1 & \text{if } (0 \le x \le 1) \text{ and } (0 \le y \le 1) \\ 0 & \text{else} \end{cases}$$

$$\psi_1^0(x,y) = \begin{cases} 1 & \text{if } \left(0 \le x \le \frac{1}{2}\right) \text{ and } (0 \le y \le 1) \\ -1 & \text{if } \left(\frac{1}{2} < x \le 1\right) \text{ and } (0 \le y \le 1) \\ 0 & \text{else} \end{cases}$$

$$\psi_2^0(x,y) = \begin{cases} 1 & \text{if } (0 \le x \le 1) \text{ and } \left(0 \le y \le \frac{1}{2}\right) \\ -1 & \text{if } (0 \le x \le 1) \text{ and } \left(\frac{1}{2} < y \le 1\right) \\ 0 & \text{else} \end{cases}$$

$$\psi_3^0(x,y) = \begin{cases} -1 & \text{if } \left(0 \le x \le \frac{1}{2}\right) \text{ and } \left(0 \le y \le \frac{1}{2}\right) \\ -1 & \text{if } \left(\frac{1}{2} < x \le 1\right) \text{ and } \left(\frac{1}{2} \le y \le 1\right) \\ 1 & \text{if } \left(0 \le x \le \frac{1}{2}\right) \text{ and } \left(\frac{1}{2} < y \le 1\right) \\ 1 & \text{if } \left(\frac{1}{2} < x \le 1\right) \text{ and } \left(0 \le y \le \frac{1}{2}\right) \\ 0 & \text{else} \end{cases}$$

Each of the remaining basis functions in the basis set 200 is a dilated and spatially translated version of one of the mother basis functions. The mother basis functions can be dilated by a scale j and can be spatially translated with respect to an x-y coordinate system by spatial translations k and l. The scale j can be any integer from 0 to (n−1), n being the resolution of the basis set 200. Each spatial translation k and l can be any integer from 0 to $(2^j-1)$. Each combination <j,k,l> is a unique support that indicates a size and location of the basis function in the diagram, the size being a function of the scale j and the location being a function of the spatial translations k, l.

For each support <j,k,l>, four normalized basis functions are defined, one for each of the basis function types. A scaling basis function $\phi_{kl}^j$ for the support <j,k,l> is expressed in terms of the mother scaling basis function $\phi^0$ by:

$$\phi_{kl}^j(x,y) = 2^j \phi^0(2^j x - k, 2^j y - l) \quad (4)$$

Three wavelet basis functions $\psi_{1kl}^j$, $\psi_{2kl}^j$, $\psi_{3kl}^j$ for the support <j,k,l> are expressed in terms of their respective mother wavelet functions $\psi_1^0$, $\psi_2^0$, and $\psi_3^0$ by:

$$\psi_{1kl}^j(x,y) = 2^j \psi_1^0(2^j x - k, 2^j y - l) \quad (5)$$

$$\psi_{2kl}^j(x,y) = 2^j \psi_2^0(2^j x - k, 2^j y - l) \quad (6)$$

$$\psi_{3kl}^j(x,y) = 2^j \psi_3^0(2^j x - k, 2^j y - l) \quad (7)$$

The basis set 200 therefore includes one basis function for each basis function type at each support <j,k,l>, the basis function type indicating the shape of the basis function within the diagram, and the support indicating the size and location of the basis function within the diagram.

Although the two-dimensional, nonstandard Haar basis set B is described above with reference to the basis set 200 shown in FIG. 2, a person of skill would understand that the basis set B can have greater or fewer basis functions depending on the resolution n. For example, FIG. 3 is a diagram illustrating the two-dimensional, nonstandard Haar basis set 300 having a resolution n of 2. The principles described with reference to the basis set 200 generally apply to the basis set 300, and to any other such basis set B regardless of the resolution n.

The basis set B includes a subset of restricted basis functions. The restricted basis function subset includes $2^n \times 2^n$ basis functions from the basis set, including the mother scaling basis function $\phi^0$ and all of the wavelet basis functions $\psi_{1kl}^j$, $\psi_{2kl}^j$, $\psi_{3kl}^j$. In other words, the restricted basis function subset includes all basis functions in the basis set except for the scaling basis functions $\phi_{kl}^j$ having scales j greater than zero. For example, the restricted basis function subset 400 of the two-dimensional, nonstandard Haar basis set 300 is shown in FIG. 4.

Returning to block 102 of FIG. 1, the nonstandard Haar wavelet transform projects the functions $F_i(v)$ onto restricted basis functions of the basis set. Because the wavelet transform projects the function $F_i(v)$ onto the restricted bases, the wavelet domain representation of the function $F_i(v)$ in equation (2) is the sum of a series of $2^n \times 2^n$ restricted basis functions $b_h$ scaled by $2^n \times 2^n$ corresponding basis coefficients $f_{i,h}$, where n is the resolution. Therefore, from this point forward, the term basis function $b_h$ generally refers to one of the restricted basis functions and the term basis coefficient $f_{i,h}$ generally refers to either the mother scaling coefficient or one of the wavelet coefficients.

FIG. 5 illustrates four example functions represented in the wavelet domain. For exemplary purposes, the functions $F_i(v)$ are shown in terms of the restricted basis functions $b_h$ of the subset 400 shown in FIG. 4, although in most cases a basis set B of higher resolution is used. In example 502 the function $F_1(v)$ is represented as sixteen basis coefficients $f_{1,1}$ to $f_{1,16}$ scaling the sixteen restricted basis functions $b_1$ to $b_{16}$. The same is true for examples 504, 506, and 508, which illustrate functions $F_2(v)$, $F_3(v)$, and $F_4(v)$, respectively.

The meaning of the wavelet domain representation of the function $F_i(v)$ will now be described. The mother basis functions are defined for the support <0,0,0>, which covers the entire diagram. Therefore, the basis coefficients of the mother basis functions provide information about the entire function $F_i(v)$. Specifically, the shape of the mother scaling basis function $\phi^0$ represents an average over the entire diagram, and the shapes of the mother wavelet functions $\psi_1^0$, $\psi_2^0$, and $\psi_3^0$ represent horizontal, vertical, and diagonal steps, respectively, from the mother scaling basis function $\phi^0$ over the entire diagram. Therefore, the basis coefficient of the mother scaling basis function $\phi^0$ provides information about an average of the function $F_i(v)$, while the basis coefficients of the wavelet basis functions $\psi_1^0$, $\psi_2^0$, and $\psi_3^0$ provide information about horizontal, vertical and diagonal differences from average, respectively, over the entire function.

Supports <j,k,l> that are less than the entire diagram represent distinct portions of the function $F_i(v)$ represented by the diagram. Therefore, the basis coefficients of basis functions for supports <j,k,l> other than <0,0,0> provide information about the portion of the function $F_i(v)$ represented by the support, and the basis function type indicates the type of information that is provided. Specifically, the basis coefficients of the wavelet basis functions $\psi_{1_{kl}}^j$, $\psi_{2_{kl}}^j$, $\psi_{3_{kl}}^j$, provide information about horizontal, vertical, and diagonal differences, respectively from the average over the portion of the function $F_i(v)$ represented by the support. The scaling basis functions $\phi_{kl}^j$ do not have basis coefficients because the wavelet transform represents the function $F_i(v)$ in terms of the restricted bases, as discussed above.

While the basis coefficients of basis functions at finer or higher scales j provide information about smaller portions of the function $F_i(v)$, the information that is provided is more detailed or resolved. For example, in FIG. 2, the wavelet basis function $\psi_{3_{00}}^1$ has a support that is smaller than the support of the mother wavelet basis function $\psi_3^0$, indicating that a basis coefficient of the wavelet basis function $\psi_{3_{00}}^1$ provides information about a smaller portion of the function $F_i(v)$ than the basis coefficient of the mother wavelet function $\psi_{3_{00}}^1$; however, the diagonal difference from average represented by the basis coefficient of the wavelet basis function $\psi_{3_{00}}^1$ is more resolved than the diagonal difference from the average represented by the basis coefficient of the mother wavelet function $\psi_3^0$, as visually indicated by the increased resolution in the diagram.

With reference back to FIG. 1, in block 104 the integral u of the product of the plurality of functions is represented in the wavelet domain as the sum of a series of contributing products, each contributing product including a plurality of basis coefficients and one integral coefficient. Such a representation is achieved by simplifying the wavelet domain representation of the integral u shown in equation (3). An $N^{th}$ order basis product $P^N$ is defined as the product of N arbitrary basis functions $b_g$:

$$P_{b_1,b_2,\ldots,b_N}^N = \prod_{g=1}^{N} b_g(v) \tag{8}$$

and an $N^{th}$ order integral coefficient $C^N$ is defined as the integral of the $N^{th}$ order basis product $P^N$:

$$C_{b_1,b_2,\ldots,b_N}^N = \int P_{b_1,b_2,\ldots,b_N}^N dv = \int \prod_{g=1}^{N} b_g(v) dv \tag{9}$$

Substituting equation (9) into equation (3), the integral of the product of the plurality of functions is expressed in the wavelet domain according to equation (10):

$$u = \int \prod_{i=1}^{N} \sum_{h_i=1}^{M} [f_{i,h_i} \cdot b_{h_i}(v)] dv \tag{10}$$

$$= \sum_{h_1=1}^{M} \sum_{h_2=1}^{M} \cdots \sum_{h_N=1}^{M} \left[ \prod_{i=1}^{N} f_{i,h_i} \cdot \int \prod_{i=1}^{N} b_{h_i}(v) dv \right]$$

$$= \sum_{h_1=1}^{M} \sum_{h_2=1}^{M} \cdots \sum_{h_N=1}^{M} \left[ \prod_{i=1}^{N} f_{i,h_i} \cdot C_{b_{h_1},b_{h_2},\ldots,b_{h_N}}^N \right]$$

$$= [f_{1,1} \cdot f_{2,1} \cdot \ldots \cdot f_{N,1} \cdot C_{b_1,b_1,\ldots,b_1}^N ] +$$
$$[f_{1,2} \cdot f_{2,1} \cdot \ldots \cdot f_{N,1} \cdot C_{b_2,b_1,\ldots,b_1}^N ] + \ldots +$$
$$[f_{1,M} \cdot f_{2,M} \cdot \ldots \cdot f_{N,M-1} \cdot C_{b_M,b_M,\ldots,b_{M-1}}^N ] +$$
$$[f_{1,M} \cdot f_{2,M} \cdot \ldots \cdot f_{N,M} \cdot C_{b_M,b_M,\ldots,b_M}^N ]$$

In other words, the integral of the product of the plurality of functions u is represented in the wavelet domain as the sum of a series of contributing products. Each contributing product in the series is the product of multiple basis coefficients and one $N^{th}$ order integral coefficient $C^N$, the multiple basis coefficients including one basis coefficient $f_{i,h}$ from each of the N functions, and the $N^{th}$ order integral coefficient $C^N$ being the integral of the product of the basis functions $b_h(v)$ that correspond to those basis coefficients $f_{i,h}$. One contributing product appears in the series for each combination of N basis coefficients $f_{i,h}$ having one coefficient from each of the N functions, such that a total of $M^N$ contributing products appear in the series. It should be noted that in the basis coefficient $f_{i,h}$, h is an integer from 1 to M and i is an integer from 1 to N, M being the number of basis functions $b_h$ used to represent the function $F_i(v)$ and N being the number of functions $F_i(v)$ whose product is being integrated.

FIG. 6 is a diagram illustrating the wavelet domain representation of the integral u of the product of the example functions of FIG. 5. In example 600, the example functions $F_1$, $F_2$, $F_3$, and $F_4$ of examples 502, 504, 506, and 508 are inserted into equation (10). The integral u of the product of the functions is represented in the wavelet domains the sum of a series of $16^4$ contributing products, but for illustrative purposes, only three of these contributing products 602, 604, and 606 are shown in example 600. Each product 602, 604, and 606 includes four basis coefficients 608, one from each of the functions $F_1$, $F_2$, $F_3$, and $F_4$, and one $4^{th}$ order integral coefficient 610, which is the integral of the basis functions that correspond to the basis coefficients 608. For example, the four basis coefficients 608 in the product 602 are the basis coefficient $f_{1,1}$ from the function $F_1$, the basis coefficient $f_{2,1}$ from the function $F_2$, the basis coefficient $f_{3,1}$ from the function $F_3$, and the basis coefficient $f_{4,1}$ from the function $F_4$. Each of these basis coefficients corresponds to the basis function labeled $b_1$ in FIG. 4, which is the mother scaling basis function $\phi^0$, as shown in FIG. 4. Therefore, the $4^{th}$ order integral coefficient 610 in the product 602 is the integral of the product of four mother scaling basis functions $\phi^0$, as shown in example 612 of FIG. 6. The example product 604 is the product for the combination of basis coefficients that includes the basis coefficient $f_{1,6}$ from the function $F_1$, the basis coefficient $f_{2,2}$ from the function $F_2$, the basis coefficient $f_{3,11}$ from the function $F_3$, and the basis coefficient $f_{4,7}$ from the function $F_4$. Therefore, as shown in example 614 of FIG. 6, the $4^{th}$ order integral coefficient 610 in the product 604 is the integral of the product of the basis functions labeled $b_6$, $b_2$, $b_{11}$, and $b_7$ in FIG. 4. The example product 616 follows the same form.

In block 106, the basis functions are organized in a basis function tree, and the basis coefficients of each function are placed in a basis coefficient tree. The basis function tree is described first, because its organization informs the organization of the basis coefficient tree.

The basis function tree organizes basis functions based on parent-child relationships among the basis functions. The mother scaling function $\phi^0$ is defined as the parent of all other basis functions, and is defined as the immediate parent of the mother wavelet functions $\psi_1^0$, $\psi_2^0$, and $\psi_3^0$. For all other basis functions, the basis function is a parent basis function of a child basis function if the scale j of the parent basis function is less than the scale j of the child basis function and the support <j,k,l> of the parent basis function completely covers the support <j,k,l> of the child basis function, meaning the parent basis function is positionally located in the diagram with respect to the x-y coordinate system in every (x, y) position occupied by the child basis function. The parent basis function of support <j,k,l> is an immediate parent of the child basis function if the child basis function has scale (j+1) and is located at spatial positions (2k, 2l), (2k+1, 2l), (2k, 2l+1), and (2k+1, 2l+1). Based on the definitions above, a child basis function may have more than one immediate parent basis function, and further, the immediate parent basis functions may be a different mother basis function type than the child basis function. For example, with reference to FIG. 2, the scaling basis function $\phi_{00}^1$, is one of the immediate parent basis functions of the wavelet basis function $\psi_{1_{00}}^2$, because the scale of the wavelet basis function $\psi_{1_{00}}^2$ is one greater than the scale of the scaling basis function $\phi_{00}^1$, and the support of the scaling basis function $\phi_{00}^1$ completely covers the support of the wavelet basis function $\psi_{1_{00}}^2$.

Figure 7:
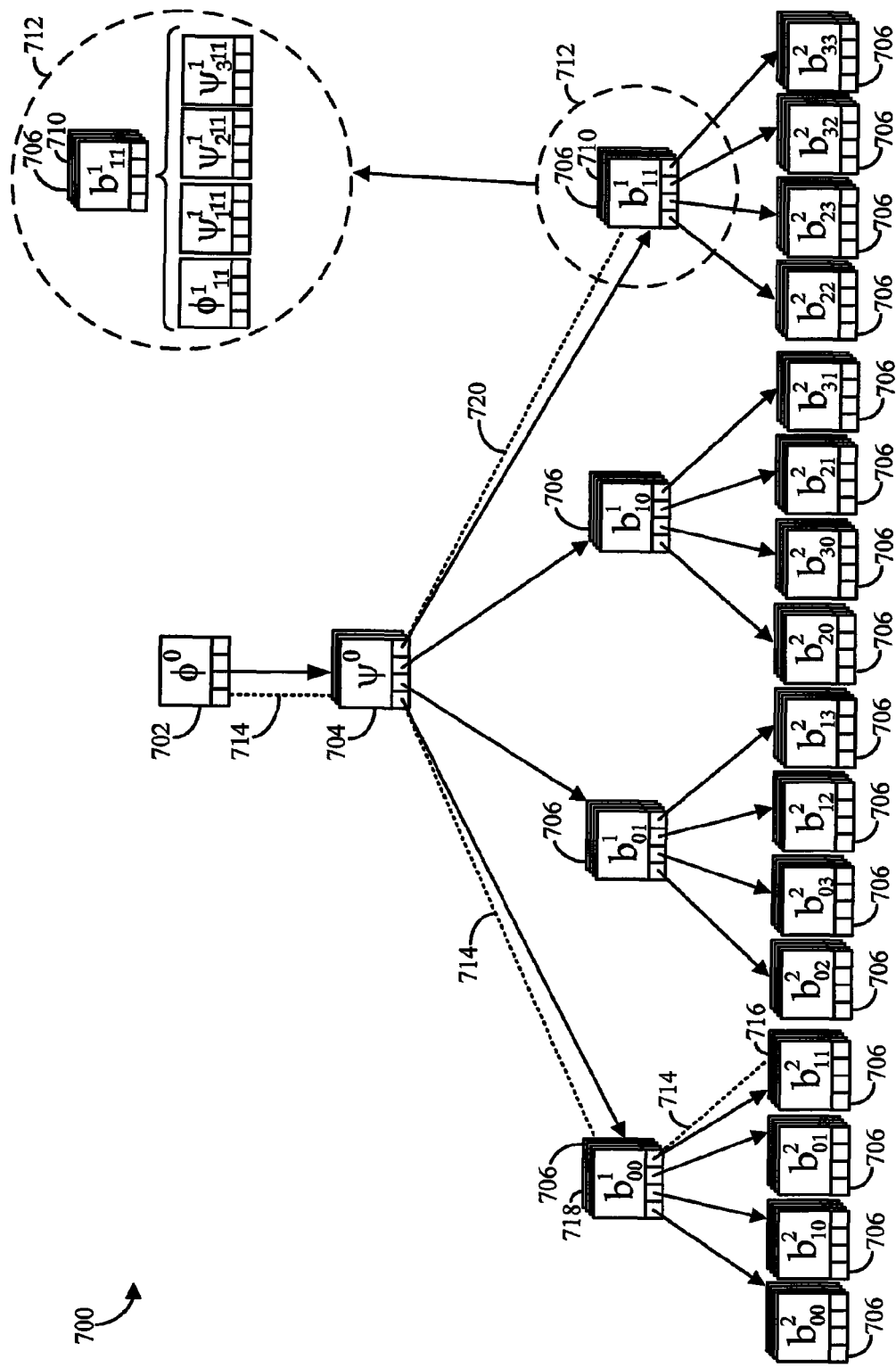
FIG. 7 is a diagram illustrating an example basis function tree for the basis set as shown in FIG. 2.

For example, FIG. 7 is the diagram illustrating an example basis function tree 700 for the basis set 200 shown in FIG. 2. The mother scaling basis function $\phi^0$ lies in a root 702 of the tree 700, indicating its status as the parent of all basis functions in the set 200. A mother node 704 immediately depends from the root 702 and includes the three mother wavelet functions $\psi_1^0$, $\psi_2^0$, and $\psi_3^0$, indicating their status as the immediate children of the mother scaling basis function $\phi^0$. Below the mother node 704 in which the three mother wavelet functions $\psi_1^0$, $\psi_2^0$, and $\psi_3^0$ lie, basis functions are organized in child nodes 706, each child node 706 corresponding to a unique support <j,k,l> and including the four basis functions that are defined for the support. The four basis functions in the child node 706 are generally represented by $b_{kl}^j$, where b generally denotes a basis function, j denotes the scale of the basis function, and (k, l) denotes the spatial translation. For example, the basis functions in child node 710 are represented by the symbol $b_{11}^1$, indicating the node includes all four basis functions defined on the support <1,1,1>, as shown in the key 712.

Because the child nodes 706 are organized according to parent-child relationship, any basis function in any child node 706 is an immediate child basis function of the basis functions in the node from which the child node 706 depends. For example, each basis function in the child node 710 is the immediate child basis function of each of the mother wavelet functions in the mother node 704. Further, if any basis function in a child node 706 is a parent basis function, its corresponding child basis functions are located in child nodes 706 depending from it, and if the basis function in the child node 706 is an immediate parent basis function, its corresponding immediate child basis functions are located in the child nodes 706 immediately depending from it. For example, in FIG. 7 the child node 710 has four child nodes 706 immediately depending from it, indicating that each of the four basis functions defined on the support <1,1,1> is an immediate parent basis function of each of the basis functions defined on supports <2,2,2>, <2,3,2>, <2,2,3>, and <2,3,3>.

As shown, the basis function tree 700 includes all of the basis functions of the basis set 200 shown in FIG. 2, which has a resolution n of 3. Of course, the basis function tree 700 may have greater or fewer child nodes 706 depending on the resolution n.

A direct path through the basis function tree 700 connects the node in which a child basis function lies to the node in which its parent basis function lies. The direct path traces from the child basis function to the parent basis function passing through any nodes including the immediate parent basis functions. For example, in FIG. 7, a direct path 714 exists from the child basis function $\psi_{1_{11}}^2$ in the child node 716 to the mother scaling function $\phi^0$ at the root 702. The child basis function $\psi_{1_{11}}^2$ in the child node 716 has as immediate parents all of the basis functions in the child node 718, including basis functions $\phi_{00}^1$, $\psi_{1_{00}}^1$, $\psi_{2_{00}}^1$, and $\psi_{3_{00}}^1$, which in turn have the mother wavelet functions $\psi_1^0$, $\psi_2^0$, and $\psi_3^0$ in the mother node 704 as immediate parents, which in turn having the mother scaling function $\phi^0$ in the root 702 as an immediate parent. However, the direct path need not extend all the way to the mother scaling function $\phi^0$ in the root 702. For example, the scaling basis function $\phi_{11}^1$ is a child basis function of the mother wavelet function $\psi_2^0$, as indicated by the direct path 720 connecting the child node 710 to the mother node 704.

The basis coefficient tree has the same nodes as the corresponding basis function tree. However, instead of organizing basis functions according to parent-child relationship, the basis coefficient tree organizes basis coefficients. Each basis coefficient is in the node of the basis coefficient tree that corresponds to the node occupied by its corresponding basis function in the basis function tree. Therefore, the basis coefficient tree has the same nodes positioned with respect to each other in the same manner as the basis function tree. Unlike the basis function tree, however, in the basis coefficient tree the child nodes include at most three basis coefficients, the child scaling functions not having basis coefficients because the wavelet transform projects the function onto the restricted bases.

Figures 8, 11:
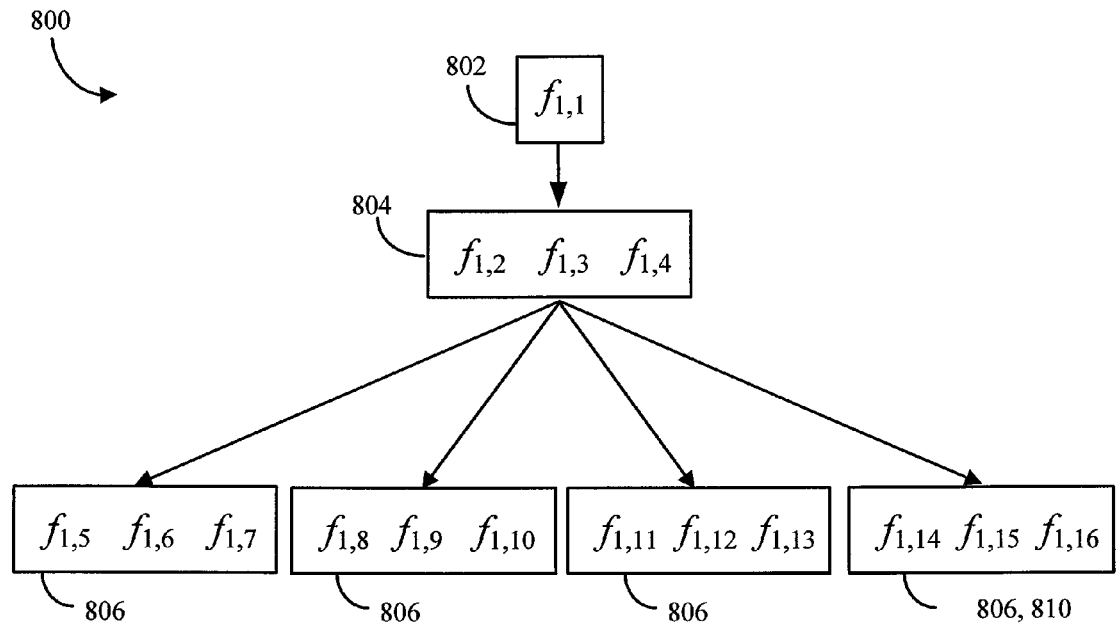
FIG. 8 is a diagram illustrating an example basis coefficient tree.
FIG. 11 is a table that tabulates the basis function type of the basis function appearing in the product of a plurality of basis functions.

For example, FIG. 8 is a diagram illustrating an example basis coefficient tree 800, which organizes the basis coefficients for the function $F_1(v)$ shown in example 502 of FIG. 5. Because the basis coefficient $f_{1,1}$ corresponds to the mother scaling basis function $\phi^0$, the basis coefficient $f_{1,1}$ lies in a root 802 of the basis coefficient tree 800. The basis coefficients $f_{1,2}$, $f_{1,3}$, and $f_{1,4}$ correspond to the three mother wavelet functions $\psi_1^0$, $\psi_2^0$, and $\psi_3^0$, and therefore these basis coefficients lie in a mother node 804 that immediately depends from the root 802. Below the mother node 804, basis coefficients are organized in child nodes 806, each child node 806 corresponding to a unique support <j,k,l> and including the three basis coefficients that correspond to the wavelet basis functions $\psi_{1_{kl}}^j$, $\psi_{2_{kl}}^j$, $\psi_{3_{kl}}^j$ defined for the support. For example, the child node 810 in the basis coefficient tree 800 includes the three basis coefficients $f_{1,14}$, $f_{1,15}$, and $f_{1,16}$ that corresponds to the three wavelet basis functions $\psi_{1_{11}}^1$, $\psi_{2_{11}}^1$, $\psi_{3_{11}}^1$ defined for the support <1, 1, 1> in the child node 710 of FIG. 7.

As shown, the basis coefficient tree 800 includes one basis coefficient for each restricted basis function of the basis set shown in FIG. 4. Of course, the basis coefficient tree 800 may have greater or fewer child nodes 806 depending on the resolution n of the basis set, and usually a basis set of higher resolution will be used.

With reference back to block 106 of FIG. 1, the basis coefficients of the function $F_i(v)$ are placed in the basis coefficient tree. In some embodiments, one basis coefficient tree is defined for each function $F_i(v)$, such that a total of N basis coefficients trees are defined for the N functions whose product is being integrated. In other embodiments, a greater number of basis coefficient tree can be used.

In block 108, the $N^{th}$ order integral coefficients $C^N$ are determined, one $N^{th}$ order integral coefficient $C^N$ appearing in each contributing product in the sum of the series of contributing products that determines the integral u. As mentioned above, only contributing products that include nonzero $N^{th}$ order integral coefficients $C^N$ contribute to the result u in equation (10), but when two-dimensional, nonstandard Haar basis functions are used to represent the functions $F_i(v)$, many of the $N^{th}$ order integral coefficients $C^N$ are zero. If the integral coefficient is zero, the entire contributing product is zero and does not contribute to the integral. If the integral coefficient is not zero, its value should be determined so that the contribution of the contributing product to the integral u is considered. For example, in FIG. 6 each of the example products 602, 604, and 606 includes four basis coefficients and one $4^{th}$ order integral coefficients $C^4$. If the $4^{th}$ order integral coefficient is zero, the product 602, 604, or 606 does not contribute to the integral u. Therefore, a set of principles for determining the $N^{th}$ order integral coefficient $C^N$ are described below with reference to FIGS. 9-13.

Figure 9:
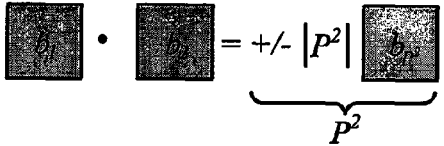
FIG. 9 is a diagram illustrating example products of two basis functions, and an example equation for calculating such products.

FIG. 9 is a diagram illustrating example products of two basis functions, and an example equation for calculating such products. As shown in equation (11), a product $P^2$ of two basis functions $b_1$ and $b_2$ is another basis function $b_{P^2}$ scaled by a sign +/−, which may be positive or negative, and a magnitude $|P^2|$, which may be zero:

$$P^2 = b_1 \cdot b_2 = +/- |P^2| b_{P^2} \quad (11)$$

The product $P^2$ of the two basis functions is not zero if the support of one of the basis functions completely covers the support of the other basis function, as shown in examples 901 through 915. As mentioned above, the support of one basis function completely covers the support of another basis function if the one basis function is positionally located in the diagram with respect to the x-y coordinate system in every (x, y) position occupied by the other basis function. In other words, the product $P^2$ of two basis functions is non-zero if and only if either there is a direct path in the basis function tree between the nodes occupied by the two basis functions, meaning the two basis functions are related as parent and child, or the two basis functions lie in the same node of the basis function tree, meaning the two basis functions have the same support. Otherwise, when the support of neither basis function completely covers the support of the other basis function, the product $P^2$ of two basis functions is zero, as shown in examples 916, 917, and 918. In other words, the product $P^2$ of two basis functions is zero if the supports of the two basis functions are completely disjoint.

In cases in which the product $P^2$ is not zero, the sign, magnitude, and basis function of the product $P^2$ can be determined from the characteristics of the two basis function being multiplied together. For example, the product of two identical wavelet basis functions of the same support is the scaling basis function of the same support, scaled by a magnitude $2^j$, as shown in examples 901, 902, and 903 and in equation (12).

$$\psi_{kl}^j \cdot \psi_{kl}^j = 2^j \phi_{kl}^j \quad (12)$$

The product of two different wavelet basis functions of the same support is the third wavelet basis function of the same support, scaled by a magnitude $2^j$, as shown in examples 904, 905, and 906 and in equations (13):

$$\psi_{1kl}^j \cdot \psi_{2kl}^j = 2^j \psi_{3kl}^j$$
$$\psi_{2kl}^j \cdot \psi_{3kl}^j = 2^j \psi_{1kl}^j$$
$$\psi_{3kl}^j \cdot \psi_{1kl}^j = 2^j \psi_{2kl}^j \quad (13)$$

The product of a scaling basis function of a given support and a wavelet basis function of the same support is the wavelet basis function of the same type and support, scaled by a magnitude $2^j$, as shown in examples 907, 908, and 909 and in equation (14):

$$\phi_{kl}^j \cdot \psi_{kl}^j = 2^{2j} \psi_{kl}^j \quad (14)$$

The product of two scaling basis functions of the same support is the scaling basis function of the same support, scaled by a magnitude $2^j$, as shown in examples 910, 911, and 912 and in equation (15):

$$\phi_{kl}^j \cdot \phi_{kl}^j = 2^j \phi_{kl}^j \quad (15)$$

The product of a child basis function and a parent basis function is the child basis function, scaled by a sign +/− and a magnitude $2^j$, where the sign is the same as the sign of the portion of the support of the parent basis function that the support of the child basis function covers, and where the magnitude $2^j$ is a function of the scale j of the parent basis function, as shown in examples 913, 914, and 915 and in equation (16):

$$b_{kl}^{j+1} \cdot b_{kl}^j = +/- 2^j b_{kl}^{j+1} \quad (16)$$

For example, in example 913, the sign of the product is negative, because the support of the child basis function covers a portion of the support of the parent basis function that is negative, where the diagram is black. The magnitude of the product is one, because the scale j of the parent basis function is zero. However, in example 915, the sign of the product is positive, because the support of the child basis function covers a portion of the support of the parent basis function that is positive, where the diagram is white.

The examples shown in FIG. 9 illustrate basis functions of the basis set 200 as shown in FIG. 2, but the principles outlined generally apply to all basis functions, including basis functions that are not shown in FIG. 2. Additionally, the principles outlined generally can be applied to determine the product of more than two basis functions, as described below.

Figure 10:
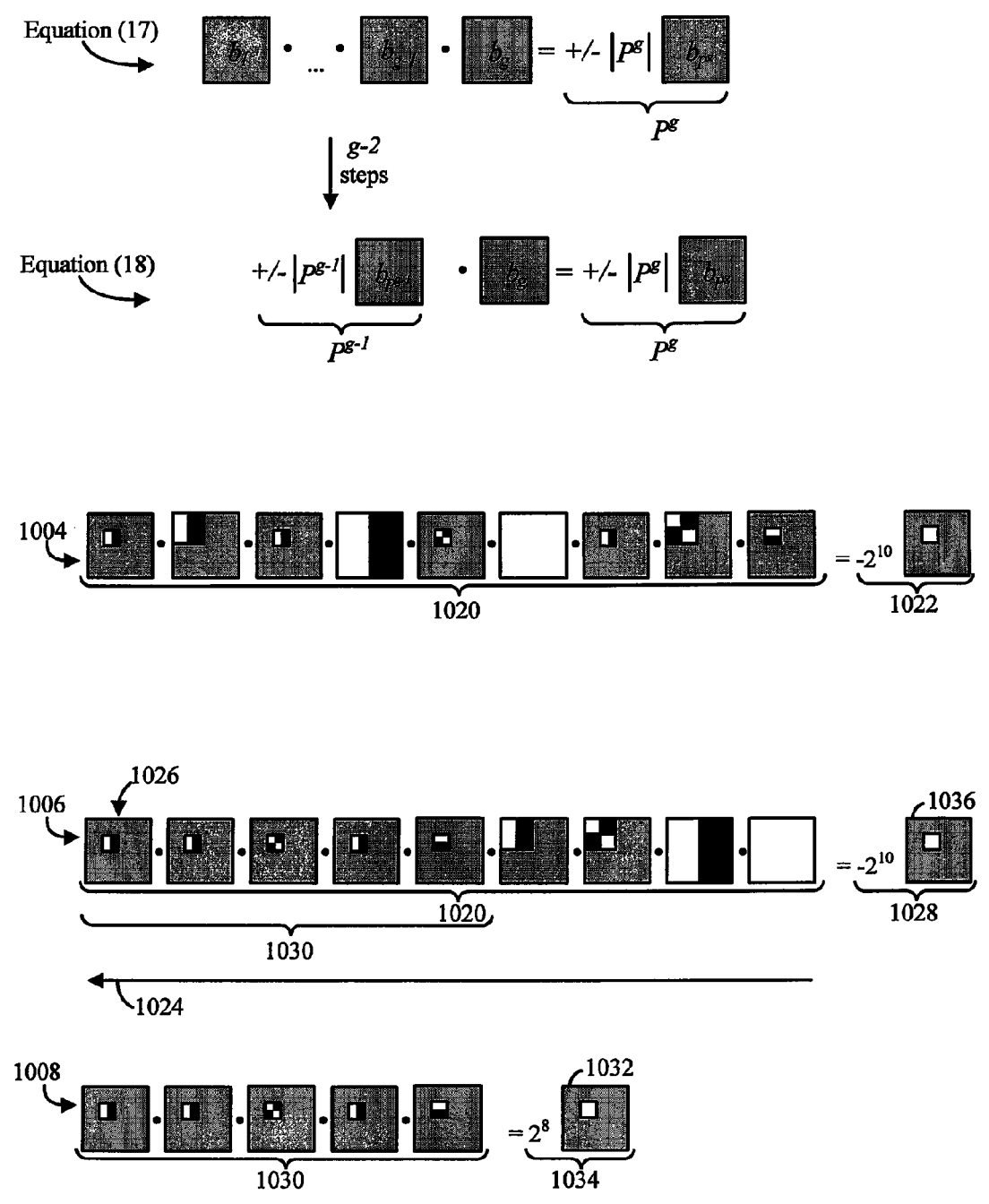

FIG. 10 is a diagram illustrating example products of more than two basis functions, and example equations for calculating such products. Just as with the product $P^2$ of two basis functions, a product $P^g$ of g basis functions $b_1, \ldots b_{g-1}, b_g$ is another basis function $b_{P^g}$ scaled by a sign, which may be positive or negative, and a magnitude $|P^g|$, which may be zero, as shown in equation (17):

$$P^g = b_1 \cdot \ldots \cdot b_{g-1} \cdot b_g = +/- |P^g| b_{P^g} \quad (17)$$

The product $P^g$ of g basis functions can be calculated by multiplying two of the basis functions together to produce a product $P^2$, as described above with reference to FIG. 9. The product $P^2$ can then be multiplied by the next basis function in the set of g basis functions. After (g−2) products have been calculated, the set of g basis functions is reduced to a set of two basis functions: one being the product $P^{g-1}$ and the other being the basis function $b_g$, as shown in equation (18), below:

$$P^g = (+/- |P^{g-1}| b_{P^{g-1}}) \cdot b_g = +/- |P^g| b_{P^g} \quad (18)$$

The product $P^g$ is zero if the product $P^2$ of any two basis functions in the set of g basis functions is zero. As described above, the product $P^2$ of any two basis functions is non-zero if the two basis functions are related as parent and child or if the two basis functions have the same support. Therefore, the product $P^g$ is non-zero if and only if each basis functions in the set of g functions lies in a node that is on a direct path through the basis function tree to the node occupied by every other basis function in the set of g basis functions. In other words, the product $P^g$ is non-zero if and only if all of the basis functions lie in nodes that are on a single direct path through the basis function tree. Otherwise, the product $P^g$ of g basis functions is zero.

For example, an arbitrary set of basis functions 1020 is shown in example 1004 of FIG. 10. The basis functions lie on a single direct path 614 through the basis function tree 600 in FIG. 6. Therefore, the product 1022 of the set of basis functions 1020 is not zero, as shown in FIG. 10.

Determining the product $P^g$ is facilitated by placing the basis functions in a ranking order. Basis functions having finer scales are positioned in earlier positions in the ranking order than basis functions having coarser scales, and among basis functions having the same scale, wavelet basis functions of a given scale are positioned in earlier positions in the ranking order than the scaling basis function of that scale. As a result, a basis function having a finest scale $j_o$ of the set of g functions appears in an earliest position in the ranking order. It should be noted that the term "finer scale" means a scale that is numerically greater than another "coarser scale", the terms finer and coarser denoting the resolution with which such basis functions are able to represent entities in the wavelet domain.

For example, the set of basis functions 1020 is organized in an arbitrary order in example 1004, and the same set of basis functions 1020 is organized in the ranking order in example 1006. An arrow 1024 moves in the direction of earlier positions in the ranking order, and terminates at an earliest position 1026 occupied by one of the basis functions having the finest scale $j_o$, which in the set 1020 happens to be a scale j of 2. In the example 1006, the earliest position 1026 in the ranking order is the position that is farthest to the left on the page, although any position on the page can be defined as the earliest position as long as the basis functions are positioned relative to each other according to the rule defined above.

Because the multiplication of basis functions is commutative, organizing the set of g basis functions in the ranking order does not change the product $P^g$, as can be seen by comparing the product 1022 in example 1004 with the product 1028 in example 1006. However, organizing the basis functions in the ranking order does facilitate determining the sign, the magnitude $|P^g|$, and the basis function $b_{P^g}$ of the product $P^g$.

In cases in which the product $P^g$ is not zero, the magnitude of the product $P^g$ can be determined using equation (19):

$$P^g = +/- 2^{\Sigma_j - j_o} \qquad (19)$$

where $$\sum_j$$

is the determined by taking the sum of the scale of each basis function in the set of g functions and then subtracting the finest scale $j_o$ appearing in the set of g functions. As noted above, the finest scale $j_o$ is the scale of at least the basis function appearing in the earliest position 1026 in the ranking order. The sign can be determined by multiplying together a series of signs, the series of signs including one sign for each parent basis function in the product $P^g$, the sign for the parent basis function being the sign of the portion of the support of the parent basis function that is covered by its child basis functions. It should be noted that a negative magnitude effects a reversal of the colors in the diagram because, as mentioned above, the diagram is white where the magnitude is positive, black where the magnitude is negative, and gray where the magnitude is zero.

For example, in example 1006, the set of basis functions 1020 includes five basis functions having a scale j of 2, two basis functions having a scale j of 1, and two basis functions having a scale j of 0. The finest scale $j_o$ appearing in the set of basis functions 1020 is j of 2, which is the scale of the basis function in the earliest position 1026. Therefore, the magnitude of the product 1028 is $|P^n| = 2^{((2+2+2+2+2+1+1+0+0)-2)}$. A negative portion of the support of the parent basis function $\psi_{1_{00}}^1$ is covered by the supports of its child basis functions. A positive portion of the support of the parent basis function $\psi_{3_{00}}^1$ is covered by the supports of its child basis functions. A positive portion of the support of the parent basis function $\psi_1^0$ is covered by the supports of its child basis functions, and a positive portion of the support of the parent basis function $\phi^0$ is covered by the supports of its child basis functions. Therefore, the sign of the product 1028 is negative, or $(-) \cdot (+) \cdot (+) \cdot (+) = (-)$.

The basis function $b_{P^g}$ of the product $P^g$ can be determined by isolating the subset of m basis functions having the finest scale $j_o$, and taking the product $P^m$ of the basis functions in the subset. In cases in which the product $P^g$ is not zero, the basis function $b_{P^g}$ appearing in the product $P^g$ is the same as the basis function $b_{P^m}$ appearing in the product $P^m$ of the subset of m basis functions having the finest scale $j_o$. This result occurs because the product of a child basis function and a parent basis function is the child basis function, scaled by a sign and a magnitude, as explained above with reference to examples 913 through 916 of FIG. 9.

For example, in example 1006, the finest scale $j_o$ in the set of basis functions 1020 is a scale of $j_o$ of 2, and the subset 1030 includes all of the basis functions having this scale. In example 1008, the product of the basis functions in the subset 1030 is taken. The basis function 1032 of the product 1034 that results is the scaling basis function $\phi_{11}^2$ and therefore the basis function 1036 of the product 1028 is also the scaling basis function $\phi_{11}^2$, as shown in example 1006.

Alternatively, the basis function $b_{P^g}$ appearing in the product $P^g$ of g basis functions can be determined from the supports $<j,k,l>$ and basis function types of the basis functions in the subset of m basis functions having the finest scale $j_o$. In cases in which the product $P^g$ is not zero, the support of the basis function $b_{P^g}$ appearing in the product $P^g$ is the same as the support of the m basis functions having the finest scale $j_o$. Note that each basis function in the subset of m basis functions having the finest scale $j_o$ has the same support $<j_o,k,l>$; otherwise, at least two basis functions would not lie on a direct path through the basis function tree and their product $P^2$ would necessarily be zero, causing the product $P^g$ of the set of g basis functions to also be zero.

The basis function type of the basis function $b_{P^g}$ appearing in the product $P^g$ can be determined from the parities of three numbers, each number corresponding to one wavelet function type and being the aggregate number of times the wavelet function type appears in the subset of m basis functions having the finest scale $j_o$. FIG. 11 is a table that tabulates the basis function type of the basis function $b_{P^g}$ appearing in the product $P^g$ as a function of the parity of the aggregate number of each wavelet function type in the subset of m basis functions having the finest scale $j_o$. It should be noted that, for the purposes of this disclosure, the parity of zero is considered to be even.

For example, in example 1006, each basis function in the subset of basis functions 1030 having the finest scale $j_o$ has the support <2,1,1>, and therefore the basis function 1036 appearing in the product 1028 has the support <2,1,1>. The subset of basis functions 1030 includes three basis functions of wavelet function type $\psi_1$, one basis function of wavelet function type $\psi_2$, and one basis function of wavelet function type $\psi_3$. The aggregate number of wavelet function type $\psi_1$ is three, and the parity of this aggregate number is odd. The aggregate number of wavelet function type $\psi_2$ is one, and the parity of this aggregate number is odd. The aggregate number of wavelet function type $\psi_3$ is one, and the parity of this aggregate number is odd. Therefore, according to FIG. 11 the basis function type of the product $P^g$ is the scaling basis function $\phi$, which is the basis function 1036 appearing in the product 1028 in example 1006.

Regarding the integral of basis functions, the integral of any one of the wavelet basis functions $\psi_1$, $\psi_2$, or $\psi_3$ is zero, as shown in equation (20):

$$\iint \psi_{kl}^j dx dy = 0 \quad (20)$$

However, the integral of a scaling basis function $\phi$ is $2^{-j}$, as shown in equation (21):

$$\iint \phi_{kl}^j dx dy = 2^{-j} \quad (21)$$

Figure 12:
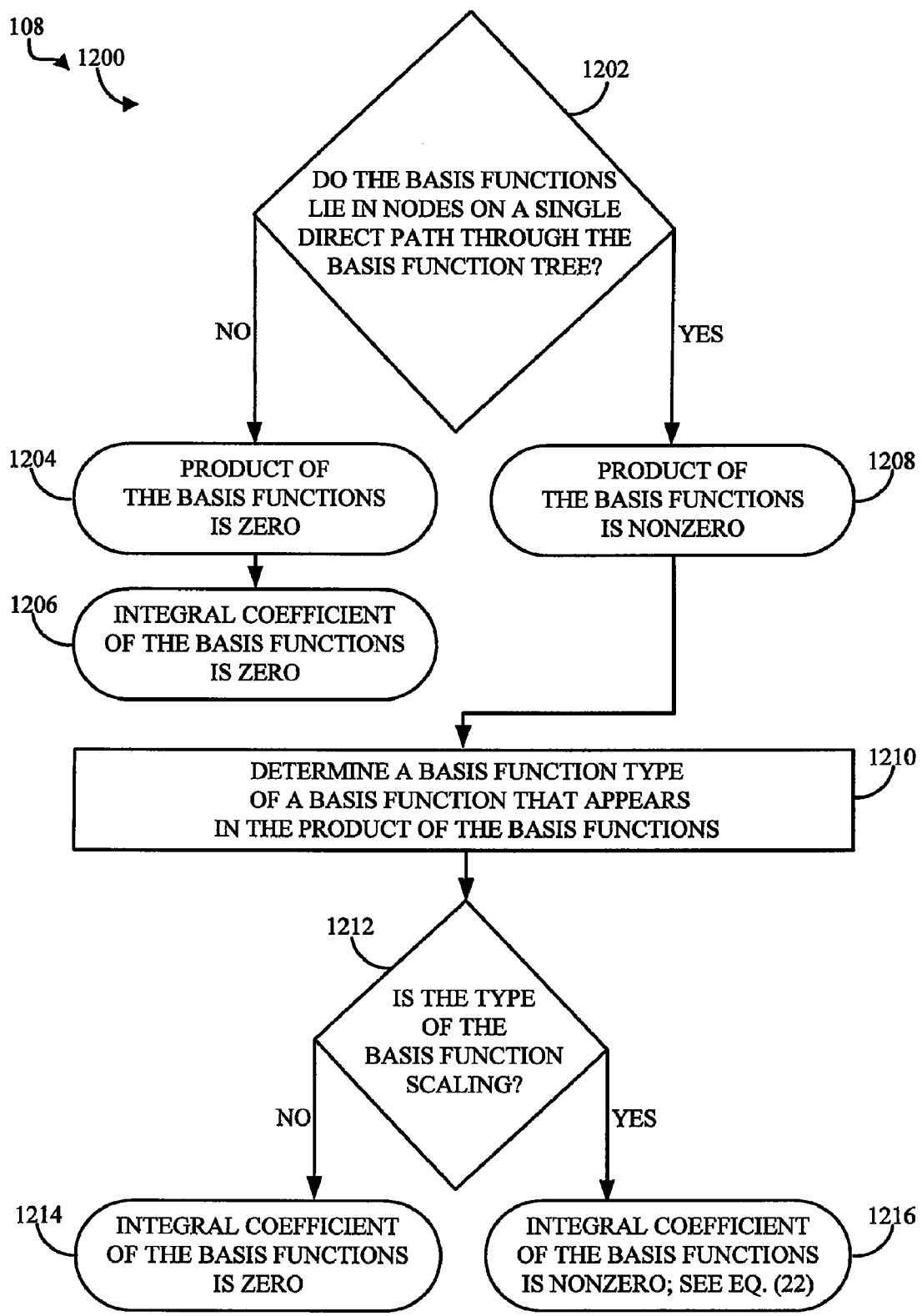
FIG. 12 is a block diagram illustrating an embodiment of a method of determining an $N^{th}$ order integral coefficient $C^N$.

Returning to block 108 of FIG. 1, the $N^{th}$ order integral coefficient $C^N$ is determined for each contributing product appearing in the wavelet domain representation of the integral u. FIG. 12 is a block diagram illustrating an embodiment of a method 1200 for determining the $N^{th}$ order integral coefficient $C^N$, the method employing the principles described above with reference to FIGS. 7-11. In block 1202, it is determined whether the N basis functions $b_h$ that appear in the product $P^N$ lie in nodes on a single direct path through the basis function tree. If the N basis functions $b_h$ do not lie in nodes on a single direct path, the product $P^N$ of the N basis functions is zero, as shown in block 1204. In such case, the $N^{th}$ order integral coefficient $C^N$ is also zero, as shown in block 1206. If the N basis functions $b_h$ do lie in nodes on a single direct path through the basis function tree, the product $P^N$ is nonzero, as shown in block 1208.

In cases in which the product $P^N$ is nonzero, the $N^{th}$ order integral coefficient $C^N$ is also nonzero if the basis function type of the basis function $b_{P^N}$ appearing in the product $P^N$ is a scaling basis functions $\phi$, according to equation (21). Otherwise, the basis function type is one of the wavelet basis functions $\psi_1$, $\psi_2$, or $\psi_3$ and the $N^{th}$ order integral coefficient $C^N$ is zero, according to equation (20). Therefore, in block 1210, the basis function type of the basis function $b_{P^N}$ appearing in the product $P^N$ is determined. In block 1212, it is asked whether the basis function type of the basis function $b_{P^N}$ appearing in the product $P^N$ is a scaling basis function $\phi$.

Figure 13:
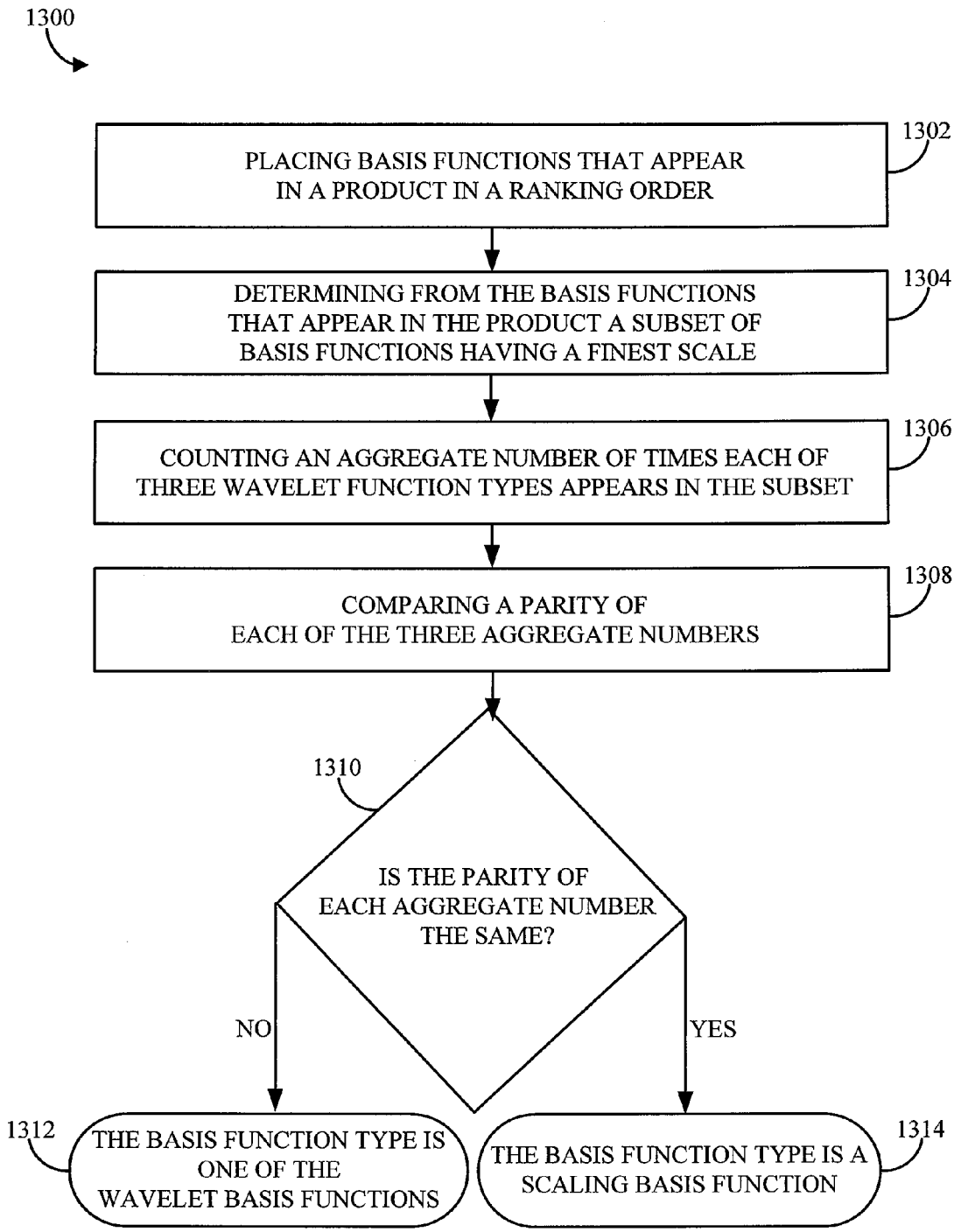
FIG. 13 is a block diagram illustrating an embodiment of a method for determining a basis function type of a basis function appearing in the product of a plurality of basis functions.

FIG. 13 is a block diagram illustrating an embodiment of a method 1300 for determining the basis function type of the basis function $b_{P^N}$ appearing in the product $P^N$. In block 1302, the N basis functions $b_h$ that appear in the product $P^N$ are placed in the ranking order, such as the ranking order described with reference to FIG. 10. In block 1304, a subset of m basis functions $b_h$ having a finest scale $j_o$ are isolated from the N basis functions that appear in the product $P^N$. In block 1306, the aggregate number of times each of the three wavelet function types appears in the subset of m basis functions are counted. In block 1308, the parity of each of the three aggregate numbers is compared. In block 1310, it is asked whether the parities of the three aggregate numbers are the same. If the parities of any of the three aggregate numbers is different from the other numbers, then the basis function $b_{P^N}$ of the product $P^N$ is one of the wavelet basis functions, as shown in block 1312. Specifically, the basis function $b_{P^N}$ of the product is the wavelet basis function that corresponds to the aggregate number having a parity that differs from the other two aggregate numbers. If the parities of each of the three numbers are the same, the basis function $b_{P^N}$ of the product $P^N$ is the scaling basis function $\phi$, as shown in block 1314.

Returning to FIG. 12, if the basis function type of the basis function $b_{P^N}$ appearing in the product $P^N$ is not the scaling basis function type, the $N^{th}$ order integral coefficient $C^N$ is zero, as shown in block 1214. If the type is the scaling basis function type, the $N^{th}$ order integral coefficient $C^N$ is nonzero, as shown in block 1216. In such a case, the nonzero value of the $N^{th}$ order integral coefficient $C^N$ is found using equation (22), which results from combining equations (19) and (21):

$$C^N_{b_1,b_2,\ldots,b_N} = +/- 2^{\Sigma_j - 2j_o} \quad (22)$$

In equation (22), $$\sum_j$$

is the sum of the N basis functions and $j_o$ is the finest scale of the N functions. The sign is determined by multiplying together a series of signs, the series of signs including one sign for each parent basis function in the product $P^N$, the sign for the parent basis function being the sign of the portion of the support of the parent basis function that is covered by its child basis functions, as described above.

The methods 1200 and 1300 can be implemented by computer. In such case, a system and/or a computer readable medium can be employed, the system and/or computer readable medium comprising logic configured to perform the steps of the method 1200 and/or 1300, as described in further detail below.

With reference back to FIG. 1, if the $N^{th}$ order integral coefficient $C^N$ is zero, the product that includes the $N^{th}$ order integral coefficient $C^N$ is eliminated from the sum of the series of contributing products in block 110. In block 112, if the $N^{th}$ order integral coefficient $C^N$ is nonzero, the product that includes the $N^{th}$ order integral coefficient $C^N$ is added to the sum of the series of contributing products. For example, in example 600 of FIG. 6 the integral of the product of the functions is represented as the sum of the series of contributing products that includes products 602, 604, and 606. In product 602, the basis coefficients correspond to basis functions that lie on a single direct path through the basis function tree, as shown in example 612. The number of each wavelet function type appearing in the subset of finest scale basis functions is zero, and according to FIG. 11 the basis function type of the basis function $b_{P^4}$ of the product $P^4_{b_1,b_1,b_1,b_1}$ is the scaling basis function $\phi$. Therefore, the $4^{th}$ order integral coefficient $C^4_{b_1,b_1,b_1,b_1}$ in the product 602 is not zero, meaning the product 602 contributes to the integral and should not be eliminated from the series of contributing products.

In product 604, the basis coefficients correspond to basis functions that do not lie on a single direct path through the basis function tree, as shown in example 614. Therefore, the product of the basis function is zero, and the corresponding $4^{th}$ order integral coefficient in the product 604 is zero, meaning the product 604 does not contribute to the integral and can be eliminated from the series of contributing products.

In product 606, the basis coefficients correspond to basis functions that lie on a single direct path through the basis function tree. Therefore, the product of the basis function is nonzero. However, the aggregate numbers of each wavelet function type are not all of the same parity, as shown in example 616. Therefore, the $4^{th}$ order integral coefficient appearing in the product 606 is zero, meaning the product 606 does not contribute to the integral and can be eliminated from the series of contributing products.

In some embodiments, the systems and methods disclosed herein can be implemented in software, firmware, hardware, or combinations thereof. Furthermore, the components of the systems and methods can reside on one computer system, or can be distributed among more than one computer system. In some embodiments, the systems and methods are implemented in software, as an executable program or programs, and are executed by a special or general-purpose digital computer, or combination of computers, such as a personal digital assistant (PDA) or personal computer (PC).

Reference is now made to FIG. 14, which is a block diagram illustrating a general-purpose computer system 1400 that can be used to implement embodiments of the systems and methods disclosed herein. Generally, in terms of hardware architecture, the computer 1401 includes a processor 1402, memory 1403, and one or more input or output (I/O) devices or peripherals 1404 that are communicatively coupled via a local interface 1405. The local interface 1405 can be, for example but not limited to, one or more buses or other wired or wireless connections, as is known in the art. The local interface 1405 may have additional elements (omitted for simplicity), such as controllers, buffers, drivers, repeaters, and receivers, to enable communications. Further, the local interface 1405 may include address, control, and data connections to enable appropriate communications among the aforementioned components.

The processor 1402 is a hardware device for executing software, particularly that stored in memory 1403. The processor 1402 can be any custom made or commercially available processor, a central processing unit (CPU), an auxiliary processor among several processors resulting from the computer 1401, a semiconductor based microprocessor (in the form of a microchip or chip set), a microprocessor, or generally any device for executing software instructions.

The memory 1403 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1403 may incorporate electronic, magnetic, optical, or other types of storage media. Note that the memory 1403 can have a distributed architecture, where various components are situated remote from one another, but can be accessed by the processor 1402.

The software in memory 1403 may include one or more separate programs, each of which comprises an ordered listing of executable instructions for implementing logical functions. In the example of FIG. 14, the software in the memory 1403 includes one or more components of the systems and methods disclosed here, and a suitable operating system 1406. The operating system 1406 essentially controls the execution of other computer programs, such as the systems and methods disclosed herein, file and data management, memory management, and communication control and related services.

The systems and methods disclosed herein may be a source program, executable program (object code), script, or any other function comprising a set of instructions to be performed. When a source program, the program needs to be translated via a compiler, assembler, interpreter, or the like, which may or may not be included within memory 1403, so as to operate properly in connection with the operating system 1406.

The peripherals 1404 may include input devices, for example but not limited to, a keyboard, mouse, scanner, microphone, etc. Furthermore, the peripherals 1404 may also include output devices, for example but not limited to, a printer, display, facsimile device, etc. Finally, the peripherals 1404 may further include devices that communicate both inputs and outputs, for instance but not limited to, a modulator/demodulator (modem; for accessing another device, system, or network), a radio frequency (RF) or other transceiver, a telephone interface, a bridge, a router, etc.

If the computer 1401 is a PC, workstation, or the like, the software in the memory 1403 may further include a basic input output system (BIOS). The BIOS is a set of essential software routines that initialize and test hardware at startup, start the operating system 1406, and support the transfer of data among the hardware devices. The BIOS is stored in the ROM so that the BIOS can be executed when the computer 1401 is activated.

When the computer 1401 is in operation, the processor 1402 is configured to execute software stored within the memory 1403, to communicate data to and from the memory 1403, and to generally control operations of the computer 1401 in accordance with the software. The systems and methods disclosed herein, in whole or in part, but typically the latter, are read by the processor 1402, and perhaps buffered within the processor 1402, and then executed.

It should be noted that the systems and methods disclosed herein can be stored on any computer readable medium for use by or in connection with any computer related system or method. In the context of this document, a "computer-readable medium" can be any means that can store, communicate, propagate, or transport the program for use by or in connection with the instruction execution system, system, or device. The computer-readable medium can be, for example but not limited to, an electronic, magnetic, optical, electromagnetic, infrared, or semiconductor system, system, device, or propagation medium. A non-exhaustive example set of the computer-readable medium would include the following: an electrical connection having one or more wires, a portable computer diskette, a random access memory (RAM), a read-only memory (ROM), an erasable programmable read-only memory (EPROM, EEPROM, or Flash memory), and a portable compact disc read-only memory (CDROM).

In an alternative embodiment, in which the systems and methods disclosed herein are implemented in hardware, they can be implemented with any or a combination of the following technologies, which are each well known in the art: a discrete logic circuit(s) having logic gates for implementing logic functions upon data signals, an application specific integrated circuit(s) (ASIC) having appropriate combinatorial logic gates, a programmable gate array(s) (PGA), a field programmable gate array(s) (FPGA), etc.

Any process descriptions or blocks in flowcharts should be understood as representing modules, segments, or portions of code which include one or more executable instructions for implementing specific logical functions or steps in the process. As would be understood by those of ordinary skill in the art of software development, alternate implementations are also included within the scope of the disclosure. In these alternate implementations, functions may be executed out of order from that shown or discussed, including substantially concurrently or in reverse order, depending on the functionality involved.

Implementing the method 100 described above using a computer may be computationally expensive, for example, on the order of $O(M^N N)$, where M is the number of basis functions used to represent each function and N is the number of functions whose product is being integrated. FIG. 15 is a table illustrating seven cases that facilitate determining the $N^{th}$ order integral coefficient $C^N$ using a recursive approach. The seven cases are used to construct tree-traversal algorithms for determining the integral u of the product of the plurality of functions. The tree-traversal algorithms may be relatively less computationally complex than the method 100, and therefore relatively faster when implemented by computer.

The seven cases of FIG. 15 apply in cases in which the product of more than two functions N is being integrated. In such cases, the $N^{th}$ order integral the coefficient $C^N$ can be determined by placing the basis functions appearing in the product $P^N$ in the ranking order, determining a product $P^{N-1}$ of the first (N−1) basis functions appearing in the ranking order, and comparing the basis function type and scale of the product $P^{N-1}$ to the basis function type and scale of the basis function $b^N$. In such a case, the $N^{th}$ order integral coefficient $C^N$ is the integral of the $N^{th}$ order basis product $P^N$:

$$C^N_{b_{h_1}, b_{h_2}, \ldots, b_{h_N}} = \int P^{N-1}_{b_{h_1}, b_{h_2}, \ldots, b_{h_{N-1}}} \cdot b_N \quad (23)$$

where $P^{N-1}$ is the product of the first (N−1) basis functions appearing in the ranking order and $b^N$ is the $N^{th}$ basis function appearing in the ranking order.

The $N^{th}$ order integral coefficient $C^N$ is non-zero if and only if the basis function type of the product $P^N$ is a scaling basis function, which only occurs if one of the following cases hold for the ranked basis product $P^N = P^{N-1} \cdot b_N$:

1. $b_{P^{N-1}}$ and $b_N$ are wavelet basis functions of the same type, and both have identical support. In this case, $|C^N| = |P^{N-1}|$.
2. Both $b_{P^{N-1}}$ and $b_N$ are both the mother scaling function. In this case, $C^n = 1$.
3. $b_{P^{N-1}}$ is a scaling basis function, and $b_N$ is a parent basis function of $b_{P^{N-1}}$. In this case, $C^N = \pm 2^j \times C^{N-1}$ where j is the scale of $b_N$ and where the sign is the sign of the portion of the support of $b_N$ that is covered by the support of $b_{P^{N-1}}$.

Otherwise, the basis function type of the product $P^N$ is a wavelet basis function and therefore, the $N^{th}$ order integral coefficient $C^N$ is zero. In such case, one of the following rules describes the ranked basis product $P^N = P^{N-1} \cdot b_N$:

4. $b_{P^{N-1}}$ and $b_N$ have identical supports. $b_{P^{N-1}}$ is a scaling basis and $b_N$ is a wavelet basis function. In this case, $|P^N| = 4^j \times C^{N-1}$ and $b_{P^N}$ is a wavelet basis function of the same type and support as $b_N$.
5. $b_{P^{N-1}}$ and by have identical supports. $b_{P^{N-1}}$ is a wavelet basis function, $b_N$ is a child scaling basis function. In this case, $|P^N| = 2^j \times |P^{N-1}|$ and $b_{P^N}$ is a wavelet basis function of the same type and support as $b_{P^{N-1}}$.
6. $b_{P^{N-1}}$ and $b_N$ have identical supports. Each are wavelet basis functions of different basis function types. In this case, $|P^N| = 2^j \times P^{N-1}$ and $b_{P^N}$ is the wavelet basis function of the third type and the same support.
7. $b_{P^{N-1}}$ is a child basis function and $b_N$ is its parent basis function. $b_{P^{N-1}}$ is a wavelet basis function. In this case, $|P^N| = \pm 2^j \times |P^{N-1}|$ where j is the scale of $b_N$ and the sign is the sign of the portion of the support of $b_N$ that is covered by the support of $b_{P^{N-1}}$. $b_{P^N}$ is a wavelet basis function of the same type and support $b_{P^{N-1}}$.

Figure 16:
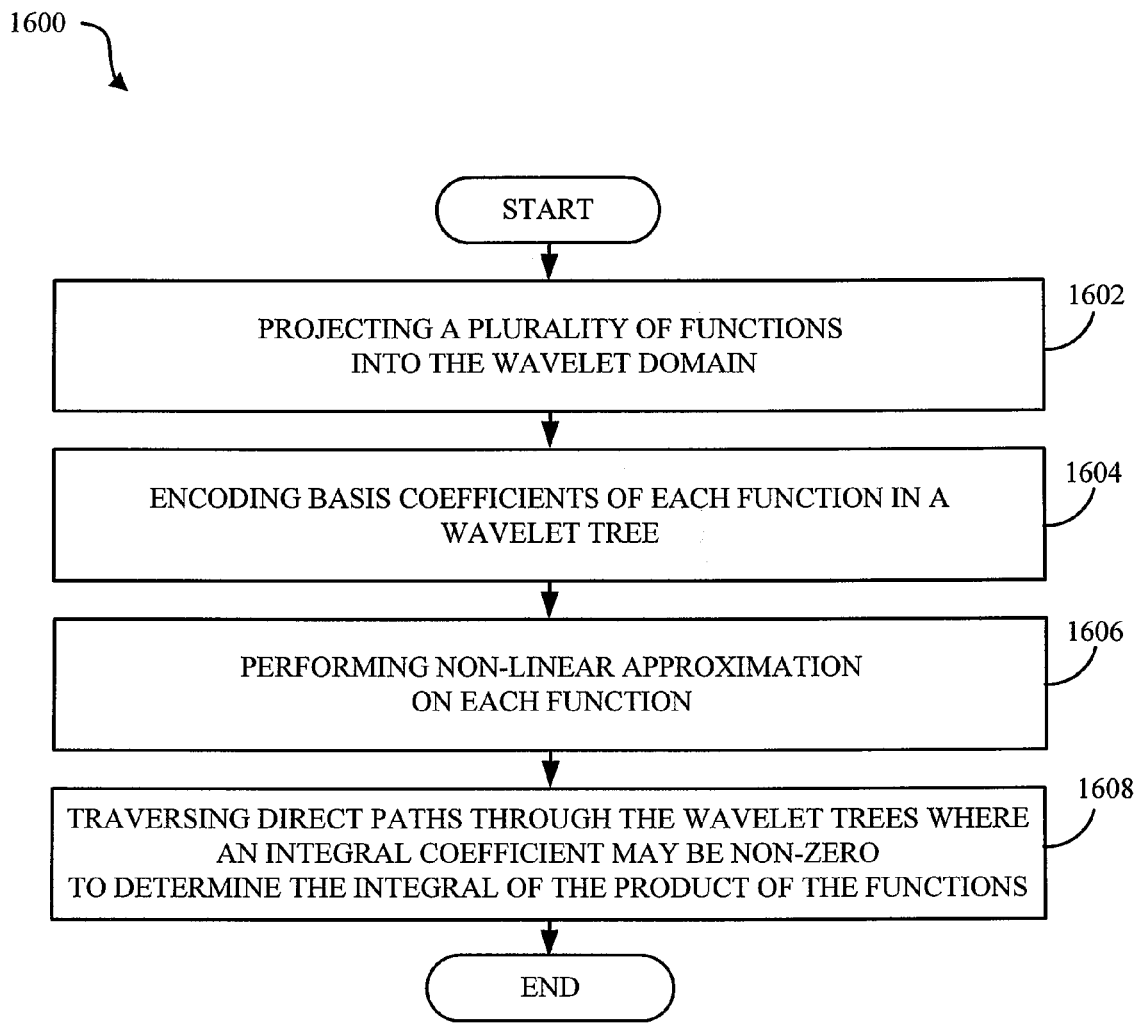
FIG. 16 is a block diagram illustrating another embodiment of a method for determining the integral of the product of a plurality of functions.

FIG. 16 is a block diagram illustrating another embodiment of a method 1600 for determining the integral of the product of a plurality of functions. Like the method 100, the method 1600 is employed with reference to equation (10) above. Therefore, the method 1600 determines the integral u of a plurality of functions that includes N functions $F_i(v)$, i being an integer from 1 to N.

In block 1602, each of the plurality of functions $F_i(v)$ whose product is being integrated is projected into the wavelet domain. Projecting the functions $F_i(v)$ into the wavelet domain comprises, for example, performing the wavelet transform on each function to project the function onto the basis set B. The wavelet transform is the two-dimensional, non-standard Haar transform and the basis set is the two-dimensional, non-standard Haar basis set. Each of the functions $F_i(v)$ is then represented in the wavelet domain as the series of basis coefficients $f_{i,h}$ scaling basis functions $b_h$ of the basis set B. Specifically, the basis functions $b_h$ are the restricted basis functions of the basis set and the basis coefficients $f_{i,h}$ are the wavelet coefficients of the wavelet basis functions $\psi_1^0$, $\psi_2^0$ and $\psi_3^0$ (except for the basis coefficient of the mother scaling function $\phi^0$).

In block 1604, the basis coefficients $f_{i,h}$ of each function $F_i(v)$ are encoded in a wavelet tree $W_i$. The wavelet tree $W_i$ is, for example, a tree-shaped data structure that stores the basis coefficients $f_{i,h}$ of one function $F_i(v)$, organizing the basis coefficients according to the parent-child relationships described above with reference to the basis function tree 700 and the basis coefficient tree 800. The wavelet tree $W_i$ has the coefficient of the mother scaling function $\phi^0$ at a root of the tree, and nodes $w_i$ depend from the root. Each node $w_i$ includes the basis coefficients $f_{i,h}$ of the restricted basis functions $b_h$ defined for the support <j, k, l>, and each node points to its four immediate child nodes having supports <j+1, k, l>. For example, a mother node depending from the root stores the mother wavelet coefficients, and four immediate child nodes having supports <1, k, l> depend from the mother node. The basis coefficients $f_{i,h}$ stored in the nodes $w_i$ are wavelet coefficients, because each of the restricted basis functions $b_h$ is of a wavelet type except for the mother scaling function $\phi^0$, the coefficient of which is stored in the root. Each node $w_i$ also has a variable that stores a signed parent summation of the node.

Figures 17, 18:
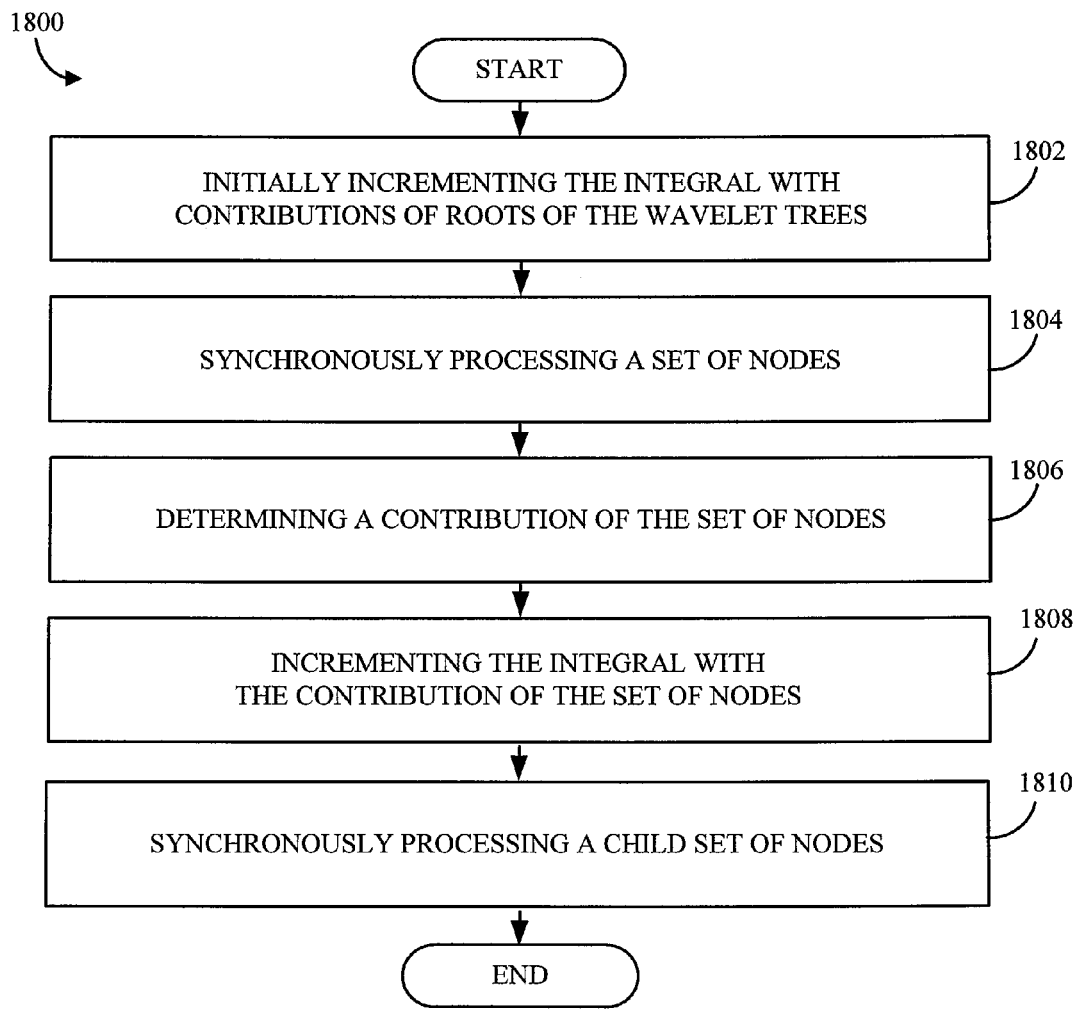
FIG. 17 illustrates an example wavelet tree in pseudo code.
FIG. 18 is a block diagram illustrating an embodiment of a method for traversing direct paths through a plurality of wavelet trees to determine the integral of the product of the functions represented by the wavelet trees.

FIG. 17 illustrates an example wavelet tree $W_i$ in pseudo code 1700. In line 1, the data structure augtree is defined, the data structure augtree being one wavelet tree $W_i$. In line 2, a variable dc is defined to store the mother scaling coefficient. In line 3, a pointer node is defined to point to a data structure augnode, which stores one node $w_i$ of the wavelet tree $W_i$. In line 5, the data structure augnode is defined. In line 6, an array ψ[3] is defined to store the three wavelet coefficients of the node $w_i$. In line 7, a variable parentsum is defined to store the signed parent summation of the node $w_i$, which is described below. In line 8, an array of four pointers ch[4] is defined, the pointers of the array pointing to the node's four immediate child nodes $w_i$, each of which also is stored using the data structure augnode.

A person of skill may note that the wavelet tree $W_i$ is similar to other data structures for encoding wavelet coefficients, such as the quadtree structure described by Berman et al. in "Multiresolution painting and compositing", In Proc.

SIGGRAPH '94, 85-90, 1994, or the zero-tree structure described by Shapiro in "Embedded image coding using zerotrees of wavelet coefficients", IEEE Transactions on Signal Processing SP, 41 (Dec.), 3445-3462, 1993, both of which are incorporated by reference in their entireties.

With reference back to FIG. 16, in block 1604 the basis coefficients $f_{i,h}$ of the function $F_i(v)$ are encoded in the wavelet tree $W_i$. In some embodiments, each function $F_i(v)$ is encoded into its own wavelet $W_i$ such that one wavelet tree $W_i$ results for each of the N functions whose product is being integrated, i being an integer from 1 to N. In other embodiments, each function $F_i(v)$ may be encoded in a plurality of wavelet trees $W_i$.

In block 1606, non-linear approximation is performed on each function $F_i(v)$ to discard insignificant basis coefficients $f_{i,h}$. Non-linear approximation is known in the art, and therefore a detailed discussion is omitted here. For example, non-linear approximation is described in Devore, "Nonlinear-approximation," Acta Numerica 7, 51-150 (1998). Generally, however, non-linear approximation presupposes that if a basis coefficient $f_{i,h}$ is insignificant with respect to a given threshold, then all of the basis coefficients corresponding to basis functions of higher scales j are also likely to be insignificant with respect to that threshold. Therefore, the insignificant basis coefficients $f_{i,h}$ can be discarded.

In embodiments in which the non-linear approximation is performed after the basis coefficients $f_{i,h}$ are encoded, the insignificant basis coefficients are discarded by removing the insignificant basis coefficients from the wavelet tree $W_i$. In other embodiments, the non-linear approximation is performed before the basis coefficients $f_{i,h}$ are encoded into the wavelet tree $W_i$. In such embodiments, the insignificant basis coefficients $f_{i,h}$ are discarded by only encoding the significant basis coefficients into the wavelet tree $W_i$ without encoding the insignificant basis coefficients. In such an embodiment, blocks 1604 and 1606 of FIG. 16 are reversed. In still other embodiments the non-linear approximation is omitted. In embodiments in which the non-linear approximation is omitted, determining the integral u of the plurality of functions $F_i(v)$ is relatively more computationally complex and is relatively slower; however, the value determined for the integral may be more accurate. In still other embodiments, the non-linear approximation is performed on some but not all of the wavelet trees $W_i$, such that some of the functions $F_i(v)$ are approximated but others are not.

In block 1608, the integral u of the product of the plurality of functions $F_i(v)$ is determined by traversing direct paths through the wavelet trees $W_i$ that represent the functions, along which direct paths the $N^{th}$ order integral coefficients $C^N$ may be non-zero. Traversing direct paths through the wavelet trees $W_i$ comprises synchronously traversing a plurality of wavelet trees $W_i$, the wavelet trees $W_i$ storing the basis coefficients of the functions whose product is being integrated, at least one wavelet tree being traversed for each function $F_i(v)$ whose product is being integrated. For example, exactly N wavelet trees $W_i$ are synchronously traversed in embodiments in which each function $F_i(v)$ is represented by exactly one wavelet tree $W_i$.

As the wavelet trees $W_i$ are traversed, a set of nodes $[w_1, \ldots, w_N]$ are synchronously processed. The set of nodes $[w_1, \ldots, w_N]$ includes one node $w_i$ from each of the wavelet trees $W_i$. The term "traversing direct paths through the wavelet trees $W_i$" denotes that the nodes $w_i$ that are synchronously processed correspond to nodes in the basis function tree that lie on a single direct path through the basis function tree, as described above with reference to FIG. 7. In other words, within the set of nodes $[w_1, \ldots, w_N]$, no two nodes $w_i$ correspond to nodes of the basis function tree that are not on a direct path with each other. Alternatively stated, no two nodes $W_i$ correspond to supports $<j,k,l>$ that are completely disjoint from each other. Instead, for any two nodes $W_i$ in the set of nodes $[w_1, \ldots, w_N]$, the supports $<j,k,l>$ to which the nodes $W_i$ correspond are either the same or are related as parent and child. In other words, for any two nodes $W_i$ in the set, the support $<j, k, l>$ of one of the nodes $W_i$ completely covers the support $<j, k, l>$ of the other node $w_i$.

Traversing the wavelet trees $W_i$ only on the direct paths employs the principles described above: the $N^{th}$ order integral coefficient $C^N$ of basis functions may be nonzero if each of the basis functions lie on a single direct path through the basis function tree; however, the $N^{th}$ order integral coefficient $C^N$ is zero if the basis functions do not lie on a single direct path through the basis function tree. Recall that the integral u of the product of the plurality of functions $F_i(v)$ is the sum of a series of contributing products, as shown in equation (10). Each contributing product includes one basis coefficient from each function $F_i(v)$ and one $N^{th}$ order integral coefficient $C^N$, which is the integral of the corresponding basis functions. Because the basis coefficients are stored in nodes $w_i$ of the wavelet trees $W_i$, the integral u can be determined by synchronously processing one node $w_i$ from each wavelet tree $W_i$. However, synchronously processing nodes $w_i$ from disparate wavelet trees $W_i$ that do not correspond to nodes on a single direct path through the basis function tree is of little value, because in such case, the $N^{th}$ order integral coefficient $C^N$ is necessarily zero. Therefore, confining the traversal to direct paths through the wavelet trees $W_i$ while avoiding the indirect paths enables accumulating contributing products that could contribute to the integral u while avoiding those that necessarily do not contribute to the integral u. As a result, traversing the wavelet trees $W_i$ on direct paths determines the integral u with the same accuracy but with fewer computations than other systems and methods.

FIG. 18 is a block diagram illustrating an embodiment of a method 1800 for traversing direct paths through a plurality of wavelet trees $W_i$ to determine the integral u of the product of the plurality of functions $F_i(v)$, which can be employed in block 1608 of FIG. 16. In block 1802, the integral u is initially incremented with the contribution of the roots of the wavelet trees $W_i$. The contribution of the roots is determined by multiplying together the mother scaling coefficient φ stored in the root of each wavelet tree $W_i$, because in such case the $N^{th}$ order integral coefficient $C^N$ is one. In block 1804, a set of nodes $[w_1, \ldots, w_N]$ is synchronously processed. The set of nodes $[w_1, \ldots, w_N]$ includes one node $w_i$ from each of the wavelet trees $W_i$. No two nodes $w_i$ in the set correspond to supports $<j, k, l>$ that are completely disjoint from each other, because the wavelet trees $W_i$ are traversed on direct paths. In block 1806, a contribution to the integral u is determined for the set of nodes $[w_1, \ldots, w_N]$. In some embodiments, the contribution of the set of nodes $[w_1, \ldots, w_N]$ is determined by separating the nodes into a group of null nodes and a group of the non-null nodes, determining a contribution of the null nodes, and determining a contribution of the non-null nodes. The contribution of the null nodes is limited to the contribution of their parent nodes, which is not ignored even though the nodes themselves are null. The contribution of the non-null nodes is determined either by recursively expanding the non-null nodes to calculate the contribution of subsets of the non-null nodes, or by iterating through the non-null nodes to build a table that accumulates the magnitude of the contribution of the non-null nodes. Regardless of how the contribution of the set of nodes $[w_1, \ldots, w_N]$ is determined, in block 1808 the integral u is incremented with the contribution determined in block 1806. In block 1810, a set of child nodes [$w_1, \ldots, w_N$] is synchronously processed. The set of child nodes [$w_1, \ldots, w_N$] includes one node $w_i$ from each of the wavelet trees $W_i$, the one node being the immediate child of the node most recently processed. Because the child nodes $w_i$ immediately depend from the most recently processed nodes, the wavelet trees $W_i$ are traversed along direct paths. The contribution of the set of child nodes [$w_1, \ldots, w_N$] may then be determined in the manner described above, and the integral may be incremented, and the process may be repeated for subsequent sets of child nodes until the last set of nodes is reached.

In at least some embodiments, traversing direct paths through wavelet trees $W_i$ in block 1608 of FIG. 16 comprises applying a tree-traversal algorithm to the wavelet trees. FIG. 19 illustrates in pseudo code 1900 an example tree-traversal algorithm 1902 for determining the integral u and embodiments of component routines, such as routine 1904, routine 1906, and routine 1908. The algorithm 1902 is defined as FunctionProductIntegral in line 1. The algorithm 1902 accepts as input a set of wavelet trees ($W_1, \ldots, W_N$), one for each function $F_i(v)$ whose product is being integrated. In line 2, the integral u is initially incremented to the product of the mother scaling coefficients, by multiplying together the variable $W_i.dc$ of each wavelet tree in the set ($W_1, \ldots, W_N$). In such case, the $N^{th}$ order integral coefficient $C^N$ is one, because regardless of N the integral coefficient of a series of mother scaling functions $\phi^0$ is one and need not be determined to increment the integral u. In line 3, a routine traverseAugTrees is called, which is the routine 1904. The routine 1904 is configured to simultaneously process a set of nodes ($w_1, \ldots, w_N$) that includes one node $w_i$ from each wavelet tree $W_i$, and to increment the integral u as a result of its processing of the set of nodes. For its initial call, the routine 1904 processes the set of nodes ($W_1.node, \ldots, W_N.node$), which are the mother nodes that include the mother wavelet coefficients. The routine 1904 then iteratively calls itself to capture the contributions of later sets of nodes, traversing the set of wavelet trees ($W_1, \ldots, W_N$) from the top down along direct paths through the wavelet trees.

Before the routine 1904 is described in detail, the signed parent summation of the node $w_i$, which is stored in the variable parentsum of the node $w_i$, is described. The mother node $w_i$ that holds the mother wavelet coefficients has the value of the mother scaling coefficient dc as its signed parent summation. For all other nodes $w_i$, the signed parent summation is the signed parent summation of it's immediate parent node $p_i$ plus the sum of the wavelet coefficients stored in the immediate parent node $p_i$, scaled by the magnitude of the product of two basis functions, one in the node $w_i$ and the other in the immediate parent node $p_i$, as shown in equation (23):

$$w_i.parentsum = p_i.parentsum + \qquad (23)$$
$$2^{j-1}[(p_i.\alpha \cdot sign(0, q_k, q_l)) + p_i.\beta \cdot sign(1, q_k, q_l)) +$$
$$(p_i.\gamma \cdot sign(2, q_i, q_l))]$$

where $p_i$ is the immediate parent of the node $w_i$, $p_i.\alpha$ is the wavelet coefficient in the parent node $p_i$ corresponding to the basis function of type $\psi_1$, $p_i.\beta$ is the wavelet coefficient in the parent node $p_i$ corresponding to the basis function of type $\psi_2$, $p_i.\gamma$ is the wavelet coefficient in the parent node $p_i$ corresponding to the basis function of type $\psi_3$, ($q_k, q_l$) is the quadrant of the immediate parent node $p_i$ that is covered by the node $w_i$, as described below with reference to equation (24), and sign is an array described below with reference to equation (25).

The node $w_i$ corresponds to a unique support ⟨j,k,l⟩ that covers a quadrant ($q_k$, $q_l$) of it's immediate parent node $p_i$, where the values $q_k$ and $q_l$ are:

$$q_k = k \bmod 2 \text{ and } q_l = l \bmod 2 \qquad (24)$$

The quadrant ($q_k$, $q_l$) is used to determine the sign of the signed parent summation in conjunction with the array sign that stores the signs of the four quadrants of the three mother wavelet functions $\psi_1^0$, $\psi_2^0$, and $\psi_3^0$ respectively, as shown in equation (25):

$$sign[3][2][2] = \{1, -1, 1, -1; 1, 1, -1, -1; 1, -1, -1, 1\} \qquad (25)$$

A person of skill may note that the variable $w_i.parentsum$ is inspired by Ng in "Triple product wavelet integrals for all-frequency relighting", ACM Transactions on Graphics (SIGGRAPH '04) 23, 3, 477-487, which is incorporated by reference herein in its entirety.

An accumulated parent summation is stored in a variable cum. Specifically, the variable cum is initially set to one, which is the $N^{th}$ order integral coefficient $C^N$ of a series of mother scaling functions $\phi^0$, regardless of N. As the set of wavelet trees ($W_1, \ldots, W_N$) are traversed, the accumulated parent summation is incremented as described below.

The routine 1904 will now be described. In line 1, the routine 1904 is defined as traverseAugTrees, accepting as inputs the variable cum and the sets of nodes ($w_1, \ldots, w_N$). In line 2, the nodes of the set ($w_1, \ldots, w_N$) are reorganized into a two sets of nodes: one being a set of non-null nodes ($w_1, \ldots, w_k$) and the other being a set of null nodes ($w_{k+1}, \ldots, w_N$). Up to this point, the subscript i has denoted that a specific wavelet tree $W_i$ corresponds to a specific function $F_i(v)$, or alternatively that a specific node $w_i$ is a node of a specific wavelet tree $W_i$. For the remainder of the discussion of the algorithm 1902, the subscript i merely indicates whether the node $w_i$ is null or non-null, with non-null nodes having subscripts $w_1$ to $w_k$ and null nodes having subscripts $w_{k+1}$ to $w_N$. It is likely that some of the nodes $w_i$ are null in embodiments in which non-linear approximation is performed.

In line 3, the routine 1904 returns if at most one of the nodes in the set ($w_1, \ldots, w_N$) is null. In such case the $N^{th}$ order integral coefficient $C^N$ is zero, because each node $w_i$ only includes wavelet coefficients and the integral of each wavelet basis functions $\psi_1$, $\psi_2$, and $\psi_3$ is zero.

The set of non-null nodes ($w_1, \ldots, w_k$) can contribute to the integral u, however, the contribution of the set of null nodes ($w_{k+1}, \ldots, w_N$) is limited to the contribution of their parent nodes $p_i$. Therefore, the contribution of the nodes ($w_1, \ldots, w_N$) to the integral u is determined by first updating the signed parent summation $w_i.parentsum$ for each node ($w_1, \ldots, w_N$) in line 4, updating the accumulated parent summation cum with the contributions of only the null nodes ($w_{k+1}, \ldots, w_N$) in line 5, and calling a routine getProductIntegral to determine the contributions of the non-null nodes ($w_1, \ldots, w_k$) in line 6. The integral u is then incremented with the product of the accumulated parent summation cum and the return of getProductIntegral, described below, such that the contributions of both the non-null nodes and the parents of the null nodes are captured.

In lines 7 and 8, the routine traverseAugTrees 1904 then iteratively calls itself four times to independently process the next four sets of nodes, which are the immediate child nodes of the non-null nodes. In other words, the routine 1904 calls itself for the nodes ($w_1$. ch[i], ..., $W_k$. ch[i]) in a loop, where ch[i] is the pointer to the child node and i is an integer from 0 to 3.

The routine getProductIntegral 1906, which is called by the routine 1904 to determine the contribution of the non-null nodes ($w_1$, ..., $w_k$), recursively calculates the non-zero $N^{th}$ order integral coefficients $C^N$ using the first three cases of FIG. 15. In line 1, the routine 1906 accepts a plurality of nodes $w_i$ as input, initially processing the set of non-null nodes ($w_1$, ..., $w_k$). In lines 3-6 the routine 1906 recursively calls itself and three instances of a routine getWaveletProduct 1908, passing in one fewer nodes with each call, and returning the sum of the four routines scaled by variables of the node not passed in for the call. Specifically, the routine 1906 is scaled by the parentsum of the node $w_i$ not passed in and each return of the routine 1908 is scaled by one of the three wavelet coefficients of the node $w_i$ not passed in. In line 2, the routine returns zero if only one node $w_i$ is passed in.

The routine getWaveletProduct 1908 uses cases 4, 6, and 7 of FIG. 15 to evaluate the magnitude of the product where the type of the basis function appearing in the product is one of the wavelet basis functions. In line 1, the routine getWaveletProduct 1908 accepts as input a plurality of nodes $w_i$ and three input parameters a, b, and c that differentiate the three different wavelet types. In lines 3-7, the routine getWaveletProduct 1908 recursively calls the routine getProductIntegral 1906 and three instances of itself, passing in one fewer nodes with each call, and returning the sum of the four routines scaled by variables of the node not passed in for the call, plus the parentsum variables of the fewer nodes scaled by one of the wavelet coefficients of the node not passed in for the call. In line 2, the routine getWaveletProduct 1908 returns one of the wavelet coefficients if only one node $w_i$ is passed in.

The embodiment of the tree-traversal algorithm FunctionProductIntegral 1902 may have a computational complexity on the order of $O(m4^N)$, where m is the number of significant basis coefficients $f_{i,h}$ retained after the nonlinear approximation, and N is the number of functions $F_i(v)$ whose product is being integrated. By eliminating repetitive operations, the algorithm 1902 can be optimized such that the computational complexity is on the order of $O(mN)$. For example, the embodiment of the routine getProductIntegral 1906 traverses the wavelet trees $W_i$ from the top down, recursively expanding the nodes $w_i$ to calculate the product of one fewer nodes, but in other embodiments of the routine the recursive expansion is eliminated to increase the speed of the algorithm.

For example, FIG. 20 illustrates in pseudo code 2000 an optimized tree-traversal algorithm 2002 for determining the integral u, and embodiments of component routines, such as the routine 2004, the routine 2006, the routine 2008, and the routine 2010. As shown, the algorithm 2002 is the same as the algorithm 1902 and the routine 2004 is the same as the routine 1904 described above. However, the routine getProductIntegral 2006 differs from the routine getProductIntegral 1906. Specifically, instead of recursively expanding the nodes $w_i$ from the top down to determine the $N^{th}$ order integral coefficients $C^N$, the routine getProductIntegral 2006 employs an intermediate table T [N], an embodiment of which is illustrated with example pseudo code 2100 in FIG. 21.

In line 1 of FIG. 21, the table T [N] is defined to have N records, the fields of which are described with reference to a subset of nodes. In line 2, the field $\phi$ is defined, which stores the magnitude of the product of a subset of the nodes $w_i$ that have a scaling basis function $\phi$ appearing in the product. In line 3, the field $\psi[0]$ is defined. The field $\psi[0]$ stores the magnitude of the product of a subset of the nodes $w_i$ that have a wavelet basis function of type $\psi_1$ appearing in the product.

In line 4, the field $\psi[1]$ is defined. The field $\psi[1]$ stores the magnitude of the product of a subset of the nodes $w_i$ that have a wavelet basis function of type $\psi_2$ appearing in the product. In line 5, the field $\psi[2]$ is defined. The field $\psi[2]$ stores the magnitude of the product of a subset of the nodes $w_i$ that have a wavelet basis function of type $\psi_3$ appearing in the product. In line 6, the field cum is defined. The field cum stores the accumulated parent summation of the subset, meaning the sum of the parentsum variables of each node $w_i$ in the subset.

The routine getProductIntegral 2006 incrementally builds the table T by iterating through the set of non-null nodes ($w_1$, ..., $w_k$). In line 2, the routine 2006 returns zero if only one node $w_i$ is input into the routine. In lines 3-4, a first record in the table T [1] is updated with the basis coefficients of the node $w_1$. A field T [1].$\phi$ is set to zero because the node $w_1$ does not include a basis coefficient for the scaling basis function. A field T [1].$\psi[0]$ is updated with the wavelet coefficient for the basis function of type $\psi_1$, the field T [1].$\psi[1]$ is updated with the wavelet coefficient for the basis function of type $\psi_2$, and the field T [1]. $\psi[2]$ is updated with the wavelet coefficient for the basis function of type $\psi_3$. Additionally, the field T [1].cum is set to the signed parent summation of the node $w_1$, because as mentioned above, the field cum accumulates the signed parent summations of a subset of nodes. In lines 5-10, the routine 2006 iterates through all of the remaining nodes $w_i$ except for the last node, updating a record [i] in the table T for each node. The field T [i].cum accumulates the signed parent summations of the nodes in the subset ($w_1$, ..., $w_i$) by multiplying the signed parent summation parentsum of the node $w_i$ by the value of the accumulated parent summation cum stored in the previous record, T [i−1].cum. The field T [i].$\phi$ is updated with a value returned from a routine getP, and the fields T [i]. $\psi[0]$, T [i]. $\psi[1]$, and T [i]. $\psi[2]$ are each respectively updated with a value returned from a routine getW, both of which routines are described below. In line 11, the routine 2002 returns the value of getP for the last node $w_k$, as described below.

The routine getP(i) 2008 is defined on line 1 to accept the integer i as input. In line 2, the routine returns zero if the value of i is one. In line 3-6, the routine 2008 returns a magnitude of the product of the subset of the nodes ($w_1$, ..., $w_i$) if the basis function appearing in the product is the scaling basis function. Recall that a product of two basis functions is a scaling basis function if a child scaling basis function is multiplied by its parent basis function or if a wavelet basis function is multiplied by itself. Therefore, the routine 2008 returns the sum of the signed parent summation $w_i$.parentsum multiplied by the stored magnitude of the product of scaling basis function type in the preceding record T [i−1].$\phi$, and each of the wavelet coefficients, $w_1.\psi[0]$, $w_1.\psi[1]$, and $w_1.\psi[0]$, multiplied by each of the stored magnitudes of the same wavelet type in the preceding record, T [i−1].$\psi[0]$, T[i−1].$\psi[1]$, and T[i−1].$\psi[2]$, respectively.

The routine getW(a, b, c, i) 2010 is defined on line 1 to accept the integer i as input and three input parameters a, b, and c that differentiate the three different wavelet types. In line 2, the routine 2010 returns the wavelet coefficient of type a if the value of i is 1. In lines 3-6, the routine 2010 returns a magnitude of the product of the subset of the nodes ($w_1$, ..., $w_i$) if the basis function appearing in the product is the wavelet basis function of type a.

As mentioned above, the computational complexity of each of the tree-traversal algorithms is linearly related to m, the number of significant basis coefficients retained after the non-linear approximation is performed. For example, the algorithm 1902, which is recursive, may have a computational complexity on the order of $O(m4^N)$, and the algorithm 2002, which employs the table, may have computational complexity on the order of O(mN). Of course, the computational complexity of the algorithm affects the speed with which the integral u is determined, and therefore reducing the computation complexity is desirable.

The computational complexity can be further controlled by varying the traversal depth of the tree-traversal algorithm. Traversing at higher traversal depths denotes traversing subsets of nodes that have relatively lower scales and are located relatively closer to the root of the wavelet tree, while traversing at lower transversal depths denotes traversing subsets of nodes that include relatively higher scales and are located relatively farther from the root node. In some embodiments, the traversal depth of the algorithm may be controlled, such that the need for fast computation can be balanced against the need for accurate computation on a case by case basis.

Figures 21, 22:
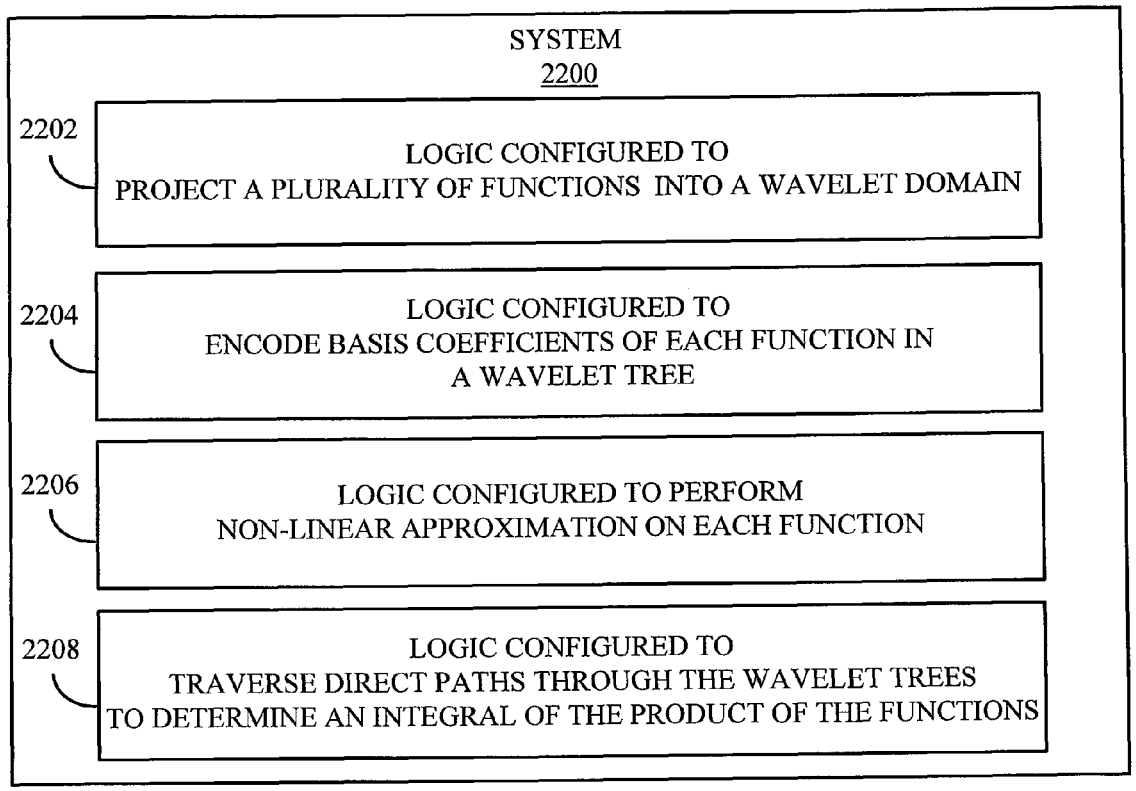
FIG. 21 illustrates in pseudo code an intermediate table that can be employed by the algorithm of FIG. 20.
FIG. 22 is an embodiment of a system for determining the integral of the product of a plurality of functions.

FIG. 22 is an embodiment of a system 2200 for determining the integral u of the product of a plurality of functions $F_i(v)$. The system includes logic 2202 configured to project the functions $F_i(v)$ of the plurality of functions into the wavelet domain, logic 2204 configured to encode basis coefficients $f_{i,h}$ of each function in a wavelet tree $W_i$, logic 2206 configured to perform non-linear approximation on the functions $F_i(v)$ to discard insignificant basis coefficients $f_{i,h}$, and logic 2208 configured to traverse direct paths through the wavelet trees $W_i$, where the $N^{th}$ order integral coefficients $C^N$ may be non-zero, to determine the integral u of the product of the functions $F_i(v)$ represented by the wavelet trees $W_i$.

Figure 23:
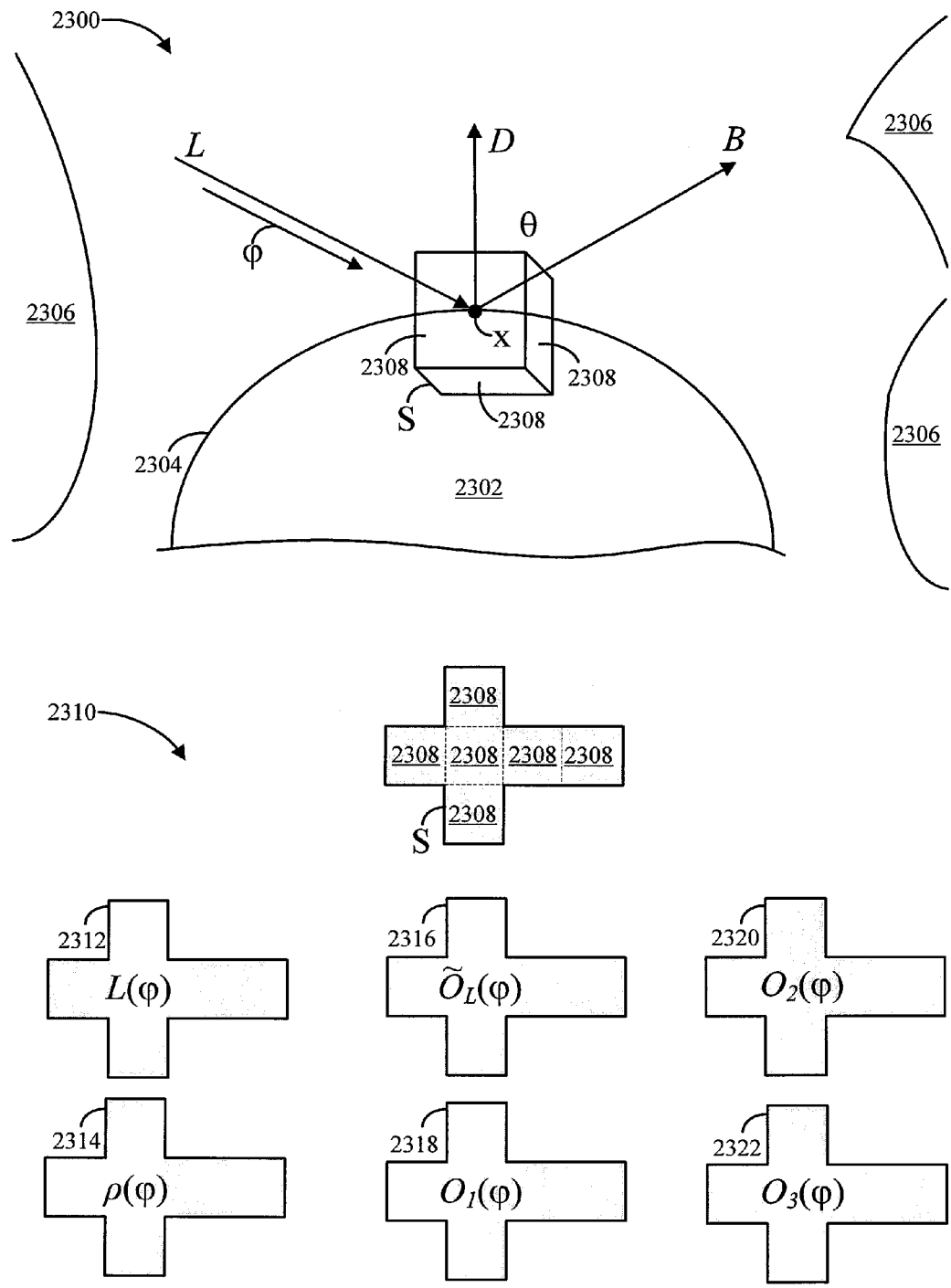
FIG. 23 is a diagram illustrating light and objects in an example scene.

In some embodiments, the systems and methods described above are employed by graphics rendering applications to re-light and shade objects in a scene. Typically, the graphics rendering application models objects in the scene, and the lighting and shading of the objects is determined using a light transport model that simulates the interaction of light with the objects. FIG. 23 is a diagram illustrating an example scene 2300. An object 2302 in the scene 2300 has a point x on a surface 2304 of the object, and a radiance B exiting the point x is a function of a direction of view θ. Generally, determining the radiance of the point x requires integrating the product of a plurality of functions that contribute to the model, as shown in equation (26):

$$B(x, \theta) = \int_S L(\varphi)\rho(x, \varphi \leftrightarrow \theta)O_L(x, \varphi)(D \cdot \varphi)\prod_{i=1}^{g} O_i(x, \varphi)d\varphi \quad (26)$$

Figure 24:
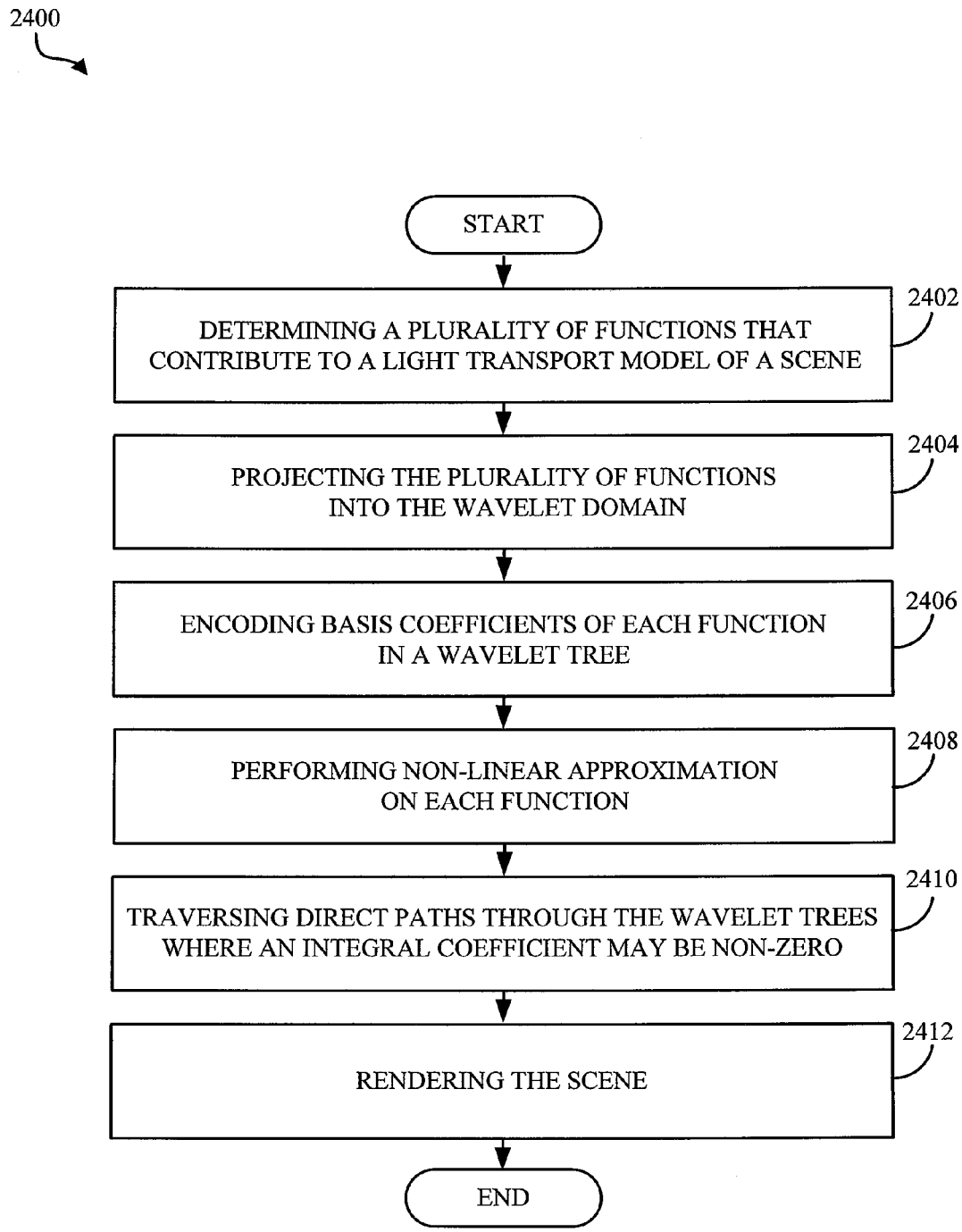
FIG. 24 is a block diagram illustrating an embodiment of a method of rendering a graphical scene in which the radiance of a point x in the scene is determined by integrating the product of a plurality of functions contributing to a light transport model of the scene.

FIG. 24 is a block diagram illustrating an embodiment of a method of rendering a graphical scene in which the radiance of a point x in the scene is determined by integrating the product of a plurality of functions contributing to a light transport model of the scene. The method 2400 will be described with reference to the example scene 2300 shown in FIG. 23. In block 2402, the plurality of functions that contribute to the light transport model of the scene 2300 are determined. The plurality of functions include, for example, a distant environment lighting function L(φ), a bi-directional reflectance distribution function (BRDF) $\rho(x,\varphi \leftrightarrow \theta)$, a local visibility function $O_L(x, \varphi)$, a cosine term (D·φ) and a plurality of dynamic occlusion functions $O_i(x, \varphi)$. The distant environment lighting function L(φ) represents distant environment lighting as a function of a vector φ, the vector φ representing the incident direction of the light. The BRDF $\rho(x,\varphi \leftrightarrow \theta)$ models the interaction of the incident light L with the surface 2304 of the object 2302. The local visibility function $O_L(x, \varphi)$ represents the local visibility at the point x due to self-occlusion. The cosine term (D·φ) represents Lambert's law: the exitant radiance B is directly proportional to the dot product of a vector D and the vector φ, the vector D being a vector that is normal to the surface 2304 of the object 2302 at the point x. Each dynamic occlusion function $O_i(x, \varphi)$ represents the dynamic occlusion at the point x caused by an $i^{th}$ neighboring object 2306 in the scene 2300, where i can be any integer from 1 to g, g being the total number of neighboring objects 2306 that contribute to the light transport model. Three neighboring objects 2306 are shown in FIG. 23 for illustrative purposes, although greater or fewer neighboring objects could be included.

In some embodiments, the cosine term (D·φ) can be combined with the local visibility $O_L(x, \varphi)$ term as shown in equation (27):

$$B(x, \theta) = \int_S L(\varphi)\rho(x, \varphi \leftrightarrow \theta)\tilde{O}_L(x, \varphi)\prod_{i=1}^{g} O_i(x, \varphi)d\varphi \quad (27)$$

where $\tilde{O}_L(x, \varphi)$ represents the combined local visibility function $O_L(x, \varphi)$ and cosine term (D·φ). For a fixed point x and direction of view θ, equation (27) is simplified to equation (28):

$$B = \int L(\varphi)\rho(\varphi)\tilde{O}_L(\varphi)\prod_{i=1}^{g} O_i(\varphi)d\varphi \quad (28)$$

Thus, the exitant radiance B at the fixed point x is the integral of the product of g+3 functions, g being the number of neighboring objects 2306 that could dynamically occlude and cast a shadow upon the point x. To determine the exitant radiance B, the product of the functions is integrated with respect to all incident directions φ surrounding the point x.

For example, in FIG. 23 a cubemap S surrounds the point x, and in equation (27) the integral is taken over the cubemap S. However, in equation (28) the integral is taken over one face 2308 of the cubemap S. Therefore, to determine the exitant radiance B using equation (28), the integral is taken six times, once for each face 2308 of the cubemap S, and the six iterations are summed together. In such an embodiment, each function that contributes to the light transport model of the scene is represented as a cubemap function 2310, and in block 2402 determining the plurality of functions comprises determining the cubemap functions.

Example cubemap functions 2310 are shown in FIG. 23, where the distant environment lighting function L(φ) is represented by the cubemap function 2312, the BRDF ρ(φ) is represented by the cubemap function 2314, the local visibility function $\tilde{O}_L(\varphi)$ is represented by the cubemap function 2316, and three dynamic occlusion functions $O_1(\varphi)$, $O_2(\varphi)$, and $O_3(\varphi)$ are represented by the cubemap functions 2318, 2320, and 2322, respectively, one for each neighboring object 2306 in the scene 2300. Again, three neighboring objects 2306 are illustrated by way of example. Although the cubemaps functions 2310 can be determined in a variety of ways that are known or will later be known to a person of skill in the art, one example embodiment of determining the cubemap functions is described below.

In the example embodiment, data is collected about the scene by sampling the objects and lighting within the scene. The sampled data is then processed to create the cubemap functions 2310. The sampled data may compiled interactively or in advance of run-time, and in cases in which the sampled data is compiled in advance, the cubemap functions 2310 may be pre-computed in advance or computed interactively.

The lighting cubemap function 2312 is interactively determined from interactively sampled data of the high dynamic range illumination, as described in Debevec et al., "Recovering high dynamic range radiance maps from photographs," In Proc. SIGGRAPH '97, 369-378, which is incorporated by reference herein in its entirety. For example, the illumination may be sampled at a resolution of 6×64×64, where 6 denotes the number of faces 2308 of the cubemap and 64×64 denotes the number of samples taken per face. Sampling the illumination at a resolution that is the same as the resolution used to sample the visibility and BRDF may be desirable because, sampling at a higher resolution merely captures basis coefficients of a finer scale that will not contribute to the light transport model if comparable basis coefficients are not captured for other functions.

The BRDF cubemap function 2314 is interactively determined from pre-computed data. Prior to run-time, the pre-computed data is tabulated by, for example, sampling Phong BRDF's with a resolution in $\theta_r \times \phi$ of up to (6×64×64)×(6×64×64), where $\theta_r$ is a reflection vector of the direction of view $\theta$ about the vector D that is normal to the surface. The Phong BRDF's can have a shininess of up to, for example, 200. In some embodiments, the pre-computed BRDF data can be gathered as described in the Ng paper previously incorporated by reference. At run-time, the BRDF cubemap 2314 is interactively interpolated from the tabulated data.

The local visibility cubemap function 2316 is pre-computed using pre-computed data, and the dynamic occlusion cubemap functions 2318, 2320, and 2322 are determined interactively using pre-computed data. For each object 2302, 2306 in the scene 2300, a local visibility field of the object is sampled at points x on its surface 2304. A global visibility field is sampled in nearby surrounding regions, such as on a virtual ground plane of the object that is a lower plane of a bounding box of the object. Sampling the global visibility field is accomplished using schemes such as a planar sampling scheme and/or a spherical sampling scheme. The planar sampling scheme samples the visibility in the form of concentric circles on each object's virtual ground plane. The center of each concentric circle is the projection of the object center on the virtual ground plane, the radius of the concentric circles varying from about 0.05r to about 10r, r being a radius of the projection of the object on the virtual ground plane. For example, one hundred concentric circles may be used, with about 200 sample points being collected per concentric circle. The spherical sampling scheme samples the visibility of the region surrounding each scene entity in the form of concentric spheres. The centers of the concentric spheres may coincide with the centers of the concentric circles. Twenty concentric spheres may be used, the radius of the concentric spheres varying from about 0.2R to about 6R, R being the radius of the bounding sphere. Each concentric sphere is sampled at about 6×9×9. Such a sampling scheme is similar to the object occlusion field described in Zhou, et al., "Precomputed shadow field for dynamic scenes," ACM Transactions on Graphics (SIGGRAPH '05), 24, 3, 1196-1201, which is incorporated by reference herein in its entirety. The difference between the radiuses of neighboring concentric circles and spheres, in the planar and spherical sampling schemes respectively, increases linearly with increasing distance from the projection of the object center on the virtual ground plane.

The local visibility cubemap function 2316 and the dynamic occlusion cubemap functions 2318, 2320, and 2322 are pre-computed from the sampled data by rasterizing the coarse model using graphics hardware. Each cubemap is rasterized at a resolution of 6×64×64. In some embodiments, multiple objects 2302, 2306 in the scene 2300 share the same geometry and visibility field, in which case each of the objects is represented by the same cubemap function 2310. For example, if a scene includes multiple identical chairs, the cubemap function 2310 of the chair is determined only once.

As can be seen from equation (28), the light transport model is a specific implementation of equation (10). Equation (10) generically represents determining the integral u of the product of a plurality of functions including N generic functions $F_i(v)$. In equation (28), the N functions $F_i(v)$ are the functions that contribute to the light transport model, including the distant environment lighting function $L(\phi)$, the bi-directional reflectance distribution (BRDF) function $\rho(\phi)$, the local visibility function combined with the cosine term $\bar{O}_L(\phi)$, and a plurality of dynamic occlusion functions $O_i(x, \phi)$, where i is an integer from 1 to g.

Because the light transport model is known in the art, a through discussion of the model is omitted. However, a person of skill would understand that the above equations of the light transport model are merely examples, and in other embodiments, the model may take other forms. For example, in some embodiments some of the functions that contribute to the light transport model may be omitted, or additional functions may be included. Additionally, the cosine term (D·$\phi$) need not be combined with the local visibility function $O_L(x, \phi)$. It also should be noted that the equations above are defined in terms of a global coordinate system, although other coordinate systems could be employed. Further, a variety of conventions can be employed for integrating over all incident directions, as required by equation (27). In the illustrated embodiment the cubemap S is employed, but in other embodiments other conventions such as a hemisphere can be employed. Additionally, the functions that contribute to the light transport model need not be represented as cubemap functions 2310, or the cubemap functions can be determined in manners other than those described in the example embodiment above.

Once the functions that contribute to the light transport model are determined in block 2402, the method 2400 is similar to the method 1600. This is because the method 1600 was employed with reference to equation (10) and because the light transport model of equation (28) is a specific implementation of equation (10), as described above. In block 2404, each of the plurality of functions that contribute to the light transport model is projected into the wavelet domain, as described above with reference to block 1602 of FIG. 16. In embodiments in which the functions are represented as cubemaps 2310, the sampling resolution used to determine the cubemap function may determine the resolution n of the basis set B onto which the cubemap function is projected. For example, in embodiments in which the sampling resolution of 6×64×64 is used, the basis set B may have a resolution n of 7, although other resolutions may be used.

In block 2406, the basis coefficients of each function are encoded in a wavelet tree $W_i$. In embodiments in which the functions are represented as cubemap functions 2310, encoding the basis coefficients of the functions in the wavelet trees $W_i$ comprises encoding the basis coefficients of each face 2308 of each cubemap function 2310 in a separate wavelet tree $W_i$. Thus, six wavelet trees $W_i$ are encoded for each cubemap function 2310, one per face 2308 of the cubemap function 2310. In other embodiments, each function can be represented with greater of fewer wavelet trees $W_i$.

In block 2408, non-linear approximation is performed on each function to discard insignificant basis coefficients, as described above with reference to block 1606 of FIG. 16. In some embodiments, the non-linear approximation block 2408 is performed before the encoding block 2406, the non-linear approximation block 2408 is performed on only a subset of the functions, or the non-linear approximation block 2408 is omitted completely. In embodiments in which all-frequency lighting is desirable, the distant environment lighting function L($\phi$) is approximated using a relatively larger number of basis coefficients than the other functions, such that the high-frequency components of the lighting are represented. For example, in embodiments in which about 60 to 120 basis coefficients are retained per face 2308 of the cubemap functions 2314 to 2322, up to 300 basis coefficients may be retained per face 2308 of the lighting cubemap function 2312, each face corresponding to one wavelet tree $W_i$.

In block 2410, the radiance B of the point x, which is the integral of the product of the functions that contribute to the light transport model, is determined by traversing direct paths through the wavelet trees $W_i$, where the $N^{th}$ order integral coefficients $C_N$ may be nonzero, as described above with reference to block 1608 of FIG. 6. For example, traversing direct paths through the wavelet trees $W_i$ may comprise performing the method 1800 described above with reference to FIG. 18 or applying a tree-traversal algorithm to the wavelet trees $W_i$, such as either the algorithm 1902 or the algorithm 2002 described above with reference to FIG. 19 and FIG. 20. In embodiments in which the functions are represented as cubemap functions 2310, traversing the wavelet trees $W_i$ may determine the radiance of the point x over one face 2308 of the cubemap S. In some such embodiments, each function is represented by a plurality of wavelet trees $W_i$ as a result of the faces 2308 of the cubmap functions 2310 being encoded in separate wavelet trees $W_i$. In such cases, traversing the wavelet trees $W_i$ comprises traversing sets of wavelet trees to determine the radiance B over face 2308, each set corresponding to one face 2308 of the cubemap and each set including one wavelet tree $W_i$ for each function. In other words, the wavelet trees $W_i$ that correspond to a given face 2308 are traversed to determine the radiance B per face, and the six radiances B per face 2308 are summed to determine the radiance B over the entire cubemap S.

To render the point x in block 2412 the graphics rendering application may require three colors, one for each of three independent color channels. However, the radiance B over the entire cubemap S may represent one color value for the point x. This is because, for example, the lighting function L($\phi$) and BRDF function $\rho(\phi)$ may be different for different color channels at a single point x. In such case, traversing the wavelet trees $W_i$ comprises iteratively traversing the wavelet trees to determine three color values for the point x. Therefore, the tree traversal is iterated six times, once per face of the cubemap to determine the first color, and the six iterations are repeated for the second and third color value. As a result, the tree-traversal is iterated eighteen times per point x, once per cubemap face 2308 per color channel. In some embodiments, the depth to which the wavelet trees $W_i$ are traversed is interactively controlled, the purpose of which is described below.

In block 2412, the scene is rendered. Because graphics rendering is known, a thorough discussion is omitted here. Rendering generally comprises, for example, using a graphics rendering application to rasterize the scene using graphics hardware. The graphics rendering application sets the color of the point x using the color values determined in block 2410. The algorithm then iterates for the next point x, each visible point x being processed, a plurality of points x producing objects, and a plurality of objects producing the rendered scene.

The method 2400 can be used to interactively render dynamic, high-glossy objects 2302 with realistic, all-frequency shadows. The shadows cast by neighboring objects 2306 on the object 2302 appear in the rendered scene due to the dynamic occlusion functions $O_t(x,\phi)$, even if the objects are moving. The shadows cast on an object 2302 by itself also appear in the scene, due to the local visibility function $\tilde{O}_L(\phi)$. Further, the shadows cast on the virtual ground plane of the objects are represented, because the visibility on the virtual ground plane was considered in creating the cubemap functions. The BRDF $\rho(\phi)$ enables reproducing the lighting affects caused by materials and textures in the scene, including glossy materials, and the distant environment lighting function L($\phi$) can describe all-frequency lighting, such that specular highlights and non-diffuse shadows, including material specific highlights and shadows, appear in the rendered scene. Both the lighting and the direction of view can be varied, and the objects can be interactively manipulated. Note that any or all of the above-described effects can be simultaneously or individually produced, because each of the above-described functions simultaneously contributes to the integral B. Therefore, the method 2400 has applicability in fields such as industrial lighting and computer gaming, among others, in which fields interactive lighting is desirable.

Further, the speed of rendering and/or richness of the lighted scene can be interactively controlled by varying the traversal depth. Limiting the traversal to relatively higher (lower scale) nodes $w_i$ in the wavelet trees $W_i$ reduces the computational complexity, which is related, such as linearly related, to the number of nodes $w_i$ processed. However, in cases in which the traversal depth is limited, the relatively lower (higher scale) nodes $w_i$ may not be traversed, and therefore the contributions of these nodes to the lighting of the scene are not considered. Because the lower nodes $w_i$ correlate to higher scales, generally representing more resolved or higher-frequency information, not traversing the lower nodes $w_i$ may eliminate higher-frequency components of shadows and view-dependent specularities from the light transport model and therefore the rendered scene. Conversely, traversing relatively lower nodes $w_i$ enables the contributions of relatively more basis coefficients to be considered, the additional basis coefficients including higher-frequency and/or more resolved lighting information. Therefore, the rendered scene may have more detail but may take longer to render due to the increased complexity of determining the lighting.

Figure 25:
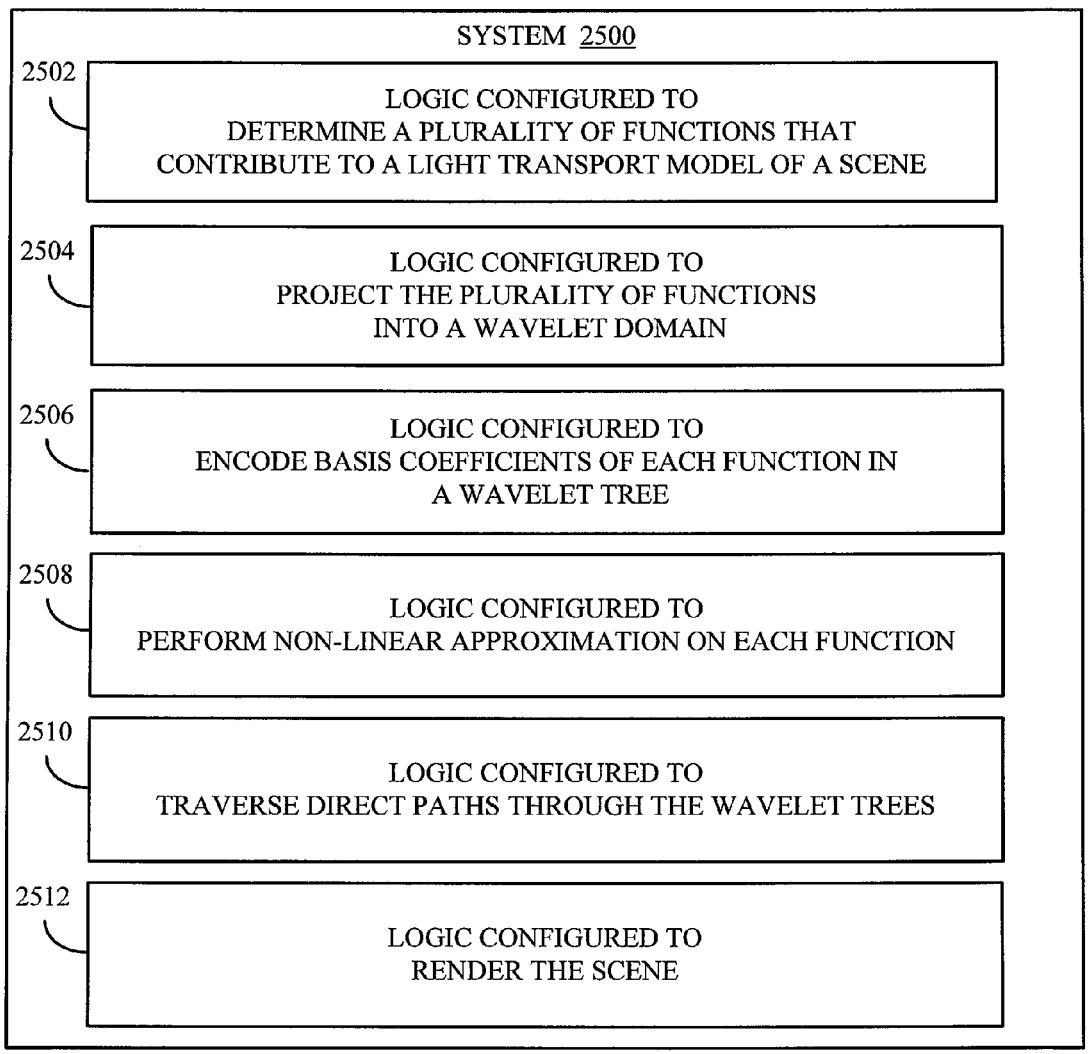
FIG. 25 is a block diagram illustrating an embodiment of a system of rendering a graphical scene in which the radiance of a point x in the scene is determined by integrating the product of a plurality of functions contributing to a light transport model of the scene.

FIG. 25 is a block diagram illustrating an embodiment of a system of rendering a graphical scene in which the radiance B of a point x in the scene is determined by integrating the product of a plurality of functions contributing to a light transport model of the scene. The system 2500 includes logic 2502 configured to determine a plurality of functions that contribute to a light transport model of a scene, logic 2504 configured to project the functions of the plurality of functions into the wavelet domain, logic 2506 configured to encode basis coefficients of each function in a wavelet tree, logic 2508 configured to perform non-linear approximation on the functions to discard insignificant basis coefficients, logic 2510 configured to traverse direct paths through the wavelet trees to determine the integral of the product of the functions that contribute to the light transport model, and logic 2512 configured to render the scene.

Figure 26:
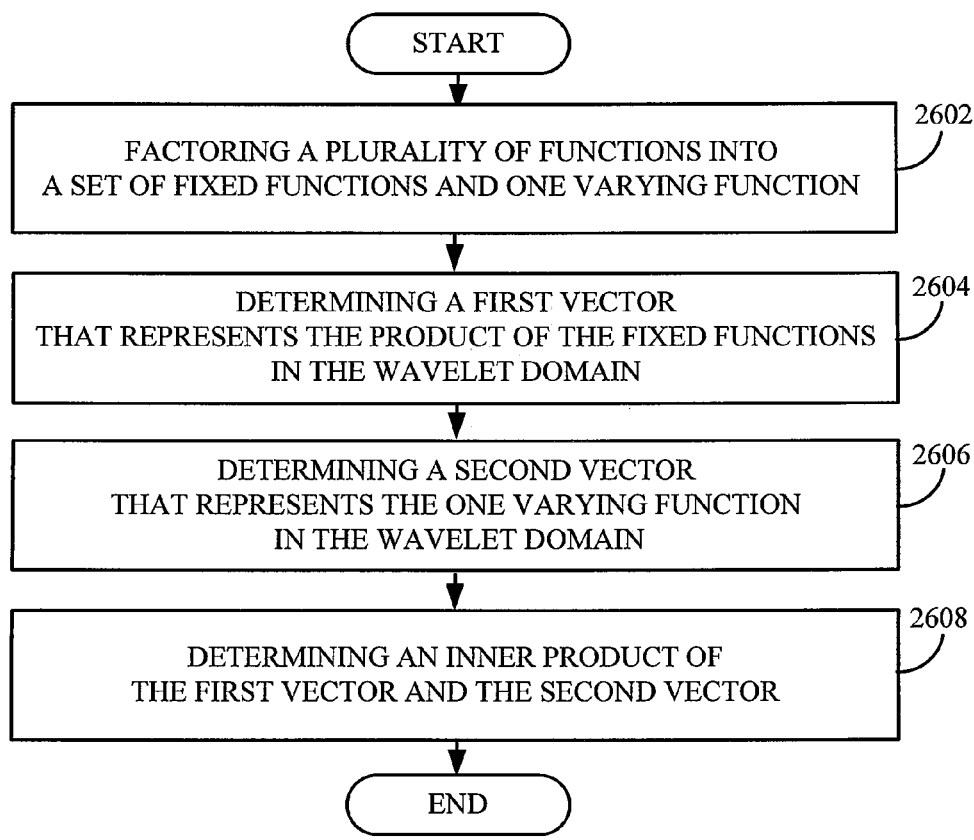
FIG. 26 is a block diagram illustrating an embodiment of a method for approximating the integral of the product of a plurality of functions.

FIG. 26 is a block diagram illustrating a method 2600 for approximating the integral of the product of a plurality of functions. The method 2600 is relatively less computationally complex and is relatively faster than the method of other embodiments; however, the method approximates the integral more so than the methods of other embodiments.

In block 2602, the plurality of functions $F_i(v)$ whose product is being integrated are factored into sets of functions. Generally speaking, the plurality of functions $F_i(v)$ includes N functions, and the N functions can be factored into a plurality of sets. For example, in equation (29) the N functions are factored into two sets, a first set having functions $F_i(v)$ for i from 1 to p, and a second set having functions $F_i(v)$ for i from (p+1) to N:

$$u = \int \prod_{i=1}^{N} F_i(v) dv = \int \left[\prod_{i=1}^{p} F_i(v)\right] \cdot \left[\prod_{i=p+1}^{N} F_i(v)\right] dv \quad (29)$$

For each set, the product of the functions $F_i(v)$ in the set can be represented in the wavelet domain as a vector T. Continuing the above example, the product of the functions of the first set can be represented as a vector $T_1$ and the product of the functions of the second set can be represented as a vector $T_2$, as shown in equation (30):

$$T_1 = \prod_{i=1}^{p} F_i(v) \text{ and } T_2 = \prod_{i=p+1}^{N} F_i(v) \quad (30)$$

In cases in which the products of the functions in the set are represented as vectors, the integral u of the product of the functions is the integral of the product of vectors, or alternatively, the inner product of the vectors. For example, the integral of the product of the functions shown in equation (29) can alternatively be expressed as shown in equation (31):

$$u = \int (T_1 \cdot T_2) dv = \langle T_1, T_2 \rangle \quad (31)$$

where $T_1$ and $T_2$ are the vectors defined in equation (29), and $\langle T_1, T_2 \rangle$ denotes the inner product of the vectors.

The integral u can be approximated by fixing at least one of the vectors in advance while allowing at least one of the vectors to vary. In cases in which at least one of the vectors is fixed, approximating the integral is relatively less computationally complex, and therefore relatively faster, than in cases in which none of the vectors are fixed. For example, in equation (31), the vector $T_1$ can be fixed while the vector $T_2$ varies, or vice versa.

Although in equations (29) through (31) the N functions are factored into two sets and one of the sets is fixed, a person of skill would understand that the N functions can be factored into more than two sets, each of the sets having one or more functions, and that one or more of the sets can be fixed or can vary. The remainder of the discussion is directed to an embodiment in which all of the functions $F_i(v)$ are fixed except for one function that is permitted to vary, as shown in equations (32) to (34). In such an embodiment, the relative computational complexity is further decreased, and the relative speed of computation is further increased.

In block 2602, the plurality of functions $F_i(v)$ whose product is being integrated are factored into a set of fixed functions and one variable function as shown in equation (32):

$$u = \int \prod_{i=1}^{N} F_i(v) dv = \int \left[\prod_{i=1}^{N-1} F_i(v)\right] \cdot F_N(v) dv \quad (32)$$

In equation (32), the set of fixed functions is the set $[F_1(v), \ldots, F_{N-1}(v)]$, and the one varying function is the function $F_N(v)$.

In block 2604, a first vector T is determined. The first vector T represents the product of the set of fixed functions $[F_1(v), \ldots, F_{N-1}(v)]$ in the wavelet domain as a series of basis coefficients $(t_1, \ldots, t_M)$ or alternatively as the sum of the series of basis coefficients $t_h$ scaling corresponding basis functions $b_h$ as shown in equation (33)

$$T = (t_1, \ldots, t_h, \ldots, t_M) \text{ where} \quad (33)$$
$$\prod_{i=1}^{N-1} F_i = \sum_{h=1}^{M} [t_h \cdot b_h(v)]$$

In equation (33), $t_h$ is the basis coefficient corresponding to the $h^{th}$ basis function in the basis set $\beta$, and M is the number of basis functions used to represent the product of the set functions in the wavelet domain. The first vector T is determined using a method 2700 described below with reference to FIG. 27, which is a block diagram illustrating an embodiment of a method for determining the basis coefficients of a vector representing the product of a plurality of functions in the wavelet domain. In some embodiments, determining the first vector T comprises pre-computing the first vector T prior to run-time. The first vector T can be pre-computed because the functions whose product is represented by the first vector T are fixed in advance of run-time.

In block 2606, a second vector F is determined. The second vector F is the wavelet domain representation of the one varying function $F_N(v)$, expressing the function $F_N(v)$ as a series of basis coefficients $(f_1, \ldots, f_M)$, or alternatively as the sum of a series of basis coefficients $f_h$ scaling corresponding basis functions $b_h$, as shown in equation (34):

$$F = (f_1, \ldots, f_h, \ldots, f_M) \text{ where} \quad (34)$$
$$F_N(v) = \sum_{h=1}^{M} [f_h \cdot b_h(v)]$$

Determining the second vector F can comprise, for example, projecting the one varying function $F_N(v)$ into the wavelet domain by performing a wavelet transform, encoding the basis coefficients $(f_1, \ldots, f_M)$ of the second vector F in a wavelet tree $W_N$, and performing non-linear approximation on the one varying function $F_N(v)$, as described above with reference to blocks 1602 through 1606 of FIG. 16. In some embodiments, determining the second vector F comprises computing the second vector F at run-time. Computing the second vector at run-time, such as interactively or in real-time, may be desirable because the function $F_N(v)$ is permitted to vary, in which case the second vector F varies also.

In block 2608, the inner product of the first vector T and the second vector F is determined to approximate the integral u of the product of the functions represented by the vectors, as shown in equation (35):

$$u = \int T \cdot F_N(v) dv \approx \langle T, F \rangle = (t_1 f_1 + \ldots + t_M f_M) \quad (35)$$

In equation (35), the integral u is an approximation because the first vector T is fixed and does not vary. However, because the first vector T is fixed, approximating the integral u using the method 2600 is relatively less computationally complex, and therefore relatively faster, than other methods. For example, in embodiments in which the first vector T is precomputed in advance of run-time, the method 2600 can be employed to approximate the integral u interactively and/or in real-time. In such embodiments, both the second vector F and the inner product of the vectors are computed interactively and/or in real-time.

Figure 27:
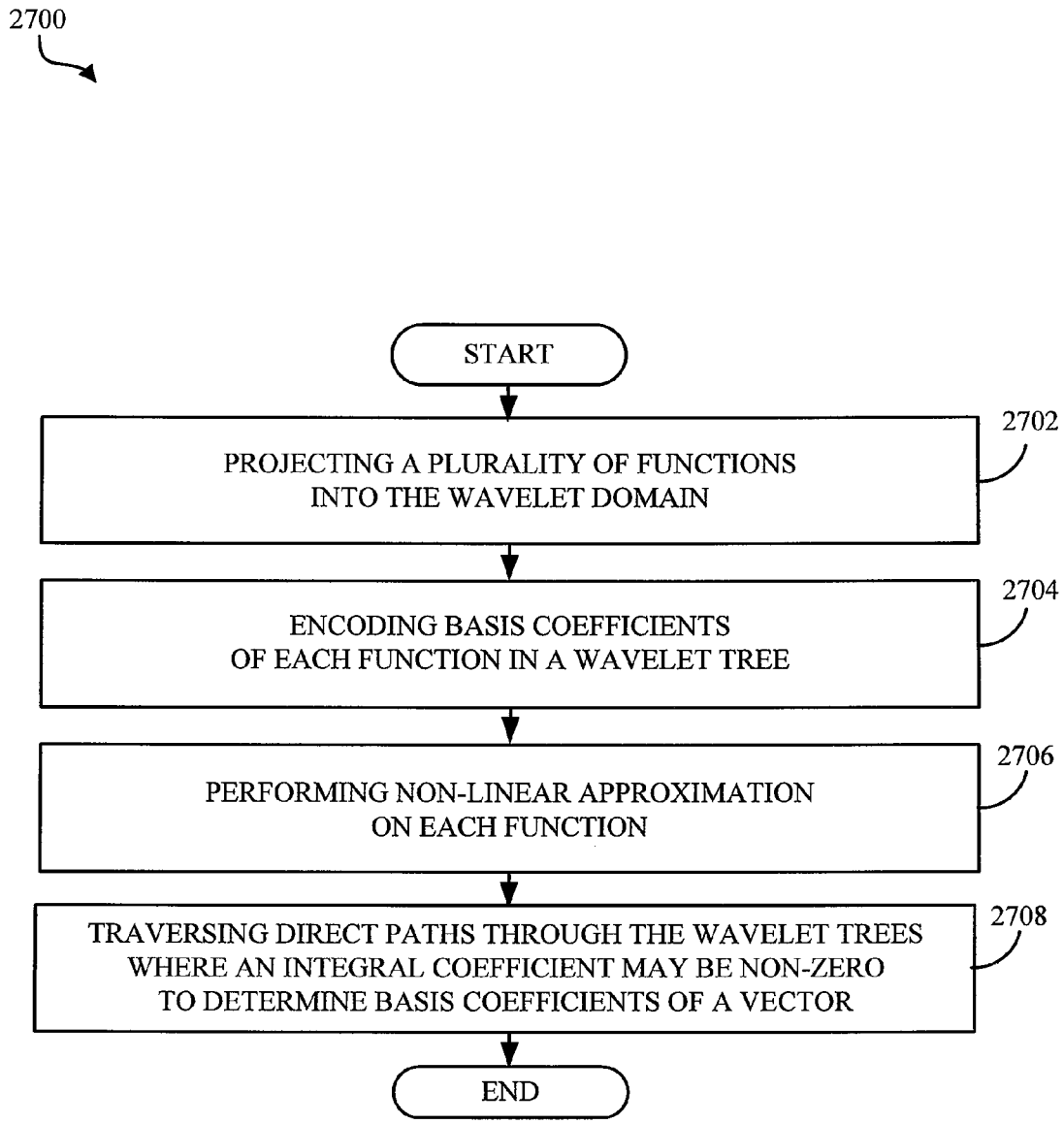
FIG. 27 is a block diagram illustrating an embodiment of a method for determining the basis coefficients of a vector representing the product of a plurality of functions in the wavelet domain.

FIG. 27 is a block diagram illustrating a method 2700 for determining the basis coefficients of a vector representing the product of the functions in the wavelet domain. For illustrative purposes, the method 2700 is described with reference to an example embodiment, in which the plurality of functions is the set of fixed functions $[F_1(v), \ldots, F_{N-1}(v)]$ shown in equation (33). However, a person of skill would understand that the method 2700 generally determines a vector that represents the product of a plurality of functions in the wavelet domain, independent of the method 2600 and regardless of the functions whose product is being represented.

As shown in equation (33), the product of a plurality of functions $F_i(v)$ can be expressed as a series of basis coefficients $(t_1, \ldots, t_M)$ scaling corresponding basis functions. The series of basis coefficients $(t_1, \ldots, t_M)$ constitutes a vector that represents the product of the plurality of functions $F_i(v)$ in the wavelet domain. The basis coefficients $(t_1, \ldots, t_M)$ of the vector T can be determined by projecting the vector onto the basis functions of the basis set B. In such case, the $k^{th}$ basis coefficient $t_k$ of the vector T is determined by taking the dot product of the vector T and the corresponding basis function $b_k$ of the basis set B as shown in equation (36):

$$t_k = \langle T, b_k \rangle \qquad (36)$$

Replacing the vector T in equation (36) with the product of the plurality of functions from equation (33) yields equation (37):

$$t_k = \int \prod_{i=1}^{N-1} \left[ \sum_{h_i=1}^{M} (f_{i,h_i} b_{h_i}) \right] \cdot b_k \, dv \qquad (37)$$

$$= \int \left[ \sum_{h_1=1}^{M} (f_{1,h_1} b_{h_1}) \cdots \sum_{h_{N-1}=1}^{M} (f_{N-1,h_{N-1}} b_{h_{N-1}}) \right] \cdot b_k \, dv$$

$$= \sum_{h_1=1}^{M} \sum_{h_2=1}^{M} \cdots \sum_{h_{N-1}=1}^{M}$$

$$\left[ \overbrace{f_{1,h_1} \cdots f_{N-1,h_{N-1}}}^{N-1 \text{ coefficients}} \int \overbrace{b_k \cdot b_{h_1} \cdots b_{h_{N-1}}}^{N \text{ bases}} dv \right]$$

$$= \sum_{h_1=1}^{M} \sum_{h_2=1}^{M} \cdots \sum_{h_{N-1}=1}^{M} \left[ \prod_{i=1}^{N-1} f_{i,h_i} \cdot C^N_{b_k, b_{h_1}, b_{h_2}, \ldots, b_{h_{N-1}}} \right]$$

$$= [f_{1,1} \cdot f_{2,1} \cdot \ldots \cdot f_{N-1,1} \cdot C^N_{b_k, b_1, b_1, \ldots, b_1}] +$$

$$[f_{1,2} \cdot f_{2,1} \cdot \ldots \cdot f_{N-1,1} \cdot C^N_{b_k, b_2, b_1, \ldots, b_1}] + \ldots +$$

$$[f_{1,M} \cdot f_{2,M} \cdot \ldots \cdot f_{N-1,M-1} \cdot C^N_{b_k, b_M, b_M, \ldots, b_{M-1}}] +$$

$$[f_{1,M} \cdot f_{2,M} \cdot \ldots \cdot f_{N-1,M} \cdot C^N_{b_k, b_M, b_M, \ldots, b_M}]$$

In other words, the $k^{th}$ basis coefficient $t_k$ of the vector T is the sum of a series contributing of products. Each contributing product in the series is the product of multiple basis coefficients $f_{i,h}$ and one $N^{th}$ order integral coefficient $C^N$, the multiple basis coefficients including one basis coefficient $f_{i,h}$ from each of the N-1 functions, and the $N^{th}$ order integral coefficient $C^N$ being the integral of the product of the basis functions $b_h$ that correspond to those basis coefficients $f_{i,h}$ along with the basis function $b_k$ that corresponds to basis coefficient $t_k$ being calculated. It should be noted that h is an integer from 1 to M and i is an integer from 1 to (N-1), M being the number of basis functions $b_h$ used to represent a function $F_i(v)$ and (N-1) being the number of functions $F_i(v)$ whose product is represented by the vector T.

Because the similarities between equation (37) and equation (10) are immediately apparent, the differences between these equations are now described. Equation (10) determines the integral u of the product of a plurality of functions $F_i(v)$, while equation (37) determines one basis coefficient $t_k$ of a vector T that represents the product of a plurality of functions $F_i(v)$ in the wavelet domain. Although either equation generally applies to any number of functions, equation (10) is expressed in terms of a plurality of functions $F_i(v)$ that includes N functions, and equation (37) is expressed in terms of a plurality of functions $F_i(v)$ that includes N-1 functions. Both equations require taking the sum of a series of contributing products, each contributing product one including one basis coefficient $f_{i,h}$ from each function $F_i(v)$ and one $N^{th}$ order integral coefficient $C^N$. In equation (10), each contributing product in the series includes N basis coefficients and in equation (37), each contributing product in the series includes (N-1) basis coefficients. While the number of basis coefficients in a contributing product depends on the equation, in either case the contributing product includes the $N^{th}$ order integral coefficient $C^N$. This means that the order of the $N^{th}$ order integral coefficient $C^N$ matches the number of basis coefficients in equation (10), but is one greater than the number of basis coefficients in equation (37). In equation (10), the $N^{th}$ order integral coefficient $C^N$ is the integral of the N basis functions that correspond to the basis coefficients appearing in the product. The $N^{th}$ order integral coefficient $C^N$ in equation (37) is similar except that the basis function $b_k$ corresponding to the basis coefficient $t_k$ being determined is also included. Thus, while the two equations represent different problems, the efficient solution to both lies in determining the $N^{th}$ order integral coefficient $C^N$. In both cases the principles described above with reference to FIGS. 1-15 are applied.

Returning to the method 2700, in block 2702 each function $F_i(v)$ whose product is to be represented in the wavelet domain is projected into the wavelet domain. In the example embodiment, the plurality of functions includes the functions $F_i(v)$ of the set of fixed functions $[F_1(v), \ldots, F_{N-1}(v)]$. Projecting the functions $F_i(v)$ into the wavelet domain comprises, for example, performing the wavelet transform on each function, as described above with reference to block 1602 of FIG. 16. Each function $F_i(v)$ of the set is then represented as the series of basis coefficients $f_{i,h}$ scaling basis functions $b_h$.

In block 2704, the basis coefficients $f_{i,h}$ of each function $F_i(v)$ are encoded in a wavelet tree. Encoding the basis coefficients $f_{i,h}$ is described above with reference to block 1604 of FIG. 16, and the wavelet trees $W_i$ are described above with reference to FIG. 17. In some embodiments, each function $F_i(v)$ is encoded into one wavelet tree $W_i$, although in other embodiments each function $F_i(v)$ can be represented using more than one wavelet tree. In the example embodiment, each function $F_i(v)$ of the set of fixed functions $[F_1(v), \ldots, F_{N-1}(v)]$ is encoded, and if one wavelet tree is used to represent each function in the set, then (N-1) wavelet trees $W_i$ result.

In block 2706, non-linear approximation is performed on each wavelet tree $W_i$ to discard insignificant basis coefficients $f_{i,h}$. Non-linear approximation is described above with reference to block 1606 of FIG. 16. In some embodiments, the non-linear approximation block 2706 is performed before the encoding block 2704, the non-linear approximation block 2704 is performed on only a subset of the functions $F_i(v)$, or the non-linear approximation block 2704 is omitted completely.

In block 2708, the wavelet trees $W_i$ are traversed on direct paths, along which an $N^{th}$ order integral coefficient $C^N$ may be non-zero, to determine the basis coefficients $t_k$ of the vector T representing the product of the functions $F_i(v)$ in the wavelet domain. Traversing direct paths through the wavelet trees $W_i$ is generally described above with reference to block 1608 of FIG. 16. However, unlike the embodiment of FIG. 16 in which the integral u is incremented as the wavelet trees $W_i$ are traversed, in this embodiment the basis coefficients $t_k$ of the vector T are determined. For example, an output wavelet tree $W_O$ may be encoded as the input wavelet trees $W_i$ are traversed, the output wavelet tree $W_O$ having nodes $w_O$ into which the corresponding basis coefficients $t_k$ of the vector T are encoded. Therefore, in this embodiment, traversing direct paths comprises synchronously traversing a plurality of wavelet trees $W_i$, the wavelet trees $W_i$ storing the basis coefficients of the functions $[F_1(v), \ldots, F_{N-1}(v)]$ whose product is being represented in the wavelet domain, simultaneously processing a set of nodes $[w_1, \ldots, w_{N-1}]$ that includes one node $w_i$ from each wavelet tree $W_i$, incrementing affected basis coefficients $t_k$, and encoding the basis coefficients $t_k$ in output nodes $w_O$ of an output wavelet tree $W_O$. For example, (N−1) wavelet trees $W_i$ may be synchronously traversed in embodiments in which each function $[F_1(v), \ldots, F_{N-1}(v)]$ is represented by exactly one wavelet tree $W_i$.

As described above, the term "traversing direct paths through the wavelet trees $W_i$," denotes that the nodes $w_i$ that are synchronously processed correspond to nodes in the basis function tree that lie on a single direct path through the basis function tree, as described above with reference to FIG. 7. Traversing the wavelet trees $W_i$ only on the direct paths employs the principles described above: the $N^{th}$ order integral coefficient $C^N$ of basis functions may be nonzero if each of the basis functions lie on a single direct path through the basis function tree; however, the $N^{th}$ order integral coefficient $C^N$ is zero if the basis functions do not lie on a single direct path through the basis function tree. Recall that each basis coefficient $t_k$ is the sum of a series of contributing products, as shown in equation (37), each contributing product including one basis coefficient from each function $[F_1(v), \ldots, F_{N-1}(v)]$ and one $N^{th}$ order integral coefficient $C^N$, which is the integral of the corresponding basis functions and the basis function $b_k$ whose basis coefficient $t_k$ is being determined. Confining the traversal to direct paths through the wavelet trees $W_i$ while avoiding the indirect paths enables accumulating contributing products that could contribute to the basis coefficient $t_k$ while avoiding those that necessarily do not contribute to the basis coefficient $t_k$. As a result, traversing the wavelet trees $W_i$ on direct paths determines the basis coefficients $t_k$ of a vector T with the same accuracy but with fewer computations than other systems and methods.

Figure 28:
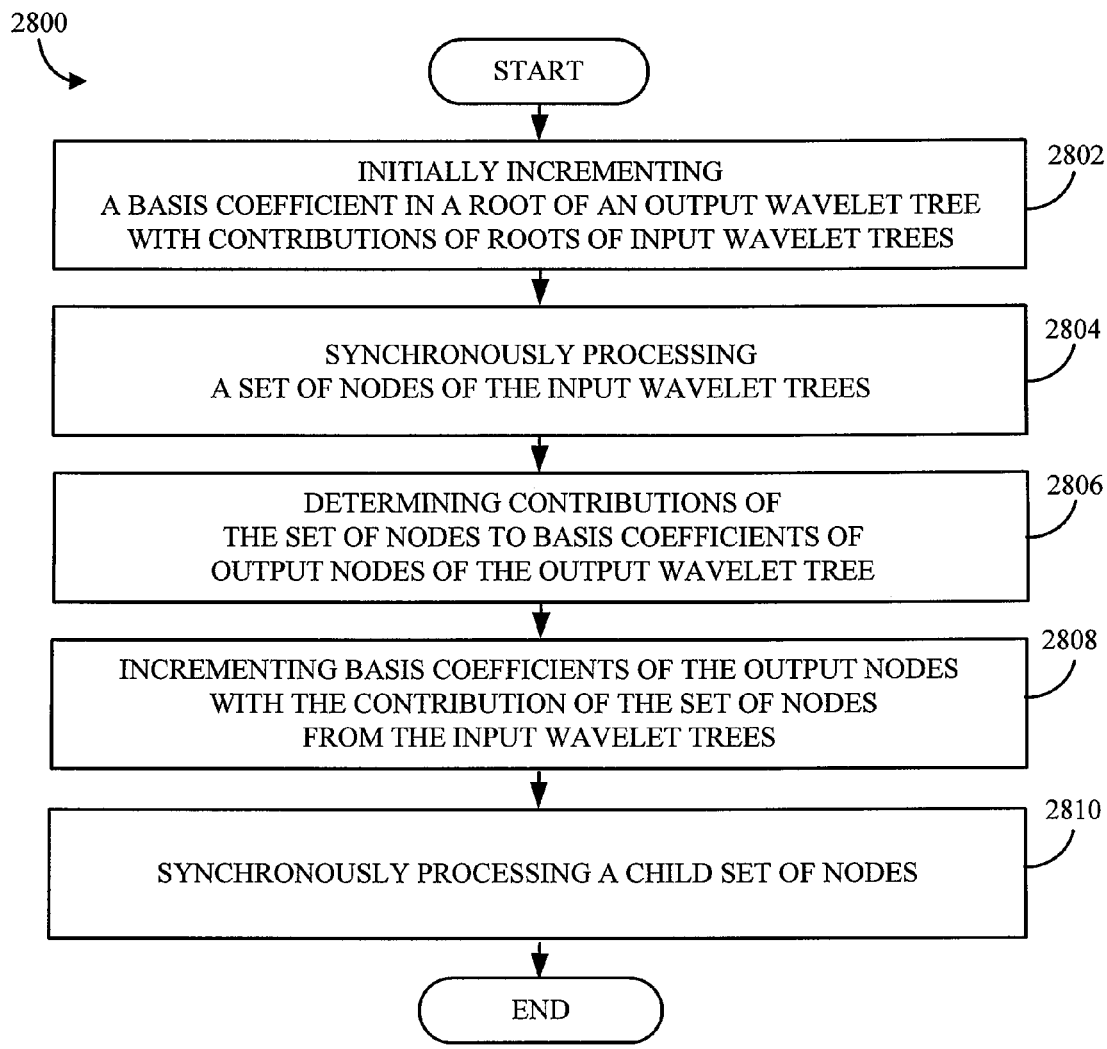
FIG. 28 is a block diagram illustrating an embodiment of a method for traversing direct paths through a plurality of wavelet trees to determine the basis coefficients of a vector representing the product of the corresponding functions in the wavelet domain.

FIG. 28 is a block diagram illustrating an embodiment of a method 2800 for traversing direct paths through a plurality of wavelet trees $W_i$ to determine the basis coefficients $t_k$ of a vector T representing the product of the functions $F_i(v)$ in the wavelet domain, which can be employed in block 2708 of FIG. 27. In block 2802, a basis coefficient in a root of an output wavelet tree $W_O$ is initially incremented with contributions of basis coefficients in roots of input wavelet trees $W_i$. The contribution to the root of the output wavelet tree $W_O$ is determined by multiplying together the mother scaling coefficient stored in the root of each input wavelet tree $W_i$, because in such case the $N^{th}$ order integral coefficient $C^N$ is one. In block 2804, a set of nodes $[w_1, \ldots, w_{N-1}]$ of the input wavelet trees $W_i$ are synchronously processed. The set of nodes $[w_1, \ldots, w_{N-1}]$ includes one node $w_i$ from each of the input wavelet trees $W_i$. No two nodes $w_i$ in the set correspond to supports <j, k, l> that are completely disjoint from each other, because the input wavelet trees $W_i$ are traversed on direct paths. In block 2806, contributions of the set of nodes $[w_1, \ldots, w_{N-1}]$ to the basis coefficients $t_k$ of output nodes $w_O$ of the output wavelet tree $W_O$ are determined. In some embodiments, the contribution of the set of nodes $[w_1, \ldots, w_{N-1}]$ is determined by separating the nodes into a group of null nodes and a group of non-null nodes, determining a contribution of the null nodes, and determining a contribution of non-null nodes. The contribution of null nodes is limited to the contribution of their parent nodes, which is not ignored even though the nodes themselves are null. The contribution of the non-null nodes is determined by iterating through the set of nodes to build a table that accumulates the magnitude of the contribution of the non-null nodes. In block 2808, basis coefficients $t_k$ of output nodes $w_O$ are incremented with contributions of the set of nodes $[w_1, \ldots, w_{N-1}]$. In some embodiments, both the basis coefficients $t_k$ of both the output node $w_O$ and the parent of the output node $w_O$ are updated. In block 2810, a set of child nodes is synchronously processed. The set of child nodes includes one node $w_i$ from each of the input wavelet trees $W_i$, the one node $w_i$ being the immediate child of the node most recently processed. Because the child nodes immediately depend from the most recently processed nodes, the input wavelet trees $W_i$ are traversed along direct paths. The contribution of the set of child nodes may then be determined in the manner described above, and the basis coefficients $t_k$ of the output nodes $w_O$ may be incremented, and the process may be repeated for subsequent sets of child nodes until the last set of nodes is reached.

In at least some embodiments, traversing direct paths through the wavelet trees $W_i$ in block 2708 of FIG. 27 comprises applying a tree-traversal algorithm to the wavelet trees. FIG. 29 illustrates in pseudo code 2900 an example tree-traversal algorithm 2902 for determining the basis coefficients of a vector representing the product of a plurality of functions in the wavelet domain, and embodiments of component routines such as a routine 2904, a routine 2906, a routine 2908, a routine 2910, and a routine 2912. The algorithm 2902 is defined as FunctionProduct in line 1, accepting as input a set of wavelet trees $(W_O, \ldots, W_{N-1})$. The wavelet trees $(W_1, \ldots, W_{N-1})$ include one wavelet tree for each function in the set of fixed functions $[F_1(v), \ldots, F_{N-1}(v)]$ whose product is being represented in the wavelet domain. The wavelet tree $W_O$ is an output wavelet tree into which basis coefficients determined by the algorithm 2902 are encoded, the basis coefficients being the basis coefficients $t_k$ of the vector T representing the product of a plurality of functions in the wavelet domain.

In line 2, the product of the mother scaling coefficients of each of the fixed functions $(F_1(v), \ldots, F_{N-1}(v))$ are encoded in the variable $W_O.dc$, which is determined by taking the product of the variables $W_i.dc$ for wavelet trees $W_i$ for i from 1 to (N−1). In line 3, the routine getCoefficients 2904 is called. The routine 2904 is configured to simultaneously process a set of nodes $(w_1, \ldots, w_{N-1})$ that includes one node $w_i$ from each wavelet tree $W_i$ and to encode the result of processing the nodes in the corresponding node $w_O$ of the output wavelet tree $W_O$. For its initial call, the routine 2904 processes the set of mother nodes $(W_1.node, \ldots, W_{N-1}.node)$ that include the mother wavelet coefficients. The routine 2904 then iteratively calls itself to process sets of nodes corresponding to higher scales and located at lower traversal depths, traversing the set of wavelet trees $(W_1, \ldots, W_{N-1})$ along the direct paths to determine and encode the basis coefficients in the output nodes $w_0$. It is worth noting that in a single call to the algorithm 2902, all of the basis coefficients of the vector of the vector are determined and encoded in the output wavelet tree $W_0$.

The routine getCoefficients 2904 is defined in line 1 to accept as input the variable cum, and a set of nodes ($w_0, \ldots, w_{N-1}$). When the routine is initially called in line 3 of algorithm 2902, the value one is passed into the routine for the variable cum. Note that the variable cum is described above with reference to the pseudo code 1900 and 2000, and therefore a complete discussion is omitted here. In line 2, the nodes of the set of nodes ($w_1, \ldots, w_{N-1}$) are reorganized into a two sets of nodes: one being a set of non-null nodes ($w_1, \ldots, w_k$) and the other being a set of null nodes ($W_{k+1}, \ldots, w_{N-1}$). Up to this point, the subscript i has denoted that a specific wavelet tree $W_i$ corresponds to a specific function $F_i(v)$, or alternatively that a specific node $w_i$ is a node of a specific wavelet tree $W_i$. For the remainder of the discussion of the algorithm 2902, the subscript i merely indicates whether the node $w_i$ is null or non-null, with non-null nodes having subscripts $w_1$ to $w_k$ and null nodes having subscripts $W_{k+1}$ to $w_{N-1}$. It is likely that some of the nodes $w_i$ are null in embodiments in which non-linear approximation is performed.

In line 3, the routine 2904 returns if all of the nodes in the set ($w_1, \ldots, w_{N-1}$) are null. This is because if all of the nodes are null, then all of the nodes of higher scales at lower traversal depths will also be null as a result of the non-linear approximation. In line 4, the variable $w_i$.parentsum is updated for each node in the set ($w_1, \ldots, w_{N-1}$). The variable parentsum is described above with reference to the pseudo code 1900 and 2000, and therefore a complete discussion is omitted here. In line 5, the variable cum is updated for the set of null nodes ($w_{k+1}, \ldots, w_{N-1}$). In line 6, the routine updateParents 2906 is called, as described in detail below. In lines 7-9, the three wavelet coefficients $\psi[0]$, $\psi[1]$, and $\psi[2]$ of the output node $w_0$, are updated with the value of cum multiplied by the return of the routine get W(i) 2912. In lines 10-11, the routine 2904 then iteratively calls itself to four times to independently process the next four sets of nodes, which are the immediate child nodes of the non-null nodes. In other words, the routine 2904 calls itself for the nodes ($w_1$.ch[i], ..., $w_k$.ch[i]) in a loop, where ch[i] is the pointer to the child node and i is an integer from 0 to 3.

The routine updateParents 2906 is defined in line 1 to accept as inputs the output node $w_0$ corresponding to the set of nodes ($w_1, \ldots, w_{N-1}$) currently being processed, and the variable cum multiplied by the return of getProductIntegral 2908 for the non-null nodes ($w_1, \ldots, w_k$) of the set currently being processed. In line 2, the output node $w_0$ of the output wavelet tree $W_0$ is updated with a variable val, which is the product of the variable cum and the return of the routine getProductIntegral 2908 described below. In other words, output node $w_0$ is updated with the contributions of the non-null nodes ($w_1, \ldots, w_k$) in the set of nodes currently being processed, and the contributions of the parents of the null nodes ($w_{k+1}, \ldots, w_{N-1}$) in the set currently being processed. In lines 5-7, the three basis coefficients $t_k$ in the parent of the output node $w_0$ are also updated with the product of the variable val, a sign, and the magnitude of a parent basis function multiplied by an immediate child basis function.

The routine getProductIntegral 2908 is the exact same as the routine getProductIntegral 2006 described above. Further, the routines that it calls, including the routine getP(i) 2910 and the routine getW(i) 2912, are the exact same as the routines getP(i) 2008 and getW(i) 2010 described above. Therefore, the reader is referred to the prior discussion. Note that the output of the algorithm 2902 is the wavelet tree $W_0$, and the nodes $w_0$ of the wavelet tree $W_0$ include the basis coefficients $t_k$ of the vector T that represents the product of the plurality of functions ($F_1(v), \ldots, F_{N-1}(v)$) in the wavelet domain.

The computational complexity of the algorithm 2902 is the order of O(mn), where m is the number of basis coefficients retained after the non-linear approximation and N is the number of functions $F_i(v)$ whose product is being represented in the wavelet domain. Note that the algorithm 2902 determines all of the basis coefficients in a single call and need not be applied iteratively.

Figure 30:
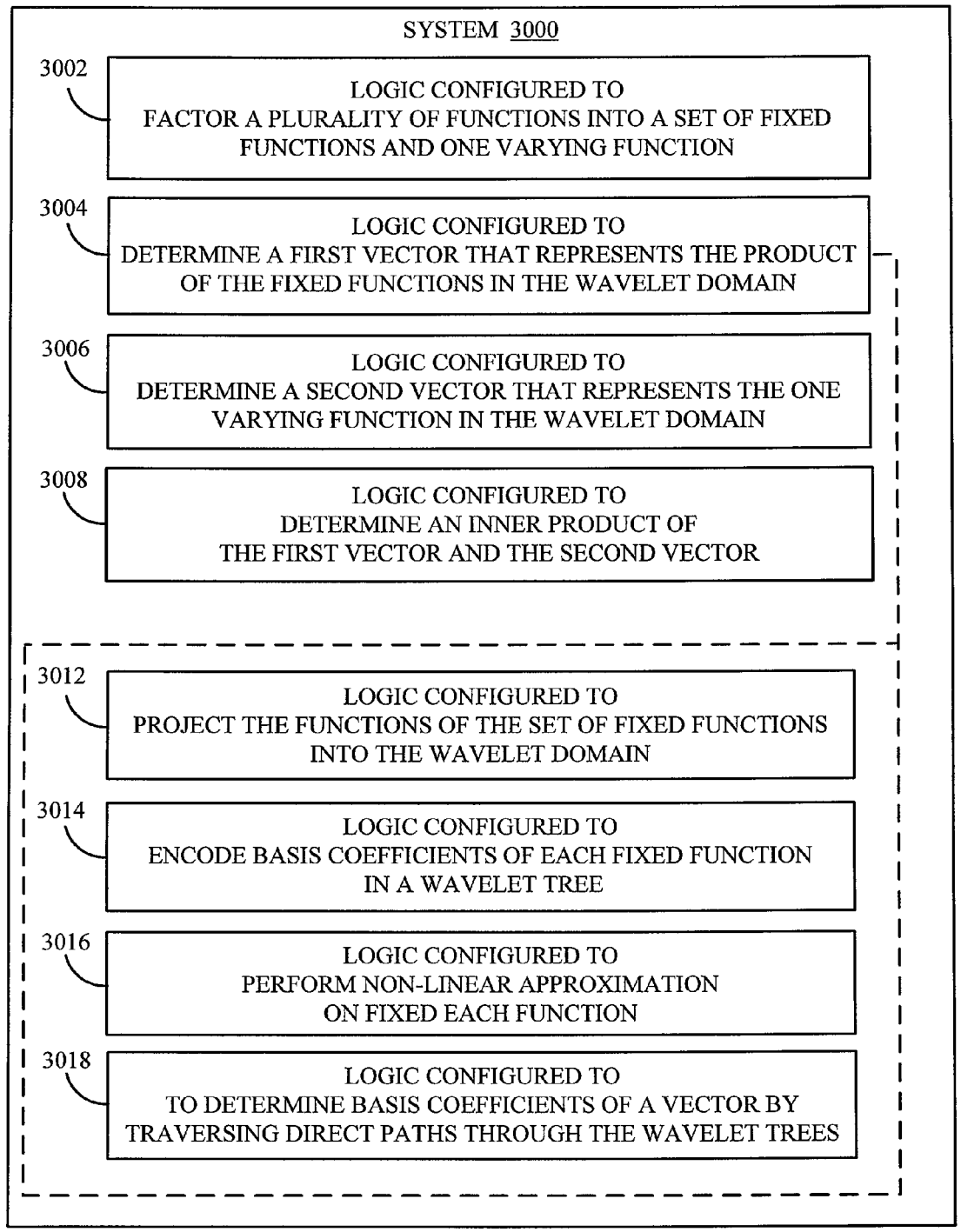
FIG. 30 is an embodiment of a system for approximating the integral of the product of the plurality of functions.

FIG. 30 is a block diagram illustrating a system 3000 for determining the wavelet domain representation of the product of a plurality of functions. The system 3000 includes logic 3002 configured to factor a plurality of functions into a set of fixed functions and one varying function, logic 3004 configured to determine a first vector that represents the product of the fixed functions in the wavelet domain, logic 3006 configured to determine a second vector that represents the one varying function in the wavelet domain, and logic configured to determine an inner product of the first vector and the second vector.

As shown, the logic 3004 configured to determine a first vector that represents the product of the fixed functions in the wavelet domain may include logic 3012 configured to project the functions of the set of fixed functions into the wavelet domain, logic 3014 configured to encode basis coefficients of each fixed functions in a wavelet tree, logic 3016 configured to perform non-linear approximation on each fixed function, and logic 3018 configured to determine basis coefficients of a vector by traversing direct paths through the wavelet trees.

Described above are systems and method for determining the integral u of the product of a plurality of functions, with reference to FIGS. 1-22. Such systems and methods are applied to determine the radiance B of a point x in a scene using a light transport model of the lighting and objects in a scene, with reference to FIGS. 23-25. Also described above are systems and methods for approximating the integral of the product of a plurality of functions by fixing at least some of the functions whose product is being integrated, with reference to FIGS. 26-30. Such systems and method for approximating the integral are employed to approximate the radiance B of the point x in the scene, with reference to FIGS. 31-32 below.

Figure 31:
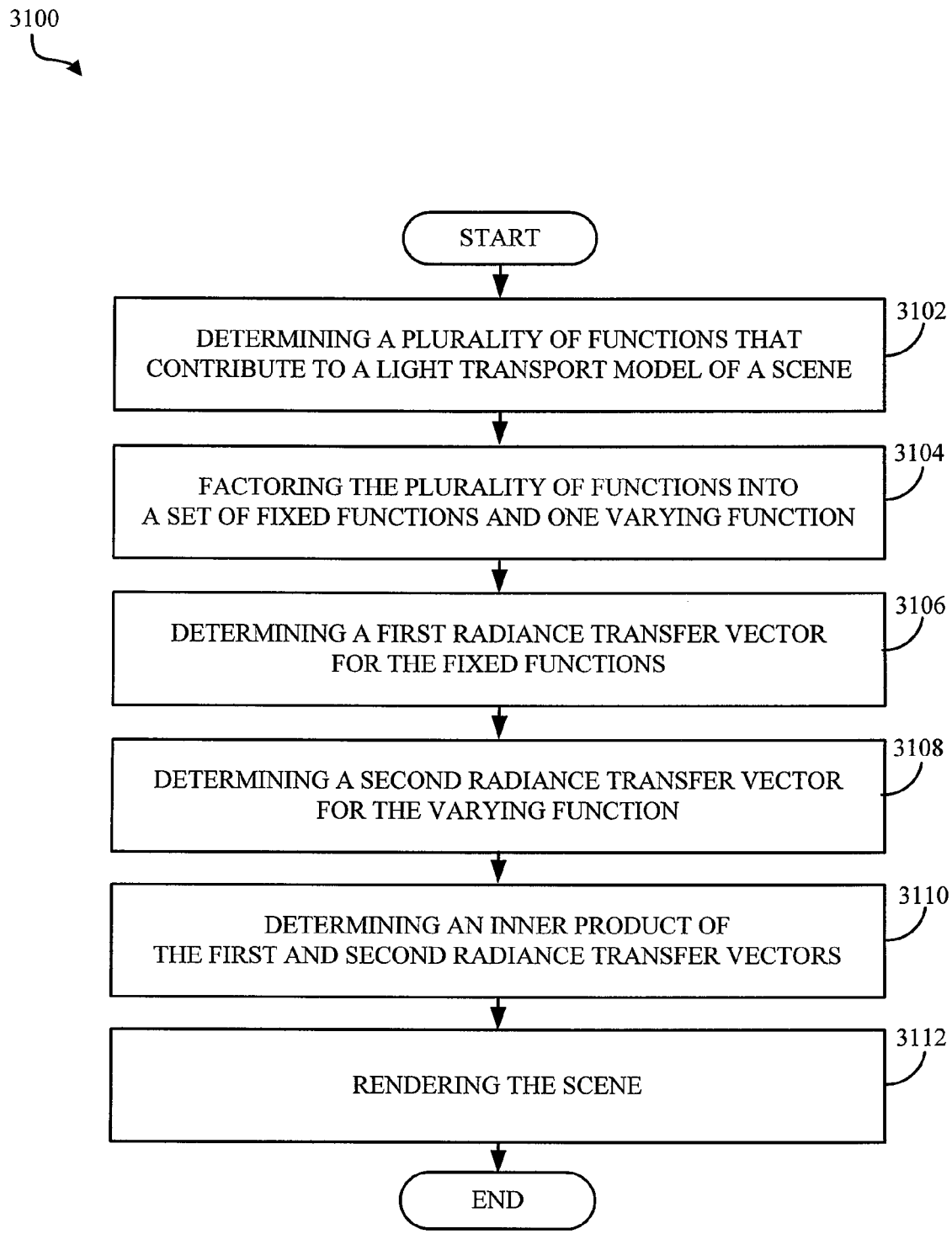
FIG. 31 is a block diagram illustrating an embodiment of a method of rendering a graphical scene by approximating a radiance of a point x in a scene.

FIG. 31 is a block diagram illustrating an embodiment of a method 3100 for rendering a graphical scene by approximating the radiance B of a point x in the scene using a light transport model of the scene. The scene is a scene such as the scene 2300 described above with reference to FIG. 23, and the light transport model of the scene is represented, for example, in equation (28), which is repeated below:

$$B = \int_S L(\varphi)\rho(\varphi)\tilde{O}_L(\varphi) \prod_{i=1}^{g} O_i(\varphi) d\varphi \qquad (28)$$

In block 3102, a plurality of functions $F_i(\phi)$ that contribute to the light transport model of the scene are determined. For example, the functions $F_i(\phi)$ can include the distant environment lighting function $L(\phi)$, the BRDF $\rho(\phi)$, the local visibility function $\tilde{O}_L(\phi)$, and one or more dynamic occlusion functions $O_i(\phi)$. Determining the plurality of functions $F_i(\phi)$ is described above with reference to block 2402 of FIG. 24. In some embodiments, determining the functions $F_i(\phi)$ comprises determining cubemap functions 2310, such as from sampled data in the scene, as discussed above. The sampled data may be compiled interactively or in advance of run-time, and in cases in which the sampled data is compiled in advance, the cubemap functions 2310 may be pre-computed or may be computed interactively. However, all of the cubemap functions 2310 do not need to be determined at the same time. More specifically, the cubemap functions 2310 that correspond to the functions that are fixed can be pre-determined, while the cubemap function that corresponds to the one varying function can be determined interactively. For example, in embodiments in which the lighting is permitted to vary but the other functions are fixed, the distant environment lighting function $L(\phi)$ may be determined interactively, while the BRDF $\rho(\phi)$, the local visibility function $\tilde{O}_L(\phi)$, and the one or more dynamic occlusion functions $O_i(\phi)$ may be computed in advance.

In block 3104, the functions that contribute to the light transport model are factored into a set of fixed functions $[F_i(\phi), \ldots, F_{N-1}(\phi)]$ and one varying function $F_N(\phi)$, as shown in equation (38):

$$B = \int L(\varphi)\rho(\varphi)\tilde{O}_L(\varphi) \prod_{i=1}^{g} O_i(\varphi) d\varphi \qquad (38)$$

$$= \int \left[ \prod_{i=1}^{N-1} F_i(\varphi) \right] \cdot F_N(\varphi) d\varphi$$

Factoring the functions is generally described above with reference to block 2602 of FIG. 26. In some embodiments, the one varying function $F_N(\phi)$ is pre-determined and is unchangeable, but in other embodiments the one varying function $F_N(\phi)$ is determined interactively, such as in response to user input. For example, in one embodiment a user can select an object in the scene, and in response to the selection, the dynamic occlusion function $O_i(\phi)$ of the object is allowed to vary while the other functions are fixed.

In block 3106, a first radiance transfer vector T is determined. Determining the first radiance transfer vector T is generally described above with reference to block 2604 of FIG. 26. The first radiance transfer vector T represents the product of the set of fixed functions $[F_1(\phi), \ldots, F_{N-1}(\phi)]$ in the wavelet domain as a series of basis coefficients $(t_1, \ldots, t_M)$, or alternatively, as a series of basis coefficients $t_h$ scaling a series of basis functions $b_h$, as shown in equation (39):

$$T = (t_1, \ldots, t_h, \ldots, t_M) \text{ where} \qquad (39)$$

$$\prod_{i=1}^{N-1} F_i = \sum_{h=1}^{M} [t_h \cdot b_h(\varphi)]$$

Therefore, determining the first radiance transfer vector T comprises determining a series of basis coefficients $(t_1, \ldots, t_M)$. Using the method 2700 described above with reference to FIG. 27, determining the series of basis coefficients $(t_1, \ldots, t_M)$ generally comprises projecting each function $F_i(\phi)$ in the set of fixed functions $[F_1(\phi), \ldots, F_{N-1}(\phi)]$ into the wavelet domain (block 2702), encoding each function $F_i(\phi)$ in a wavelet tree $W_i$ (block 2704), subjecting each function $F_i(\phi)$ to non-linear approximation (block 2706), and traversing the wavelet trees $W_i$ along direct paths to determine the basis coefficients of the vector (block 2708). Traversing the wavelet trees $W_i$ along direct paths may comprise performing the method 2800 described above with reference to FIG. 28 or applying the tree-traversal algorithm 2902, described above with reference to FIG. 29. In such case, the output wavelet tree $W_O$ of the tree-traversal algorithm 2902 stores the basis coefficients $(t_1, \ldots, t_M)$ of the first radiance transfer vector T.

In embodiments in which the functions $F_i(\phi)$ are cubemap functions 2310, the first radiance transfer vector T corresponds to one face 2308 of the cubemap S. Therefore, determining the first radiance transfer vector T comprises determining a set of first radiance transfer vectors $[T_1, \ldots, T_6]$, each vector $T_i$ of the set corresponding to one face of the cubemap S.

In some embodiments, determining the first radiance transfer vector T comprises pre-computing the first radiance transfer vector T prior to run-time, although in other embodiments the first radiance transfer vector T is computed interactively. Also, in some embodiments, determining the first radiance transfer vector T comprises determining a plurality of first radiance transfer vectors T corresponding to distinct sets of fixed functions $[F_1(\phi), \ldots, F_{N-1}(\phi)]$. For example, if the lighting function $L(\phi)$ is permitted to vary, the functions in the set of fixed functions are different than if the BRDF $\rho(\phi)$ is permitted to vary. Especially in embodiments in which the first radiance transfer vector T is pre-computed but the one varying function $F_N(\phi)$ is selected interactively, it may be desirable to determine a plurality of first radiance transfer vectors T corresponding to distinct sets of fixed functions $[F_1(\phi), \ldots, F_{N-1}((\phi)]$ so that regardless of the function $F_N(\phi)$ interactively selected to vary, the corresponding first radiance transfer vector T is already pre-computed and ready for use in real-time. In embodiments in which the functions $F_i(\phi)$ are cubemap functions 2310, determining the plurality of first radiance transfer vectors T comprises determining a plurality of sets of first radiance transfer vectors $[T_1, \ldots, T_6]$, each vector $T_i$ of the set corresponding to one face 2308 of the cubemap S, and each set $[T_1, \ldots, T_6]$ of the plurality of sets corresponding to one of the potential sets of fixed functions $[F_1(\phi), \ldots, F_{N-1}(\phi)]$.

In block 3108, a second radiance transfer vector F is determined. The second radiance transfer vector F represents the one varying function $F_N(\phi)$ in the wavelet domain as a series of basis coefficients $(f_1, \ldots, f_M)$, or alternatively, as a series of basis coefficients $f_h$ scaling a series of basis functions $b_h$, as shown in equation (40):

$$F = (f_1, \ldots, f_h, \ldots, f_M) \text{ where} \qquad (40)$$

$$F_N(v) = \sum_{h=1}^{M} [f_h \cdot b_h(\varphi)]$$

Determining the second radiance transfer vector F is generally described above with reference to block 2606 of FIG. 26 and can comprise projecting the one varying function $F_N(\phi)$ into the wavelet domain by performing a wavelet transform, encoding the basis coefficients $(f_1, \ldots, f_M)$ of the second vector F in a wavelet tree $W_i$, and performing non-linear approximation on the one varying function $F_N(\phi)$.

In embodiments in which the functions $F_i(\phi)$ are cubemap functions 2310, the second radiance transfer vector T corresponds to one face 2308 of the cubemap function. Therefore, determining the second radiance transfer vector T comprises determining a set of second radiance transfer vectors $[F_1, \ldots, F_6]$, each vector $F_i$ of the set corresponding to one face 2308 of the cubemap function.

In at least some embodiments, determining the second radiance transfer vector F comprises iteratively determining the second radiance transfer vector F in response to changing conditions in the scene 2300. While the first radiance transfer vector T can be fixed because the functions [$T_1(\phi)$, ..., $T_{N-1}(\phi)$] represented by the vector T do not change, the same is not true for the second radiance transfer vector F, which represents the one varying function $F_N(\phi)$. Therefore, it may be desirable to determine the first radiance transfer vector T once, while determining the second radiance transfer vector F iteratively and interactively, in response to changing conditions in the scene 2300.

In block 3110, an inner product of the first radiance transfer vector T and second radiance transfer vector F is determined. Taking the inner product of the first radiance transfer vector T and second radiance transfer vector F approximates the radiance B of the point x, as shown by re-writing equation (38) in terms of equation (39) and equation (40):

$$B = \int L(\varphi)\rho(\varphi)\tilde{O}_1(\varphi)\prod_{i=1}^{g} O_i(\varphi)d\varphi \quad (41)$$

$$= \int \left[\prod_{i=1}^{N-1} F_i(\varphi)\right] \cdot F_N(\varphi)d\varphi$$

$$\cong \langle T, F \rangle$$

In equation (41), the radiance B is an approximation because the first radiance transfer vector T is fixed and does not vary. However, because the first radiance transfer vector T is fixed, approximating the radiance B using the method 3100 is relatively less computationally complex, and therefore relatively faster, than other methods. For example, in embodiments in which the first radiance transfer vector T is pre-computed and the second radiance transfer vector F is determined interactively, the method 3100 can be employed to approximate the radiance B interactively and/or in real-time by taking the inner product of the two vectors interactively and/or in real-time.

In embodiments in which the functions $F_i(\phi)$ are cubemap functions 2310, the inner product of the first radiance transfer T vector and second radiance transfer vector F corresponds to one face 2308 of the cubemap S. Therefore, determining the inner product comprises determining inner products of a set of first radiance transfer vectors [$T_1$, ..., $T_6$] and a set of second radiance transfer vectors [$F_1$, ..., $F_6$] and summing the inner products together, each inner product corresponding to one face 2308 of the cubemap S and the sum of the inner products representing the radiance B over the entire cubemap S.

In block 3112, the scene is rendered, as described above with reference to block 2412 of FIG. 24. The radiance B for the point x determined in block 3110 is used by the graphics rendering application to set the color of the point x. In at least some embodiments, the radiance B of the point x represents one color value for the point, but to render the scene the graphics rendering application requires three color values, one for each of three independent color channels. Therefore, in such embodiments the above blocks are iterated to independently process each of the three independent color channels, such that three color values are available to the graphics rendering application for the point x. The above steps are also iterated for each visible point x before the final scene is rendered, because a plurality of points x are combined to produce objects, and a plurality of objects are combined to produce the rendered scene.

The method 3100 can be employed to generate all-frequency shadows in real-time. In embodiments in which the first radiance transfer vector T is pre-computed but the second radiance transfer vector F is determined interactively, the method 3100 can be considered a method of just-in-time radiance transfer (JRT), unlike prior pre-computed radiance transfer (PRT) methods, such as those disclosed by Sloan et al. in "Precomputed radiance transfer for real-time rendering in dynamic-low-frequency lighting environments," *ACM Transactions on Graphics (SIGGRAPH '02)* 21, 3, 527-536, which is incorporated by reference herein in its entirety.

Allowing only one function to vary is reasonable in some cases, such as in lighting design systems, in which the designer typically adjusts only one variable at a time. For example, the designer may experiment with the lighting by varying the lighting function L($\phi$) without varying the direction of view $\theta$ or the objects 2302, 2306 in the scene 2300. The designer may also render the scene from different directions of view $\theta$ while maintaining the current lighting L($\phi$) and objects 2302, 2306 in the scene 2300. In other cases, the designer may change the location of one object 2302 or 2306 in the scene 2300 while holding the lighting function L($\phi$) and direction of view $\theta$ constant. As long as only one varying function $F_N(\phi)$ is selected, the method 3100 can be employed to generate all-frequency shadows in real-time.

Because the method 3100 employs pre-computed data on individual objects 2302, 2306 in the scene 2300 instead of pre-animated models of the scene as a whole, the objects in the scene can be manipulated interactively, such as by cloning, scaling, and/or translating the objects. Even in such cases of interactive manipulation, the method 3100 can be is employed to render the objects with all-frequency shadows in real-time. Glossy materials are also supported, such that dynamic high-glossy objects can be rendered in real-time with realistic, all-frequency shadows.

The method 3100 supports interactively changing the function selected as the one varying function $F_N(\phi)$. In embodiments in which a plurality of first radiance transfer vectors T are pre-computed in block 3106 for different sets of fixed functions [$F_1(\phi)$, ..., $F_{N-1}(\phi)$], the one varying function $F_N(\phi)$ can be changed in real-time without repeating block 3106. For example, if the distant environment lighting function L($\phi$) is selected as the one varying function $F_N(\phi)$, rendering the scene for a variety of lighting conditions in real-time reduces to iteratively determining the second radiance transfer vector F of the lighting function in real-time and taking the inner product of the two radiance transfer vectors T and F in real-time, because the first radiance transfer vector T for the set of fixed functions [$\rho(\phi)$, $\tilde{O}_L(\phi)$, $O_1(\phi)$, ..., $O_g(\phi)$] was determined in advance. If the one varying function $F_N(\phi)$ is interactively changed from the distant environment lighting function L($\phi$) to the first dynamic occlusion function $O_1(\phi)$, rendering the scene for the moving object in real-time reduces to iteratively determining the second radiance transfer vector F of the dynamic occlusion function in real-time and taking the inner product of the two radiance transfer vectors in real-time, because the first radiance transfer vector T for the set of fix functions [L($\phi$), $\rho(\phi)$, $\tilde{O}_L(\phi)$, $O_2(\phi)$, ..., $O_g(\phi)$] was pre-computed in advance.

Figure 32:
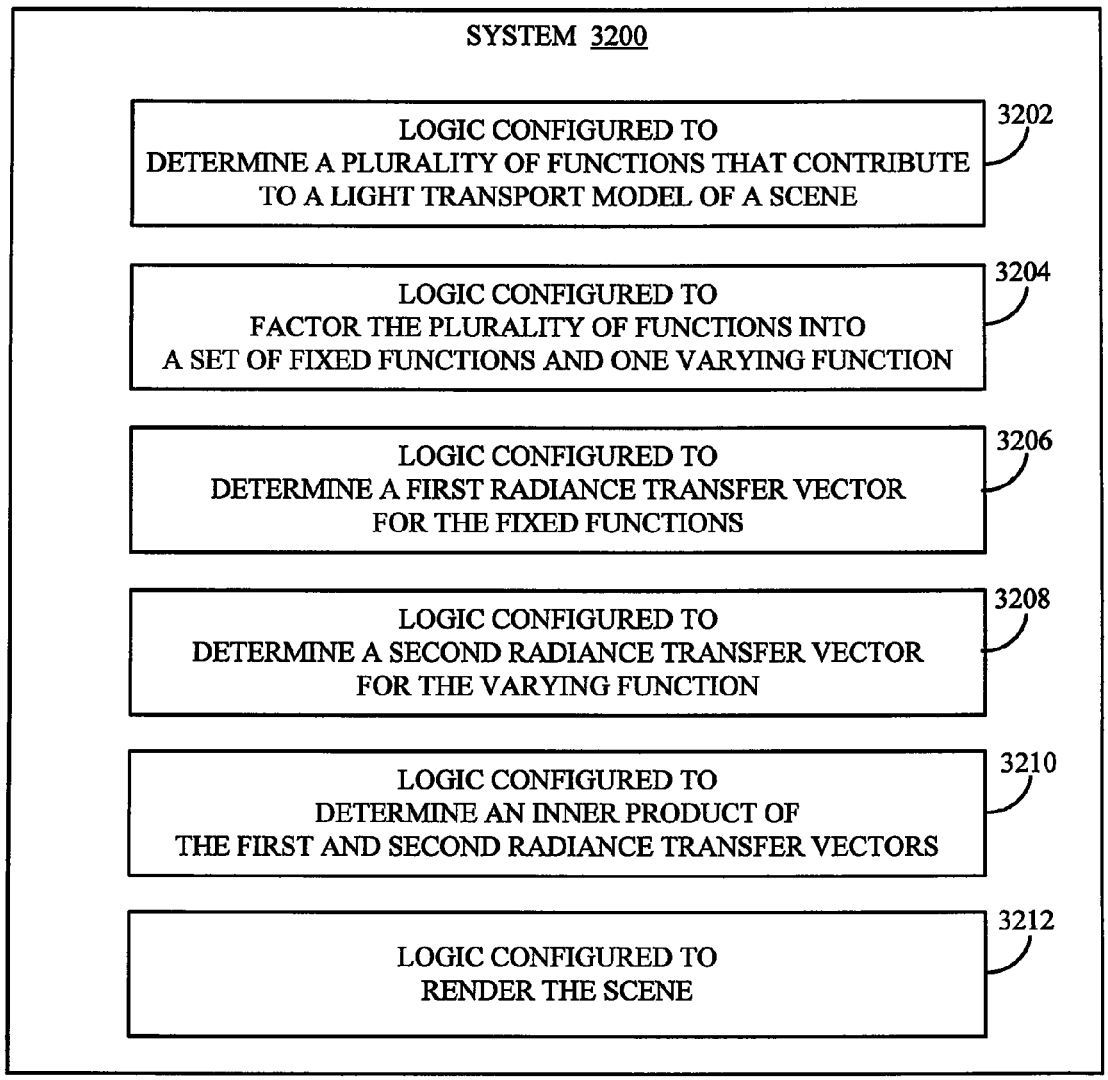
FIG. 32 is a block diagram illustrating an embodiment of a system for rendering a graphical scene by approximating a radiance of a point x in a scene.

FIG. 32 is a block diagram illustrating an embodiment of a system 3200 for rendering a graphical scene by approximating the radiance of the point x in a scene using a light transport model of the scene. The system 3200 includes logic 3202 configured to determine a plurality of functions that contribute to a light transport model of a scene, logic 3204 configured to factor the plurality of functions into a set of fixed functions and one varying function, logic 3206 configured to determine a first radiance transfer vector for the set of fixed functions, logic 3208 configured to determine a second radiance transfer vector for the one varying function, logic 3210 configured to determine the inner product of the first and second radiance transfer vectors, and logic 3212 configured to render the scene.

While particular embodiments of systems and methods for determining the integral of the product of a plurality of functions, and for determining the product of a plurality of functions, have been disclosed in detail in the foregoing description and figures for purposes of example, those skilled in the art will understand that variations and modifications may be made without departing from the scope of the disclosure. All such variations and modifications are intended to be included within the scope of the present disclosure, as protected by the following claims.

At least the following is claimed:

1. A method of rendering a graphical scene using a computer, the method comprising:
   determining with the computer a plurality of functions that contribute to a light transport model of a scene;
   factoring with the computer the plurality of functions into a set of fixed functions and one varying function, the varying function being interactively determinable and therefore permitted to vary during the rendering, and the fixed functions being computed in advance of the rendering so as to be invariable during the rendering;
   determining with the computer a first radiance transfer vector that represents a product of the fixed functions in the wavelet domain;
   determining with the computer a second radiance transfer vector that represents the one varying function in the wavelet domain;
   determining with the computer an inner product of the first and second radiance transfer vectors to approximate a radiance of a point x in the scene; and
   rendering with the computer the scene.

2. The method of claim 1, wherein determining the plurality of functions that contribute to the light transport model of the scene comprises determining a distant environment lighting function, a bi-directional reflectance distribution (BRDF), a local visibility function, and one or more dynamic occlusion functions.

3. The method of claim 2, wherein determining the plurality of functions that contribute to the light transport model of the scene further comprises collecting sampled data about the scene, and processing the sampled data to create a plurality of cubemap functions, one cubemap function being created for each function that contributes to the light transport model of the scene.

4. The method of claim 1, wherein determining the plurality of functions comprises pre-computing a cubemap function for each of the fixed functions, and interactively determining a cubemap function for the one varying function.

5. The method of claim 1, wherein determining a first radiance transfer vector that represents the product of the fixed functions in the wavelet domain comprises:
   projecting each function of the set of fixed functions into the wavelet domain;
   encoding each function of the set of fixed functions in a wavelet tree;
   traversing direct paths through the wavelet trees, along which direct paths an integral coefficient may be non-zero, to determine the basis coefficients of the first radiance transfer vector.

6. The method of claim 5, wherein projecting each function of the set of fixed functions into the wavelet domain comprises performing a two-dimensional nonstandard Haar wavelet transform on each fixed function.

7. The method of claim 5, wherein encoding the basis coefficients of the function comprises encoding the basis coefficients of each function into six wavelet trees, each function being represented as a cubemap function and each face of each cubemap being encoded into a separate wavelet tree.

8. The method of claim 5, wherein traversing direct paths through the wavelet trees to determine basis coefficients of the first radiance transfer vector comprises synchronously processing a set of nodes that includes one node from each wavelet tree, determining a contribution of the set of nodes to basis coefficients of the first radiance transfer vector, incrementing the basis coefficients, encoding the basis coefficients in an output wavelet tree, and synchronously processing a child set of nodes.

9. The method of claim 5, wherein traversing the wavelet trees comprises:
   separately traversing six sets of wavelet trees, each set corresponding to one face of a cubemap and each wavelet tree of the set including basis coefficients that represent one face of one cubemap function, such that traversing one set of wavelet trees determines the first radiance transfer vector for one face of the cubemap and traversing each of the six sets of wavelet trees separately determines a set of six first radiance transfer vectors that represent the entire cubemap.

10. The method of claim 5, further comprising performing non-linear approximation on each fixed function to discard insignificant basis coefficients.

11. The method of claim 1, wherein determining the second radiance transfer vector comprises projecting the one varying function into the wavelet domain, encoding the basis coefficients of the one varying function into a wavelet tree, and performing non-linear approximation on the one varying function to discard insignificant basis coefficients.

12. The method of claim 11, wherein projecting the one varying function into the wavelet domain comprises performing a two-dimensional nonstandard Haar wavelet transform on the one varying function.

13. The method of claim 12, wherein encoding the basis coefficients of the one varying function comprises encoding the basis coefficients of the one varying function into six wavelet trees, the one varying function being represented as a cubemap function and each face of the cubemap being encoded into a separate wavelet tree.

14. The method of claim 1, wherein:
   each function is represented as a cubemap function;
   determining the first radiance transfer vector comprises determining a set of first radiance transfer vectors, each first radiance transfer vector of the set corresponding to one face of a cubemap that represents the product of the fixed functions in the wavelet domain;
   determining a second radiance transfer vector comprises determining a set of second radiance transfer vectors, each second radiance transfer vector corresponding to one face of the cubemap function that represents the one varying function; and
   determining the inner product of the first and second radiance transfer vectors comprises determining inner products of the two sets of first and second radiance transfer vectors, and summing the inner products together to determine the radiance of the point x.

15. The method of claim 1, wherein the first radiance transfer vector is pre-computed in advance of run-time, the second radiance transfer vector is determined interactively, and the inner product of the first and second radiance transfer vectors is determined interactively.

16. The method of claim 13, wherein the second radiance transfer vector and the inner product are determined in real time.

17. The method of claim 1, wherein the first radiance transfer is pre-computed in advance of run-time, the second radiance transfer vector is iteratively determined in real time in response to changing scene conditions, and the inner product is iteratively determined in real time.

18. The method of claim 1, wherein:
factoring the functions into the set of fixed functions and the one varying function comprises interactively selecting the one varying function; and
determining the first radiance transfer vector comprises pre-computed a plurality of first-radiance transfer vectors in advance of run-time, such that the first radiance transfer vector for the set of fixed functions has already been pre-computed regardless of which function is interactively selected as the one varying function.

19. The method of claim 1, further comprising iteratively determining three color values for each visible point in the scene before rendering the scene.

* * * * *

UNITED STATES PATENT AND TRADEMARK OFFICE
CERTIFICATE OF CORRECTION

| | | |
|---|---|---|
| PATENT NO. | : 7,940,267 B2 | Page 1 of 1 |
| APPLICATION NO. | : 11/680910 | |
| DATED | : May 10, 2011 | |
| INVENTOR(S) | : Sun et al. | |

It is certified that error appears in the above-identified patent and that said Letters Patent is hereby corrected as shown below:

In the Specification

Column 1, line 14 through 20 should read,

This invention was made with Government support under Agency contract 0312724 awarded by the National Science Foundation. The Government has certain rights in this invention.

Signed and Sealed this
Twenty-fifth Day of February, 2014

Michelle K. Lee
*Deputy Director of the United States Patent and Trademark Office*